US008234576B2

(12) United States Patent
Tsuji et al.

(10) Patent No.: US 8,234,576 B2
(45) Date of Patent: Jul. 31, 2012

(54) INTERACTION DATA DISPLAY APPARATUS, PROCESSING APPARATUS AND METHOD FOR DISPLAYING THE INTERACTION DATA

(75) Inventors: Satomi Tsuji, Kokubunji (JP); Nobuo Sato, Saitama (JP); Kazuo Yano, Hino (JP); Norihiko Moriwaki, Hino (JP)

(73) Assignee: Hitachi, Ltd., Tokyo (JP)

( * ) Notice: Subject to any disclaimer, the term of this patent is extended or adjusted under 35 U.S.C. 154(b) by 976 days.

(21) Appl. No.: 11/958,733

(22) Filed: Dec. 18, 2007

(65) Prior Publication Data

US 2008/0215970 A1    Sep. 4, 2008

(30) Foreign Application Priority Data

Jan. 18, 2007  (JP) ................................. 2007-009472

(51) Int. Cl.
 *G06F 3/048* (2006.01)
(52) U.S. Cl. ..................... 715/744; 715/734; 715/736
(58) Field of Classification Search .................... 715/744
See application file for complete search history.

(56) References Cited

U.S. PATENT DOCUMENTS

2006/0074540 A1* 4/2006 Braunberger et al. .......... 701/70

FOREIGN PATENT DOCUMENTS

| JP | 2002-133599 A | 5/2002 |
|---|---|---|
| JP | 2002-149824 A | 5/2002 |
| JP | 2003-085347 | 3/2003 |
| JP | 2004-355308 | 12/2004 |
| JP | 2005-141297 A | 6/2005 |
| JP | 2005-318934 A | 11/2005 |
| JP | 2005-327156 | 11/2005 |
| JP | 2006-228150 | 8/2006 |
| JP | 2006-323483 A | 11/2006 |

OTHER PUBLICATIONS

IDA Corporation, "Satellite Vehicle Tracking—Radio/Internet," idaco.com/svt-products.htm, Oct. 2006.*
Mathew Laibowitz et al., A Sensor Network for Social Dynamics, ISPN'06, Proceedings of the 5th International Conference on Information Processing in Sensor Networks, Apr. 19, 2006, pp. 483-491, ACM New York, NY, USA.

* cited by examiner

*Primary Examiner* — William Bashore
*Assistant Examiner* — Daniel Um
(74) *Attorney, Agent, or Firm* — Mattingly & Malur, P.C.

(57) ABSTRACT

Disclosed herein is a system for keeping sensing of mass data of members of an organization with respect to states of their meeting and activities and analyzing and evaluating their interactions according to those sensor data. Interaction data includes first information denoting whether or not a terminal unit has faced a different terminal unit and second information denoting a state of the terminal unit and excluding information denoting positions of the terminal unit and the first information. An interaction data display apparatus includes a receiving unit for receiving interaction data from the terminal unit and a display unit for displaying the received interaction data. The display unit displays the first and second information items included in the interaction data received by the receiving unit so as to be related to each other according to times at which those first and second information items are obtained respectively.

14 Claims, 43 Drawing Sheets

FIG. 8

| | START TIME (SSDB_STM) | END TIME (SSDB_ETM) | TERMINAL ID (SSDB_SID) | INFRARED RAY SENDER ID (SSDB_OID) | RECEIVING COUNT (SSDB_NIR) | ACCELERATION x1 (SSDB_AX1) | ACCELERATION y1 (SSDB_AY1) | ACCELERATION z1 (SSDB_AZ1) | ... | ACCELERATION x100 (SSDB_AX100) | ACCELERATION y100 (SSDB_AY100) | ACCELERATION z100 (SSDB_AZ100) |
|---|---|---|---|---|---|---|---|---|---|---|---|---|
| RE01 | 20060724-13374500 | 20060724-13375500 | 1002 | 1000 | 3 | 122 | 142 | 115 | ... | 119 | 146 | 118 |
| RE02 | 20060724-13374808 | 20060724-13375808 | 1001 | null | 0 | 117 | 145 | 120 | ... | 118 | 146 | 120 |
| RE03 | 20060724-13375016 | 20060724-13380016 | 1000 | 1002 | 5 | 119 | 118 | 122 | ... | 117 | 144 | 116 |
| RE04 | 20060724-13375037 | 20060724-13380037 | 1004 | 1003 | 1 | 130 | 147 | 149 | ... | 122 | 145 | 116 |
| RE05 | 20060724-13375129 | 20060724-13380129 | 1003 | 1004 | 3 | 123 | 144 | 123 | ... | 117 | 146 | 123 |
| RE06 | 20060724-13375564 | 20060724-13380564 | 1002 | 1000 | 6 | 145 | 118 | 123 | ... | 144 | 120 | 122 |

SSDB

FIG. 10

ASDB_ACC

| | TIME (ASDB_ACCTM) | TERMINAL ID (ASDB_ACCSID) | ACCELERATION x (ASDB_AX) | ACCELERATION y (ASDB_AY) | ACCELERATION z (ASDB_AZ) |
|---|---|---|---|---|---|
| RE01 | 20060724-13374500 | 1002 | 0.10379 | 0.85863 | -0.16040 |
| RE02 | 20060724-13374502 | 1002 | 0.21701 | 1.04734 | -0.65105 |
| | ... | ... | ... | ... | ... |
| RE100 | 20060724-13374700 | 1002 | -0.00944 | 1.00959 | -0.04718 |
| RE101 | 20060724-13374808 | 1001 | -0.08492 | 0.97185 | 0.02830 |
| RE102 | 20060724-13374810 | 1001 | -0.08492 | 0.97185 | -0.04718 |
| | ... | ... | ... | ... | ... |
| RE200 | 20060724-13375008 | 1001 | -0.04718 | 1.00959 | 0.02830 |
| RE201 | 20061012-13375016 | 1000 | -0.00944 | -0.04718 | 0.10379 |

FIG. 11

ASDB_IR

| | START TIME (ASDB_IRSTM) | END TIME (ASDB_IRETM) | TERMINAL ID (ASDB_IRSID) | INFRARED RAY SENDER ID (ASDB_IROID) |
|---|---|---|---|---|
| RE01 | 20060724-13374500 | 20060724-13375500 | 1002 | 1000 |
| RE02 | 20060724-13375016 | 20060724-13380016 | 1000 | 1002 |
| RE03 | 20060724-13375129 | 20060724-13380129 | 1003 | 1004 |
| RE04 | 20060724-13375564 | 20060724-13380564 | 1002 | 1000 |

FIG. 21

ASDB_AC

| START TIME (ASDB_AC_STM) | END TIME (ASDB_AC_ETM) | TERMINAL ID (ASDB_AC_SID) | ACTION (WALKING) (ASDB_AC1) | ACTION (SEATED) (ASDB_AC2) | ACTION (STANDING) (ASDB_AC3) | ... |
|---|---|---|---|---|---|---|
| 20060724-13374500 | 20060724-13375500 | 1002 | 6 | 1 | 3 | |
| 20060724-13374808 | 20060724-13375808 | 1001 | 2 | 0 | 8 | |
| 20060724-13375016 | 20060724-13380016 | 1000 | 0 | 10 | 0 | |

ASDB_AVE

| AVERAGE TIME (ASDB_AVE_TM) | TERMINAL ID (ASDB_AVE_SID) | ACCELERATION x (ASDB_AVE_X) | ACCELERATION y (ASDB_AVE_Y) | ACCELERATION z (ASDB_AVE_Z) |
|---|---|---|---|---|
| 20060724-13374600 | 1002 | 0.13154 | 1.03215 | -0.03427 |
| 20060724-13374908 | 1001 | 0.02791 | 0.97213 | 0.34712 |
| 20060724-13375116 | 1000 | -0.08127 | 1.25713 | 0.02830 |
| 20060724-13375137 | 1004 | 0.34578 | 0.76234 | -0.16750 |
| 20060724-13375229 | 1003 | -0.24573 | 0.67812 | 0.31578 |
| 20060724-13375664 | 1002 | 0.42154 | 1.12456 | -0.00781 |

RE01, RE02, RE03, RE04, RE05, RE06

ASDB_ACT

| | AVERAGE TIME (ASDB_ACT_TM) | TERMINAL ID (ASDB_ACT_SID) | ACTIVITY VALUE (ASDB_ACT) | ZERO-CROSS VALUE (ASDB_ACT_ZERO) |
|---|---|---|---|---|
| RE01 | 20060724-13374600 | 1002 | 15.34261 | 21 |
| RE02 | 20060724-13374908 | 1001 | 28.01624 | 34 |
| RE03 | 20060724-13375116 | 1000 | 21.46107 | 30 |
| RE04 | 20060724-13375137 | 1004 | 43.12737 | 45 |
| RE05 | 20060724-13375229 | 1003 | 12.03451 | 7 |
| RE06 | 20060724-13375664 | 1002 | 16.42783 | 20 |

FIG. 34

ASDB_IRE

| | START TIME (ASDB_IRE_STM) | END TIME (ASDB_IRE_ETM) | TERMINAL ID (ASDB_IRE_SID) | INFRARED RAY SENDER ID (ASDB_IRE_OID) |
|---|---|---|---|---|
| RE01 | 20060724-13374500 | 20060724-13424500 | 1002 | 1000 |
| RE02 | 20060724-13374500 | 20060724-13424500 | 1000 | 1002 |
| RE03 | 20060724-13375016 | 20060724-13425016 | 1000 | 1002 |
| RE04 | 20060724-13375016 | 20060724-13425016 | 1002 | 1000 |
| RE05 | 20060724-13375129 | 20060724-13425129 | 1003 | 1004 |
| RE06 | 20060724-13375129 | 20060724-13425129 | 1004 | 1003 |
| RE07 | 20060724-13375564 | 20060724-13425564 | 1002 | 1000 |
| RE08 | 20060724-13375564 | 20060724-13425564 | 1000 | 1002 |

FIG. 39

ASDB_SY

| | START TIME (ASDB_SY_STM) | END TIME (ASDB_SY_ETM) | TERMINAL ID (ASDB_SY_SID) | INFRARED RAY SENDER ID (ASDB_SY_OID) |
|---|---|---|---|---|
| RE01 | 20061012-133745 | 20061012-133755 | 1002 | 1025 |
| RE02 | 20061012-133745 | 20061012-133755 | 1025 | 1002 |
| RE03 | 20061012-133748 | 20061012-133758 | 1005 | 1003 |
| RE04 | 20061012-133748 | 20061012-133758 | 1003 | 1005 |

INTERACTION DATA DISPLAY APPARATUS, PROCESSING APPARATUS AND METHOD FOR DISPLAYING THE INTERACTION DATA

CLAIM OF PRIORITY

The present application claims priority from Japanese application JP 2007-009472 filed on Jan. 1-8, 2007, the content of which is hereby incorporated by reference into this application.

FIELD OF THE INVENTION

The present invention relates to a display apparatus for displaying interaction data exchanged between members wearing sensor terminals respectively.

BACKGROUND OF THE INVENTION

Improvement of productivity is a mandatory issue in every organization and many trials and errors have been repeated to improve environmental conditions of offices and efficiency of jobs. In the case of such productivity improvement in organizations for assembling and transporting industrial parts and products, the results of achieved improvements can be analyzed and evaluated objectively by tracing the paths of those parts and products moved from the factories. However, in the case of organizations for carrying out such business services as clerical works, sales, planning, etc., it is impossible to evaluate those services and works just by observing things, since those services and works are not related directly to things. Every organization, to begin with, is made to achieve a large scale job or work with combined power of many people when it is beyond one's capacity. In any of such organizations, interactions between and among those people is indispensable. This is why the present inventor has come to reach a conclusion that every organization can be analyzed and evaluated to improve its productivity by analyzing interactions between and among the people in each subject organization.

The JP-A No. 2003-85347 is a well-known example for analyzing such interactions in organizations. According to the method disclosed in the JP-A No. 2003-85347, such log information as speech data, header information, etc. in a mailing list is analyzed by relating it to a specific event and/or a topic of conversation.

The JP-A No. 2004-355308 also discloses an example of such interaction detections. According to the JP-A No. 2004-355308, an index is added to an interaction when an infrared tag attached to a member and its infrared image are photographed. Furthermore, according to the position of the infrared tag in the image, detection is made for a state in which members are meeting each other, as well as a state in which the members are in the same area.

The JP-A No. 2005-327156 also discloses a technique for grasping a friendly relationship between and among people using wireless tags. Concretely, a tag reader reads the position of a wireless tag attached to each member and the position locus is recorded. And by tracing the locus, the friendly relationship of a member with others is known.

On the other hand, the JP-A No. 2006-228150 discloses a technique for obtaining "a unique point" of a pattern extracted from analysis object interaction data by comparing the pattern with a pattern extracted from stored interaction data, thereby extracting a characteristic pattern of the object interaction data according to the extracted "unique point".

SUMMARY OF THE INVENTION

Conventionally, many of jobs and works in an organization have been executed by using IT tools such as electronic massages and messengers. Consequently, it has been expected that each organization can be evaluated with respect to its circumstances by analyzing those records. However, now that such IT tools spread and are used every day, it is found apparently through experiences that face-to-face interactions are most effective to actual decision making, negotiations, etc. to move the subject organization. The first merit of making such face-to-face interactions is enabling members who are meeting each other in the same place to select how to act according to the circumstances by mutually sensing the other's reactions through all of their sense organs. This is why something like a relationship will appear between members who are making interactions through mutual actions. And sensing of their actions will enable translations to be made for such items as their liveliness, strength of influences, cooperativeness, etc. that will facilitate decision making and negotiations. Furthermore, in order to analyze and evaluate an organization from those sensed interactions, it is also required to keep obtaining statistical data from a plurality of the organization members.

However, any of the aforesaid patent documents 1st to 4th does not disclose any techniques for displaying interaction data so as to be analyzed and evaluated easily by relating data denoting a meeting state of each member of a subject organization to data denoting other actions of the member.

Under such circumstances, it is an object of the present invention to realize a system for keeping sensing of many states of each member of an organization with respect to the member's meeting and activities, thereby analyzing and evaluating the member's interactions from those sensed data.

Typical one of the objects of the present invention disclosed hereunder is a display apparatus for displaying interaction data of a terminal unit. The interaction data includes first information denoting whether or not the terminal unit has faced a different terminal unit and second information denoting a state of the terminal unit, except for positions of the terminal unit and excluding the first information. The interaction data display apparatus includes a receiving unit for receiving interaction data from the terminal unit and a display unit for displaying the received interaction data. The display unit displays the first and second information items included in the interaction data received by the receiving unit in association with times at which those first and second information items are acquired.

According to an embodiment of the present invention, the display apparatus displays sensor data of meeting and sensor data of activity except for position data so as to be related to each other in accordance with time information, thereby enabling both meeting and activity to be analyzed easily with respect to the state of the subject interaction.

BRIEF DESCRIPTION OF THE DRAWINGS

FIG. 8 is a diagram for describing a database unit provided in a storage server in the first embodiment of the present invention;

FIG. 10 is a diagram for describing an acceleration database in the first embodiment of the present invention;

FIG. 11 is a diagram for describing an infrared database in the first embodiment of the present invention;

FIG. 21 is a diagram for describing an action database in the third embodiment of the present invention;

FIG. 25 is a diagram for describing an acceleration averaging database in the fourth embodiment of the present invention;

FIG. 34 is a diagram for describing an expanded meeting database in the sixth embodiment of the present invention;

FIG. 39 is a diagram for describing a meeting symmetrization database in the seventh embodiment of the present invention;

DETAILED DESCRIPTION OF THE PREFERRED EMBODIMENTS

The display apparatus of the present invention obtains data of an intended member's activity, as well as data of his/her meeting with another member from a sensor terminal worn by the intended member, then displaying the data so as to be related to each other, thereby enabling diversified analysis of the circumstances of the interaction between those members.

At first, there will be described a first embodiment of the present invention with reference to the accompanying drawings.

In this first embodiment, each member of an object organization wears a sensor terminal provided with a wireless sender/receiver unit and the terminal collects data related to the member's actions and interactions with other members. The collected data is sent to a base station wirelessly and stored in a storage server. Upon displaying the data, the subject client issues a display request to an application server, thereby the requested data is taken out from the storage server and processed in the application server, then returned to the client. The client then plots and displays the data. The display apparatus of the present invention has realized such a series of interaction data processes.

In this first embodiment, the display apparatus displays sensor data of both meeting and acceleration so as to be related to each other with respect to a plurality of members and a plurality of dates. And a graph is used to realize such an interaction data display. On the graph, an area is created for each member. His/her sensor data of meeting and acceleration are displayed on the left side and on the right side of the area respectively. Also on the same graph, the horizontal axes are used as time axes having the same width respectively. All the data of the same date are arranged at the same height. Those members' areas are stacked vertically to make it easier to analyze interactions from various visual points, such as comparison between meeting and action of each member at a time, comparison between actions of members before and after an interaction, comparison between those items with respect to each date, time band, etc.

Figure 1:
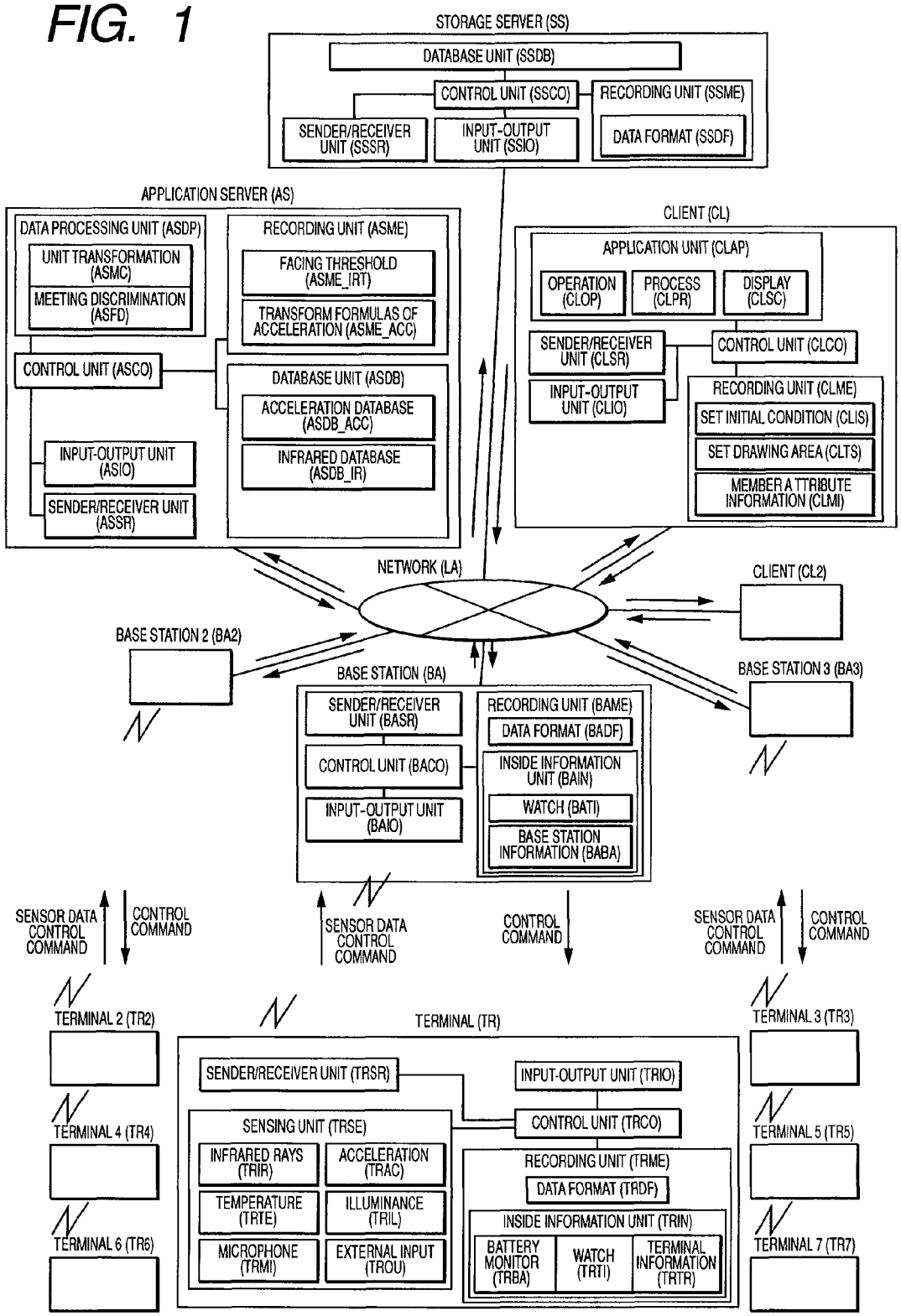
FIG. 1 is a diagram for describing an overall configuration of a system including elements ranged from a terminal for obtaining interaction data to an application program for displaying the obtained interaction data in a first embodiment of the present invention.

FIG. 1 shows an overall configuration of the display apparatus in the first embodiment of the present invention. The apparatus includes various units from terminals for collecting interaction data to an application unit for displaying collected interaction data.

A terminal (TR) is a small terminal and worn by a member who is a sensing object. Hereunder, there will be described a configuration of the terminal (TR). In FIG. 1, six terminals (TR) (terminals 2 (TR2) to 7 (TR7)) are shown. The configurations of those terminals (TR2 to TR7) are the same as that of the terminal (TR), so that the description of those configurations will be omitted here. In the following description, therefore, it is premised that the terminal (TR) may be replaced with any of the terminals 2 (TR2) to 7 (TR7). Even when there are any given numbers of those terminals in a system, the present invention can apply to the system.

The terminal (TR) includes an infrared ray sender/receiver unit (TRIR). Whether or not the terminal (TR) has faced another terminal (TR) is sensed by exchanging an infrared ray between those terminals. Consequently, the intended member is required to wear the terminal (TR) on his/her front side. For example, an ID card type terminal (TR) is employed and it may be hung on the member's neck. If a member wears the terminal (TR) on his/her front side, the terminal's meeting another terminal (TR) means the terminal wearing members are meeting each other.

Hereunder, there will be described an example in which infrared rays are exchanged between terminals (TR) to decide whether or not those terminals (TR) have met each other. Actually, however, other wireless signals may be exchanged to make such decisions.

The terminal (TR) consists of a sender/receiver unit (TRSR), a sensing unit (TRSE), an input-output unit (TRIO), a control unit (TRCO), and a recording unit (TRME). Data sensed by the sensing unit is sent to a base station (BA) through the sender/receiver unit (TRSR).

The sender/receiver unit (TRSR) sends/receives data to/from the base station (BA). For example, the sender/receiver unit (TRSR) may send sensor data according to a control command received from the base station (BA) or periodically. Furthermore, the sender/receiver unit (TRSR) may receive the control command from the base station (BA). According to the received control command, the sender/receiver unit (TRSR) changes the terminal (TR) related control information or executes the output to an output device provided in the input-output unit (TRIO). The sender/receiver unit (TRSR) sends an item selected by an input device provided in the input-output unit (TRIO) to the base station (BA) as a control command.

The sensing unit (TRSE) senses a physical amount denoting a state of the terminal (TR). Concretely, the sensing unit (TRSE) includes one or more sensors to cope with sensing of various types of physical amounts. For example, the sensing unit (TRSE) includes such sensors as an infrared sensor (TRIR), a temperature sensor (TRTE), a microphone (TRMI), an acceleration sensor (TRAC), and an illuminance sensor (TRIL).

The infrared sensor (TRIR) senses an infrared signal received from another terminal (TR). As to be described later, the sensed infrared information is used to decide whether or not the terminal (TR) has faced another terminal (TR).

The acceleration sensor (TRAC) senses acceleration of an intended member in each direction of the X, Y, and Z axes. As to be described later, the sensed acceleration information is used to decide an action (walking, static state, etc.) of a member who wears the terminal (TR).

The microphone (TRMI) senses voices. Sensed voices are used to decide whether or not the member who wears the terminal (TR) is talking.

The temperature sensor (TRTE) and the illuminance sensor (TRIL) sense temperature and illuminance respectively. Sensed temperature and illuminance information may be used to decide, for example, an environment in which the terminal (TR) exists.

The sensing unit (TRSE) may include one or more sensors described above and may further include other types of sensors. The sensing unit (TRSE) may also include additional sensors using an external input (TROU).

As described above, the terminal (TR) may decide whether or not the terminal (TR) has faced another by exchanging wireless signals other than the infrared signal. In such a case, the sensing unit (TRSE) may include a wireless signal receiver other than the above described infrared sensors (TRIR). An external input (TROU) may also be connected to the wireless signal receiver other than the above described infrared sensors (TRIR).

The input-output unit (TRIO) includes an input device such as a button and an output device such as a liquid crystal display. The I/O device (TRIO) obtains and displays information required by an intended member. The input-output unit (TRIO) may be substituted for a touch panel in which an input device and an output device are united into one.

The control unit (TRCO) includes a CPU (not shown). The CPU executes programs stored in the memory (TRME) to control sensor information obtaining timing, sensor information analyzing, and timings of sending/receiving data to the base station (BA).

The recording unit (TRME) includes an external storage such as a hard disk, memory, or SD card and stores programs and sensor data. Furthermore, the recording unit (TRME) also stores a data format (TRDF) and inside information (TRIN).

The data format (TRDF) specifies a format for collecting data and time information from each sensor upon sending those data and information.

The inside information unit (TRIN) stores information related to the terminal (TR). The terminal (TR) related information is, for example, a battery monitor (TRBA), a watch (TRTI) (that is, time information), and terminal information (TRTR).

The battery monitor (TRBA) records a residual level of the power supply of the terminal (TR). The watch (TRTI) denotes the current time counted by a terminal's built-in timer. The current time is adjusted according to the time information received periodically from the basic station (BA). The terminal information (TRTR) is unique to the terminal (TR) and used to identify the terminal (TR). The terminal information (TRTR) is also referred to as a unique ID.

The basic station (BA) is placed in an area for obtaining object information. The basic station (BA) receives sensor data sent wirelessly from each terminal (TR) existing in the area and sends the received sensor data to a storage server (SS) through a network (LA). The basic station (BA) includes a sender/receiver unit (BASR), a control unit (BACO), an input-output unit (BAIO), a recording unit (BAME), and an inside information unit (BAIN).

The sender/receiver unit (BASR) sends/receives data to/from terminals (TR). For example, the sender/receiver unit (BASR) may send control commands to those terminals (TR) and receive sensor data periodically from those terminals (TR).

The sender/receiver unit (BASR), when a terminal (TR) receives sensor data, may receive the sensor data immediately from the terminal (TR). Furthermore, the sender/receiver unit (BASR) may send a request to the storage server (SS) according to a control command received from a terminal (TR) and send the data obtained from the storage server according to the request to the terminal (TR). And the sender/receiver unit (BASR) may send an item selected by the input device provided in the input-output unit (BAIO) to a terminal (TR) or storage server (SS) as a control command. On the contrary, the sender/receiver unit (BASR) may receive control commands from the storage server (SS) or terminals (TR). And according to a received control command, the display of the output device is changed.

The control unit (BACO) includes a CPU (not shown). The CPU executes programs stored in the recording unit (BAME) to control sensor information obtaining timing, sensor information analyzing, and timings for sending/receiving data to/from the storage server.

The input-output unit (BAIO) includes an input device such as a button, keyboard, or the like, as well as an output device such as a liquid crystal display. The input-output unit (BAIO) displays information such as the circumstances of the object area, as well as sensor data. The input-output unit (BAIO) may be substituted for a touch panel in which an input device and an output device are united into one.

The recording unit (BAME) includes an external storage such as a hard disk, memory, or SD card and stores programs and sensor data. The recording unit (TRME) also stores a data format (TRDF) and includes an inside information (TRIN).

The data format (TRDF) specifies a format of both data and time information collected from each terminal (TR). This format is used to classify data into elements.

The inside information (TRIN) includes basic station (BA) related information. The basic station (BA) related information includes, for example, a watch (BATI) (that is, time information) and basic station information (BABA) specific to the object basic station.

The network (LA) makes a connection among the basic station (BA), storage server (SS), application server (AS), and clients (CL). The network (LA) may be substituted for any of a LAN (Local Area Network), a WAN (Wide Area Network), and any other network.

The storage server (SS) stores sensor data received from the basic station (BA) and sends the received sensor data to the application server (AS) according to a request therefrom. The storage server (SS), upon receiving a control command from the basic station (BA), sends the result obtained by the control command to the basic station (BA).

The storage server (SS) includes a database unit (SSDB), a control unit (SSCO), a sender/receiver unit (SSSR), an input-output unit (SSIO), and a recording unit (SSME).

The database unit (SSDB) stores sensor data received from terminals (TR) through the basic station (BA). Furthermore, the database station (SSDB) stores control commands received from the basic station (BA). The database (SSDB) may be stored in a hard disk (not shown) included in the recording unit (SSME) to be described later.

The control unit (SSCO) includes a CPU (no shown). The CPU executes programs stored in the recording unit (SSME) to manage the database (SSDB) and processes information received from the application server (SS) and the basic station (BA).

The sender/receiver unit (SSSR) sends data to the basic station (BA) and the application server (AS) and receives data therefrom. Concretely, the sender/receiver unit (SSSR) receives sensor data from the basic station (BA) and sends the data to the application server (AS). And the sender/receiver unit (SSSR), upon receiving a control command from the basic station (BA), sends a result selected from the database (SSDB) to the basic station (BA).

The input-output unit (SSIO) includes an input device such as a button, keyboard, or the like, as well as an output device such as a liquid crystal display and displays information such as the circumstances of the object area and received sensor data. The input-output unit (SSIO) may be substituted for a touch panel in which an input device and an output device are united into one.

The recording unit (SSME) includes an external storage such as a hard disk, memory, or SD card and stores programs and sensor data. The recording unit (SSME) also stores a data format (SSDF).

The data format (SSDF) specifies a format of both data and time information to be received from the basic station (BA). This format is used to classify data into elements appropriately to the database (SSDB).

The application server (AS) is a computer for processing sensor data stored in the storage server (SS). The application server (AS) includes a data processing unit (ASDP), a control unit (ASCO), a recording unit (ASME), a sender/receiver unit (ASSR), an input-output unit (ASIO), and a database (ASDB). The client (CL) and the storage server (SS) may have the functions of this application server (AS).

The data processing unit (ASDP) processes sensor data and shapes the data so as to be displayed appropriately. The data processing unit (ASDP) executes unit transformation (ASMC) and meeting discrimination (ASFD). If other processes are added to this system in a variation of the configuration, the data processing unit (ASDP) executes those processes. The data processing unit (ASDP) stores processed data in its database (ASDB) temporarily.

The functions of the data processing unit (ASDP) may also be realized by a program stored in the recording unit (ASME) and executed by the CPU of the control unit (ASCO). In this case, the CPU of the control unit (ASCO) comes actually to execute processes (see FIG. 9) such as unit transformation (ASMC), meeting discrimination (ASFD), etc.

The control unit (ASCO) includes a CPU (no shown). The CPU executes programs stored in the recording unit (ASME) to request the storage server (SS) to obtain data, process data, and manage the execution results.

The recording unit (ASME) includes an external storage such as a hard disk, memory, or SD card and stores results of the processes executed by the data processing unit (ASDP). Furthermore, the recording unit (ASME) stores reference values of such processes as a meeting threshold (ASME_IRT), as well as transform formulas of acceleration (ASME_ACC), etc. temporarily. Those values can be added, deleted, and changed as needed according to the object data type and processing type.

The sender/receiver unit (SSSR) receives sensor data from the storage server (SS) and sends the data to a client (CL) according to a processing result request received therefrom (CL).

The input-output unit (ASIO) includes an input device such as a button, keyboard, or the like, as well as an output device such as a liquid crystal display and displays information such as the circumstances of the object area and received sensor data. The input-output unit (ASIO) may be substituted for a touch panel in which an input device and an output device are united into one.

The database unit (ASDB) stores results of processes executed by the data processing unit (ASDP) temporarily. The database unit (ASDB) includes an acceleration data table (ASDB_ACC) and an infrared data table (ASDB_IR). According to the object data type or processing type, the database unit (ASDB) can add, delete, and change any tables. The database (ASDB) may be stored in a hard disk (not shown) included in the recording unit (ASME).

Each client (CL) sends a data processing request to the application server (AS) according to a user request and receives the requested processing result from the application server (AS) and displays the received processing result on a screen. The client (CL) includes an application unit (CLAP), a sender/receiver unit (CLSR), an input-output unit (CLIO), a recording unit (CLME), and a control unit (CLCO).

The application unit (CLAP) processes data received from the application server (AS) according to a user request to create a screen and display the created screen on an output device of the input-output unit (CLIO), thereby supplying the processed data to the user. The application unit (CLAP) consists of an application unit and items of operation (CLOP), processing (CLPR), and screen (CLSC).

The application unit (CLAP) may also be realized, for example, by a program stored in the recording unit (CLME) and executed by the CPU of the control unit (CLCO). In this case, the processes related to the operation (CLOP), the processing (CLPR), and the display (CLSC) are executed actually by the CPU of the control unit (CLCO).

The sender/receiver unit (CLSR) sends a request to the application server (AS) to obtain sensor data processed by the application server (AS)) within a user specified range therefrom.

The input-output unit (CLIO) includes an input device such as a button, keyboard, or the like, as well as an output device (e.g., an image display unit such as a liquid crystal display) and displays information such as the circumstances of the object area and received sensor data. The input-output unit (ASIO) may be substituted for a touch panel in which an input device and an output device are united into one.

The recording unit (CLME) includes an external storage such as a hard disk, memory, or SD card and stores a main program, sensor data, and results of processes executed by the application unit (CLAP). Furthermore, the recording unit (CLME) records conditions set for the member attribute information and the set drawing area (CLTS).

The member attribute information (CLMI) is used to correlate information of the terminal (TRTR) with the name of the terminal owner and the owner's attributes such as his/her post, etc.

The control unit (CLCO) includes a CPU (not shown) for executing programs stored in the recording unit (CLME).

Figure 2:
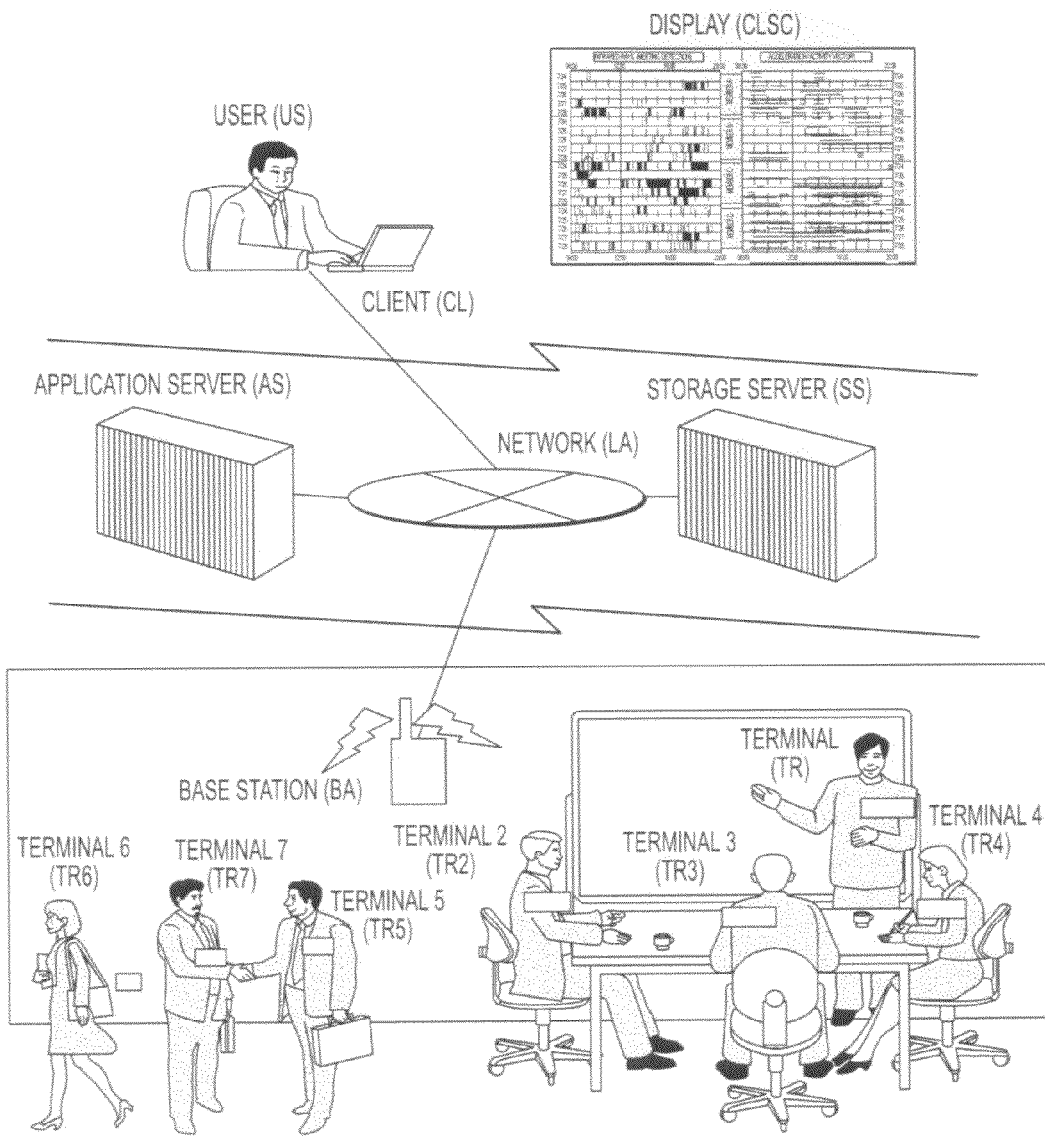
FIG. 2 is a diagram for describing an example of a scene used actually in the first embodiment of the present invention.

FIG. 2 shows an example of a scene actually utilized in the first embodiment of the present invention.

The user (US) operates the client (CL) to receive signals for displaying interaction data.

The display (CLSC) is displayed by the application unit (CLAP) included in the client (CL). The application unit (CLAP) of the client (CL) connects the application sever (AS) through a network (LA) to receive data processing results stored in the database unit (ASDB). The received result information includes sensor data processed by the application server (CLAP). The application unit (CLAP) processes the received information (CLPR) to create a display (CLSC).

The application server (AS) connects the storage server (SS) through the network (LA) to receive sensor data stored in the database unit (SSDB). In addition, the application server (AS) connects the client (CL) through the network (LA) to send sensor data received from the database unit (ASDB) to the client (CL).

The storage server (SS) connects the base station (BA) through the network (LA) to receive sensor data. The base station (BA) sends sensor data to the storage server (SS) through the network (LA).

The base station (BA) receives sensor data from each terminal (TR) through the sender/receiver unit (BASR).

The terminal (TR) is worn by its owner and gets sensor data through the sensing unit (TRSE). In the example shown in FIG. 2, there are terminal units 2 (TR2) to 7 (TR7) within the communicable area of the base station (BA). Each of the terminal units 2 (TR2) to 7 (TR7) is worn by its owner and gets sensor data through the sensing unit (not shown) just like the terminal (TR). The terminal (TR), as well as each of the terminal units 2 (TR2) to 7 (TR7) sends obtained sensor data to the base station (BA) through its sender/receiver unit (TRSR). The sensor data sent from the terminal (TR) and each of the terminal units 2 (TR2) to 7 (TR7) includes information for identifying each of the terminal (TR) and the terminal units 2 (TR2) to 7 (TR7).

Figure 3:
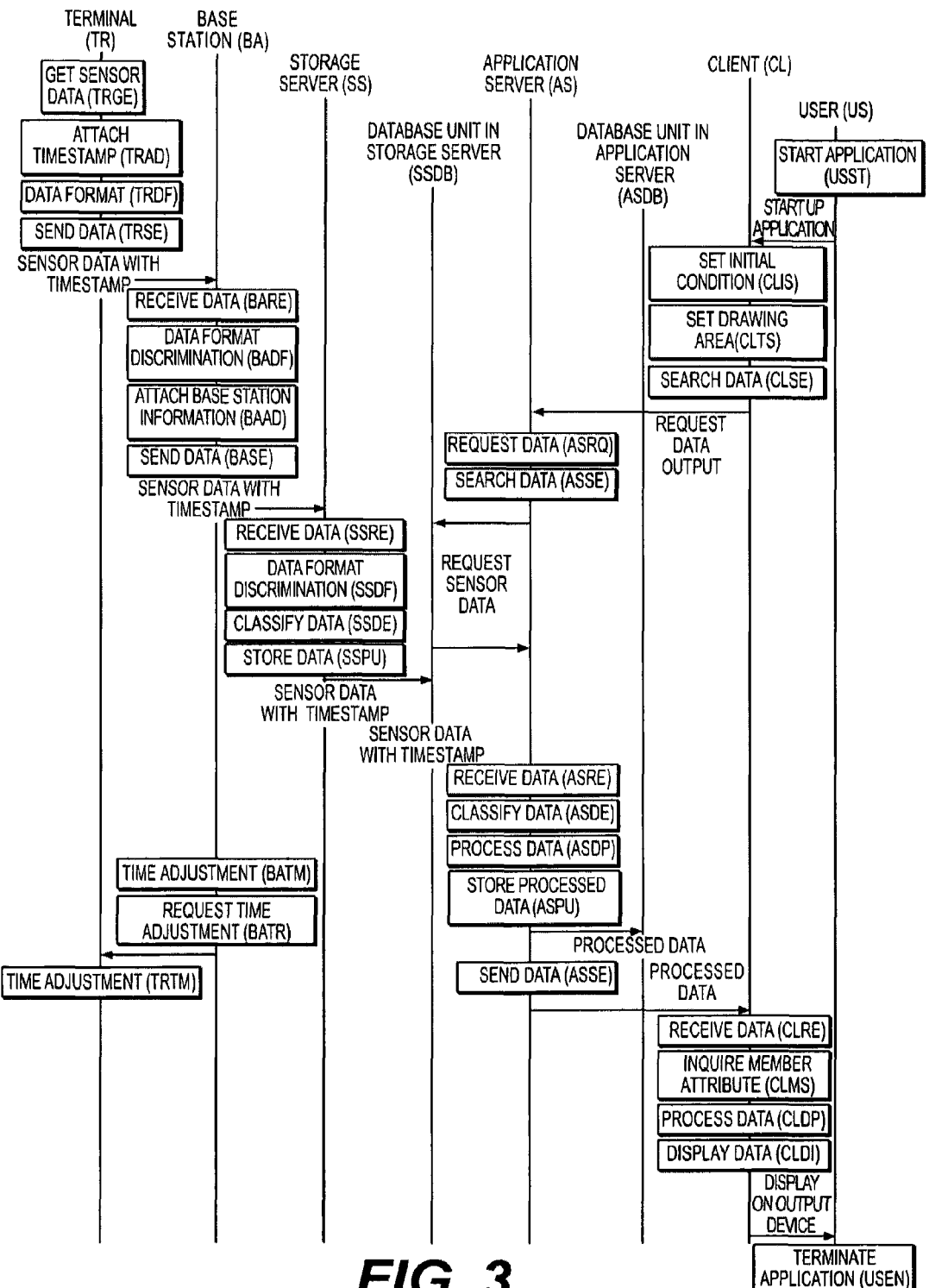
FIG. 3 is a sequence chart for describing processes for supplying sensor data from a terminal to a user in the first embodiment of the present invention.

FIG. 3 shows a sequence chart for showing how sensor data is supplied from a terminal (TR) to a user (US).

At first, the terminal (TR) gets sensor data (TRGE) sensed by its sensing unit (TRSE). Then, the terminal (TR) adds time information obtained from the clock (TRTI) built in the terminal (TR) to the obtained sensor data (TRAD). After that, the terminal (TR) formats the time-added sensor data into send data (TRDF) and sends the formatted data to the base station (BA) (TRSE).

The base station (BA), upon receiving the sensor data from the terminal (TR) (BARE), decides the data format according to the predetermined data format (BADF). Then, the base station (BA) adds the base station information (BABA) to the specified position of the received sensor data according to the data format (BADF) (BAAD). After that, the base station (BA) sends the base station information added sensor data to the storage server (SS) (BASE).

The storage server (SS), upon receiving the sensor data from the base station (BA) (SSRE), decides the data format according to the predetermined data format (SSDF) (SSDF). Then, the storage server (SS) classifies the data type (SSDE) and stores the received sensor data in the proper item of the database (SSDB) provided in the storage server (SS) according to the classification result (SSPU).

The client (CL), when the application is started up by the user, requests a data processing result to the application server (AS). The application server (AS) then requests the storage server (SS) to send the sensor data and processes the received sensor data and stores the result in the database (ASDB) provided in the application server (AS). After that, the client (CL) processes the received processing result into desired information and generates a display screen according to the processed information, then outputs the generated display screen to the output device (e.g., an image display unit such as a CRT or liquid crystal display) of the input-output unit (CLIO). The user (US) thus refers to the charts and graphs (e.g., FIG. 4A to be described later) displayed on the image display unit of the client (CL).

The information needed to obtain sensor data (TRGE), such as sampling cycle, obtaining time, etc. is stored in the recording unit (TRME). And according to the information, the sensing unit (TRSE) provided in the terminal (TR) makes sensing. The terminal (TR) records the sensed data in its recording unit (CLME).

In the process of attach time stamp (TRAD), the terminal (TR) stores the watch (TRTI) together with the subject sensor data as the sensor data obtained time. In the process of data formatting (TRDF), the terminal (TR) unifies the subject data into the predetermined send data format.

In the process of send data (TRSE), the terminal (TR) sends the sensor data obtained in the process of sensor data obtaining (TRGE) to the base station (BA) through the sender/receiver unit (TRSR). More concretely, the control unit (TRCO) of the terminal (TR) converts the format of the sensor data stored in the recording unit (TRME) in accordance with the sending format stored in the recording unit (TRME). The sending format is used to send sensor data to the base station (BA). The terminal (TR) then sends the formatted sensor data to the base station (BA) through the sender/receiver unit (TRSR).

In the process of receive data (BARE), the base station (BA) receives the formatted sensor data from the terminal (TR) through the sender/receiver unit (BASR). The recording unit (BAME) stores the received sensor data.

In the process of data format discrimination (BADF), the base station (BA) decides the format of the obtained data by making a comparison with the data format (BADF) stored in the recording unit (BAME). Furthermore, in the process of attach base station information (BAAD), the base station (BA) adds the base station information (BABA) to a proper position of the sensor data, specified by the data format (BADF).

In the process of send data (BASE), the base station (BA) sends the sensor data stored in the recording unit (BAME) to the storage server (SS) through the sender/receiver unit (BASR). More concretely, the control unit (BACO) of the base station (BA) converts the format of the sensor data stored in the recording unit (BAME) to the sending format stored in the recording unit (BAME). The sending format is used to send sensor data to the storage server (SS). Then, the base station (BA) sends the formatted sensor data to the storage server (SS) through the sender/receiver unit (BASR).

In the process of receive data, the sender/receiver unit (SSSR) of the storage server (SS) receives the formatted sensor data from the sender/receiver unit (BASR) of the base station (BA). The recording unit (SSME) stores the received sensor data.

In the process of data format discrimination (SSDF), the storage server (SS) decides the format of the obtained sensor data by making a comparison with the data format (SSDF) stored in the recording unit (SSME). Furthermore, in the process of the data classification (SSDE), the storage server (SS) classifies each data into an element.

In the process of data saving (SSPU), the control unit (SSCO) of the storage server (SS) converts the format of the subject sensor data to the format of the database unit (SSDB). The database unit (SSDB) stores this newly formatted sensor data. This storing method should preferably be used as an effective query for the searching process to be described later. The effective query may be any of, for example, a sensor data name, a time, a unique terminal ID, and a unique base station ID.

The series of processes from the sensor data obtaining (TRGE) to the data storing (SSPU) are executed periodically.

The application start-up (USST) means starting-up of a client application program by the user (US).

In the process of set initial condition (CLIS), the client (CL) sets necessary information for presenting a drawing. The user selects a button to obtain an analyzing time and object terminal information. The conditions set here are stored in the recording unit (CLME).

In the process of set drawing area (CLTS), the client (CL) sets a disposition place of a display object graph according to the graph type and the number of members to be displayed in the procedure of the set initial condition (CLIS). Furthermore, the client (CL) sets items such as a formula for object plotting coordinates with respect to each value. The items set here are stored in the recording unit (CLME).

In the process of data searching (CLSE), the client (CL) searches object data in the application server (AS) according to the set initial condition (CLIS). The recording unit (CLME) stores necessary information for obtaining object sensor data, such as an application server (AS) name, address, database name, table name, etc. The client (CL), in the process of the data searching (CLSE), creates a command used for the searching according to the searching object content set in the process of set initial condition (CLIS) and the information in the database, obtained from the recording unit (CLME). The format of the created command is then converted to the sending format stored in the recording unit (CLME). The sending format is used to send sensor data to the application server (AS). The formatted command is thus sent to the application server (AS) through the sender/receiver unit (CLSR).

In the process of data request (ASRQ), the application server (AS) sends the sensor data obtaining time and the unique ID of the terminal from which the object sensor data is to be obtained, thereby requesting the sensor data. In other words, sensor data requested in this process of the data request (ASRQ) is sensor data obtained by a terminal having the sent unique ID at the sent time. The send time and the terminal unique ID may be any of those stored in the recording unit (ASME) of the application server (AS), those stored in the recording unit (CLME) of the client (CL), or those specified by the user (US) through the input-output unit (CLIO) of the client (CL).

In the process of data searching (ASSE), the application server (AS) searches object data in the storage server (SS) according to the data request (ASRQ). The recording unit (ASME) stores necessary information for obtaining object data signals, such as the name, address, database, table name, etc. of the object storage server (SS). The application server (AS), upon making such data searching (ASSE), requests an object content to the recording unit (ASME) in the process of the data searching (ASRQ), thereby obtaining the database information from the recording unit (ASME) to create a command used for the searching. The control unit (ASCO) then converts the format of the created command to the sending format stored in the recording unit (ASME). The sending format is used to send sensor data to the storage server (SS) (ASME). The formatted command is thus sent to the storage server (SS) through the sender/receiver unit (ASSR).

In the process of receive data (ASRE), the application server (AS) receives sensor data from the database unit (SSDB) provided in the storage server (SS) according to the command of the data searching (ASSE). The recording unit (ASME) stores the sensor data received by the sender/receiver unit (ASSR).

In the process of data classification (ASDE), the application server (AS) classifies obtained data into proper elements. At this time, the time information and the sensor data are always related to each other in the classification.

The data processing program (ASDP) is stored in the recording unit (ASME) and executed by the control unit (ASCO). The data processing program (ASDP) is executed to display object data appropriately. The processing in this case is executed for the sensor data stored in the recording unit (ASME) in the process of receive data (ASRE).

In the process of processing result storing (ASPU), the application server (AS) stores a result (processed sensor data) of the processing executed by the data processing program (ASDP) in the database unit (ASDB). At this time, in addition to the processing result, the information presented in the data request (ASRQ) should preferably be stored together as a processing condition.

In the process of send data (ASSE), the application server (AS) sends a processing result stored in the database unit (ASDB) to the client (CL) through the sender/receiver unit (ASSR).

In the process of receive data (CLRE), the client (CL) receives a processing result from the database unit (ASDB) provided in the application server (AS). More concretely, the control unit (CLME) stores the processing result received by the sender/receiver unit (CLSR).

In the process of member attribute inquiry (CLMS), the client (CL) inquiries the terminal information (TRTR) of obtained data with the member attribute information (CLMI) recorded in the recording unit (CLME), thereby obtaining the name, attribute, etc. of the member having the terminal. The obtained name, attribute, and other items may also be displayed as needed.

In the process of data processing (CLDP), the client (CL) generates an image or screen using the display method stored in the recording unit (CLME) according to the processing result obtained in the process of the receive data (CLRE). The recording unit (CLME) stores the generated screen, etc.

In the process of data display (CLDI), the client (CL) displays a result of a data processing (CLDP) on the display (CLSC) and presents the display (CLSC) to the user (US) through the input-output unit (CLIO).

In the process of terminate application (USEN), the user ends the application program.

In the process of time adjustment (BATM), the clock (BATA) of the base station (BA) is subjected to time adjustment. The base station (BA) obtains the current time from an NTP server (not shown) connected to the network (LA). The time adjustment (BATM) is executed periodically.

The time adjustment request (BATR) is issued from the base station (BA) to the terminal (TR) to adjust the time of the terminal (TR) to the current time. The time adjustment (TRTM) is a processing for adjusting the time of the clock (TRTI) according to the time received from the base station (BA) in response to the time adjustment request (BATR). The processes from the time adjustment request (BATR) to the time adjustment (BATM) are executed periodically.

Next, there will be described examples of the sensing intervals employed in the sensing unit (TRSE) of the terminal (TR), as well as the sending timing employed in the sender/receiver unit (TRSR) in this embodiment of the present invention.

The terminal (TR) includes a three-axis acceleration sensor and an infrared ray sender/receiver unit and those units are driven to sense and send data in cycles of 10 seconds.

The acceleration sensor senses data 100 times in each direction of the X, Y, and Z axes in the first 2 seconds of the total 10 seconds. The sensing result (acceleration information) denotes a state of the terminal (TR). If the terminal (TR) is worn by its owner, the obtained acceleration information denotes the state of the owner's activity (e.g., static, walking, etc.).

The infrared ray sender/receiver unit sends infrared signals to the front side of the terminal (TR) 6 times per 10 seconds. The sent infrared signal includes a signal denoting the terminal information (TRTR), that is, the terminal ID (identifier).

If two terminals (TR) face each other, that is, if two members meet each other, the receiver of one of the terminals (TR) receives the ID of the other terminal (TR). In other words, when one terminal (TR) receives the ID of the other terminal (TR), it means that those two terminals (TR) are meeting each other. If each of the members wears his/her terminal on the front side, it means that two terminals (TR) are meeting each other and this means that the two members who wearing those terminals (TR) are meeting each other. The infrared ray receiver always stands by and records each ID received in 10 seconds, as well as the ID receiving count.

After adding a time stamp and the terminal information (TRTR), that is, the terminal's unique ID to the sensor data, the terminal (TR) sends those sensor data collectively to the base station (BA) wirelessly. In the above example, after all, the sensor data sent from the terminal (TR) comes to include the terminal acceleration information, terminal unique ID, and information denoting that the terminal has faced another terminal, as well as the time information related to those information items respectively. Those sensor data are thus utilized as interaction data denoting the interaction of the terminal wearing member.

However, the above example is just an example. The sensing intervals and the sending timings can be set freely.

Figure 4A:
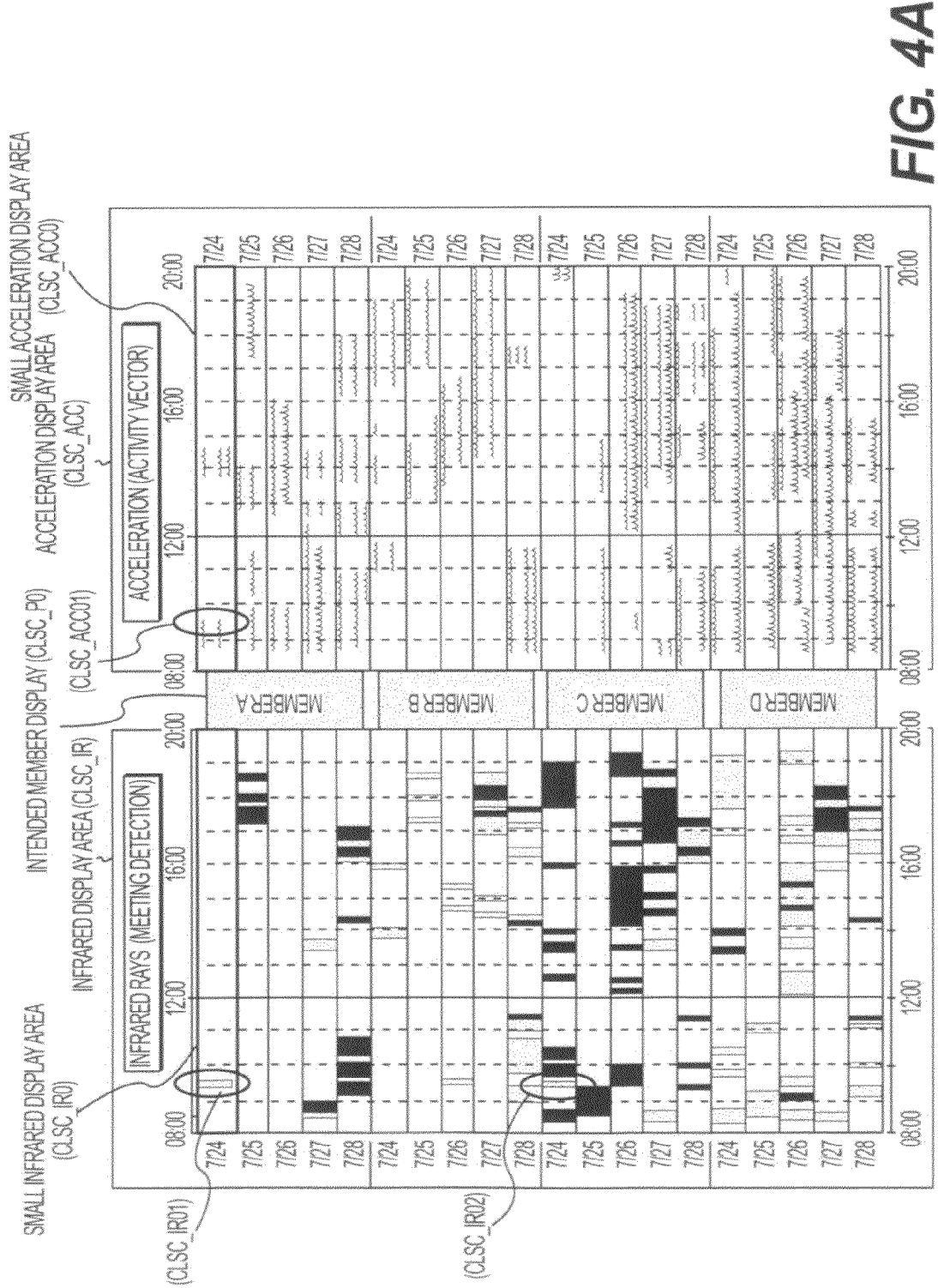
FIG. 4A is a diagram for describing an example of a display screen in the first embodiment of the present invention.

FIG. 4A shows an example of a display screen created in the first embodiment of the present invention.

Upon execution of a drawing processing, the application server (AS) is called through the application unit (CLAP) of the client (CL). The application server (AS) then sends a command to the storage server (SS) to obtain necessary data from the database unit (SSDB). The database unit (ASDB) stores sensor data processed by the application server (AS). The application unit (CLAP) of the client (CL) obtains the processed sensor data from the database unit (ASDB) to create a display screen according to the sensor data.

FIG. 4A shows an example in which a list of sensor data is displayed for 5 days (from July 24 to 28) with respect to four members. In this example, infrared sensor data of meeting is displayed in the infrared display area (CLSC_IR) on the left side while acceleration data is displayed in the acceleration display area (CLSC_ACC) on the right side. The contents in the acceleration display area (CLSC_ACC) will be described in detail later with reference to the partially expanded drawing of 4B and 4C. The intended member display area (CLSC_PO) in the center displays the name, ID, or terminal ID of the intended member. Furthermore, at the back side of the name or ID, the color corresponding to the name or ID is displayed at one to one correspondence.

If the name or ID of a member is displayed in the intended member display area (CLSC_PO), the name or ID corresponds to the ID of the terminal (TR) worn by the member. In this case, each terminal (TR) may be identified by the name or ID of the member who wears the terminal (TR).

The small infrared display area (CLSC_IRO) and the small acceleration display area (CLSC_ACCO) shown in FIG. 4A display sensor data of the same member, that is, the sensor data collected by the same terminal (TR) on one day. Those data are arranged so as to be aligned horizontally at the same height on the display screen (so that the distance from the time axis to each of those areas is equalized).

In other words, the infrared display area (CLSC_IR) is divided into a plurality of areas in a direction approximately perpendicularly to the time axis. Each of the divided areas is assigned to a member. The area assigned to a member (e.g., member A) is further divided into a plurality of small infrared display areas (CLSC_IRO, etc.) in a direction approximately perpendicularly to the time axis. And one small infrared display area (e.g., CLSC_IR0) displays information obtained on one day (e.g., July 24). Similarly, the acceleration display area (CLSC_ACC) is divided into a plurality of areas in a direction approximately perpendicularly to the time axis. And each of the divided areas is assigned to a member. And each area assigned to a member is further divided into a plurality of small acceleration display areas (CLSC_ACC0, etc.).

In the small infrared display area (CLSC_IR0), the opposite terminal (TR) wearing member is represented by a color painted in the band. For example, the color of the meeting display (CLSC_IR01) of the member A on July 24, 9:20 is the same as the background color of the member C in the intended member display area (CLSC_P0). On the other hand, the color of the meeting display (CLSC_IR02) of the member C on July 24, 9:20 is the same as the background color of the member A in the intended member display (CLSC_P0). This means that the terminal (TR) worn by the member A and the terminal (TR) worn by the member C exchanges infrared signals with each other on July 24, 9:20. Consequently, the user (US) who has referred to the display shown in FIG. 4A can understand that the members A and C have met each other at 9:20 on July 24.

Each of the small infrared display area (CLSC_IR0) and the small acceleration display area (CLSC_ACC0) includes a time axis. In the example shown in FIG. 4A, the horizontal axis in each of those areas is a time axis. In order to make a comparison between those areas easily, those time axes are displayed horizontally (so that one of the time axes is positioned on an extended line of the other) and the time width (scale) is the same between those areas. As a result, for example, upon an interaction between members A and C, the member A's acceleration data corresponding to the same time as that of the meeting display (CLSC_IR01) denoting the interaction appears in the (CLSC_ACC01).

The position of the meeting display (CLSC_IR01) in the infrared display area (CLSC_IR) and the position of the acceleration data display (CLSC_ACC01) in the acceleration display area (CLSC_ACC) are approximately identical. Such way, because the information denoting whether or not a member has faced another is related to information denoting the activities of those members according to a time in the display, it is easy to analyze both meeting data and activity data while they are related to each other.

In the example shown in FIG. 4A, the time axis displays a time period on a day (e.g., a period from 8:00 to 20:00). Data corresponding to the same time on another day is displayed in a different small infrared display area (CLSC_IR0, etc.) or small acceleration display area (CLSC_ACC0, etc.). However, the time axis may display the same time on different days consecutively. For example, the time axis may display a period between 0:00 and 23:59 on July 24, then a period between 0:00 and 23:59 on July 25 consecutively.

Figure 4B:
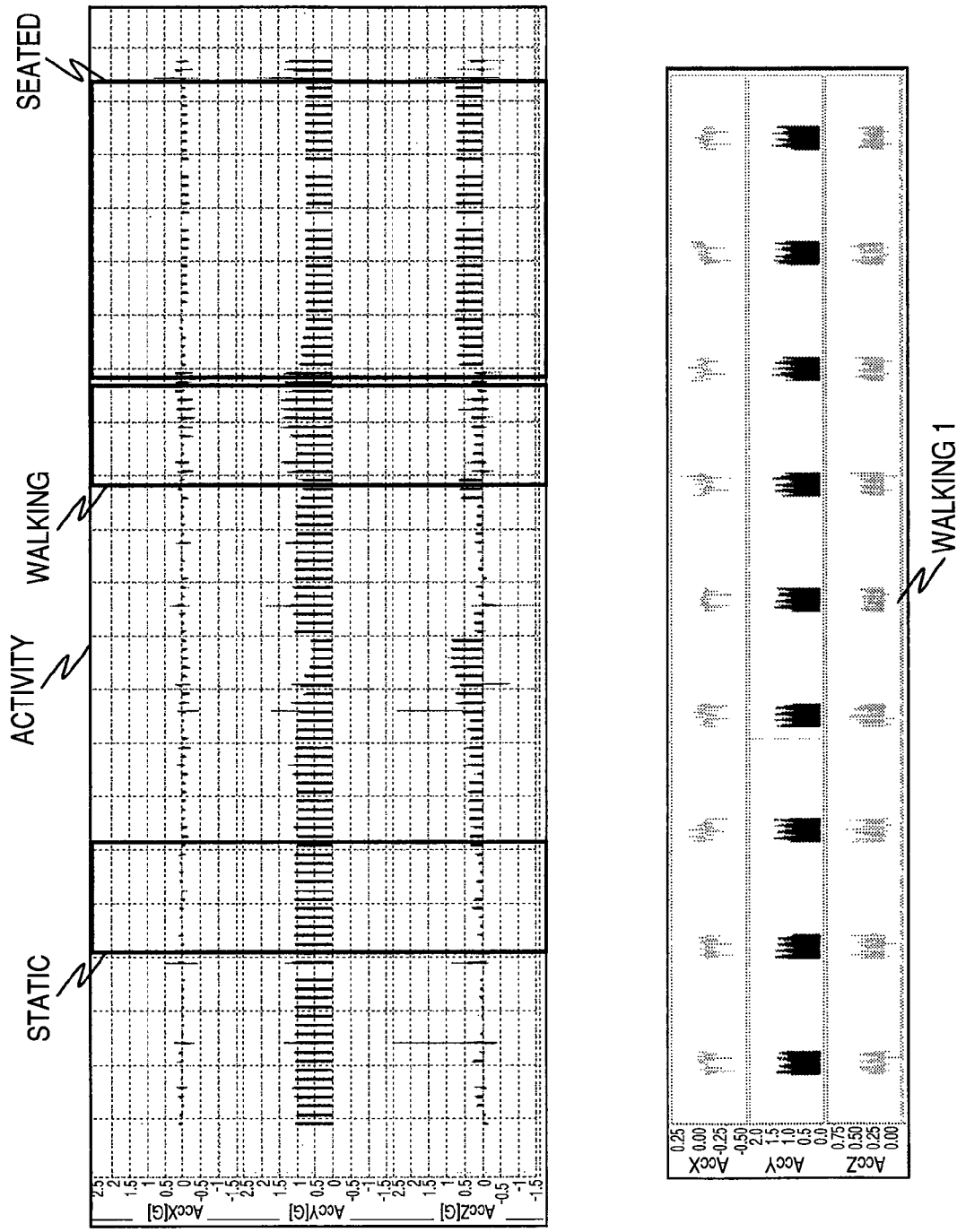
FIG. 4B is a diagram for describing an action pattern analysis according to acceleration data, executed in the first embodiment of the present invention.

FIG. 4B shows a diagram for describing an action pattern analysis according to the acceleration data, executed in the first embodiment of the present invention.

Concretely, FIG. 4B shows partially expanded acceleration data in the acceleration display area (CLSC_ACC) shown in FIG. 4A. In the activity display area, three graphs are displayed. The graphs are for, from top to bottom, acceleration (AccX) in the X axis direction, acceleration (AccY) in the Y axis direction, and acceleration (AccZ) in the Z axis direction. When a member hangs his/her ID card type terminal (TR) around his/her neck, the X axis direction is for the right-met content, the Y axis direction is for the perpendicularly-met content, and the Z axis direction is for the front-met content.

FIG. 4B shows an example in which his/her acceleration is observed while the terminal (TR) wearing member is static, waking, or seated as a state of static, walking, or seated.

In the static state, 1[G] is applied to the member due to the gravity acceleration in the Y axis direction. In the directions of the X and Z axes, the gravity acceleration applied to the member is stable at almost 0.

In the seated state, the Y axis value is reduced nearly to 0.7[G] and the Z axis value also increases and is stable at around 0.7[G]. This is because the terminal (TR) wearing member is seated deeply leaning back in a chair, so that the node is inclined upward.

Furthermore, in the walking state, the Y axis value goes over 1[G] and the tip of the graph becomes sharp in shape. Even in the directions of the X and Z axes, the values become about 0.3[G] and the amplitude in each direction of the X and Z axes is expanded.

The data in the walking state is further expanded and displayed as the data in the state of walking 1 in which it is understood that about four walking rhythms appear remarkably, particularly in the Y axis direction.

This will make it clear that a moving state of the terminal (TR), that is, an action pattern of the terminal (TR) wearing member can be analyzed from the acceleration data collected by the terminal (TR). For example, it is determined whether or not each of the acceleration value, the amplitude, or the cycle is within a predetermined range and according to the decision result, it is decided whether or not the terminal (TR) is moved, more concretely, whether the terminal (TR) wearing member is static, walking, or seated.

In addition to the acceleration data or instead of the acceleration data, other data may also be displayed on the display screen. For example, the temperature data obtained by the temperature sensor (TRTE), the illuminance data obtained by the illuminance sensor (TRIL), or the voice data obtained by the microphone (TRMI) may be displayed. In this case, for example, whether or not the terminal (TR) wearing member is talking may be decided according to the voice data. The terminal placed environment may be checked according to the illuminance or temperature data.

Figure 4C:
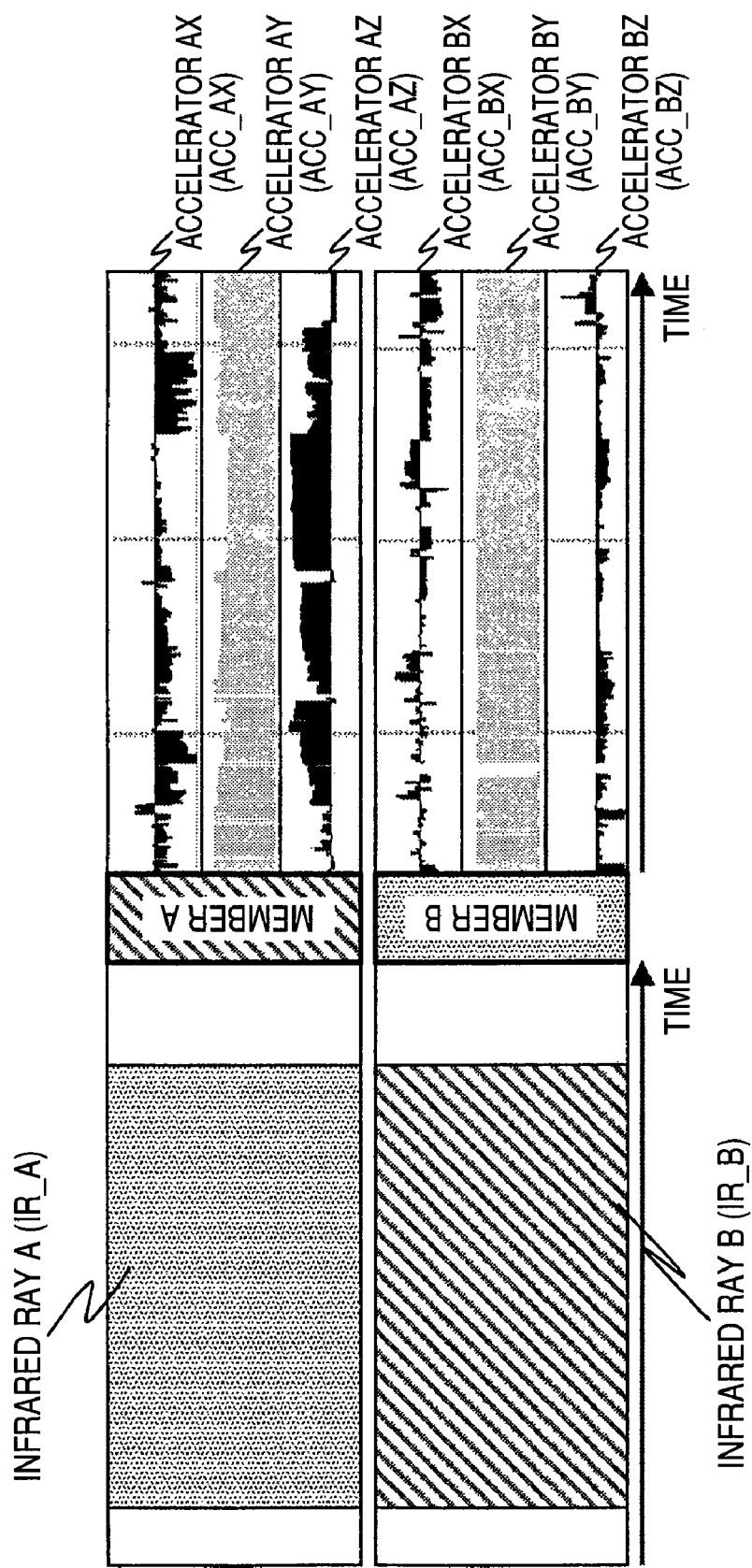
FIG. 4C is a diagram for describing an interaction analysis executed in the first embodiment of the present invention.

FIG. 4C shows a diagram for describing an analysis of an interaction executed in the first embodiment of the present invention.

Concretely, FIG. 4C shows partially expanded data corresponding to the members A and B at the same time and on the same day shown in FIG. 4A to make it easier to understand the comparison between the members, as well as between infrared ray and acceleration. The acceleration data for one member, for example, the area of the member A includes acceleration data in each direction of the X, Y, and Z axes. Consequently, this first embodiment enables analyzing of the action and state of each member more in detail.

The infrared data means as follows. If the color displayed in the infrared ray A (IR_A) is the same as the background color of the name of the member B, it means that the members A and B have met each other in this time band. Similarly, if the color displayed in the infrared ray B (IR_B) is the same as the background color of the name of the member A, it means that the members B and A have met each other.

Furthermore, it is understood from a result of comparison between the acceleration data in the same time band as that of meeting that the content in the Y axis direction (ACC_AY) decreases and the content in the Z axis direction (ACC_AZ) increases with respect to the member A respectively.

Consequently, it can be decided that the member A is seated. On the other hand, in the same time band, the content in the Y axis direction (ACC_BY) makes almost no change and fine shaking has appeared in the X axis direction (ACC_BX) with respect to the member B respectively. Thus it is understood that the member B is standing.

From those analysis results, it could be understood that the member B went to the member B who was seated for a talk or consultation. And because the member A was deeply leaning back in a chair, it is judged that the member A is higher in position than the member B.

Such way, it is possible to make an analysis by making a comparison between infrared data and acceleration data with respect to a plurality of members at the same time on the same day. Consequently, it is also possible to analyze the members who started an object interaction, the state of the interaction, and the standpoints of the two members.

Figure 5:
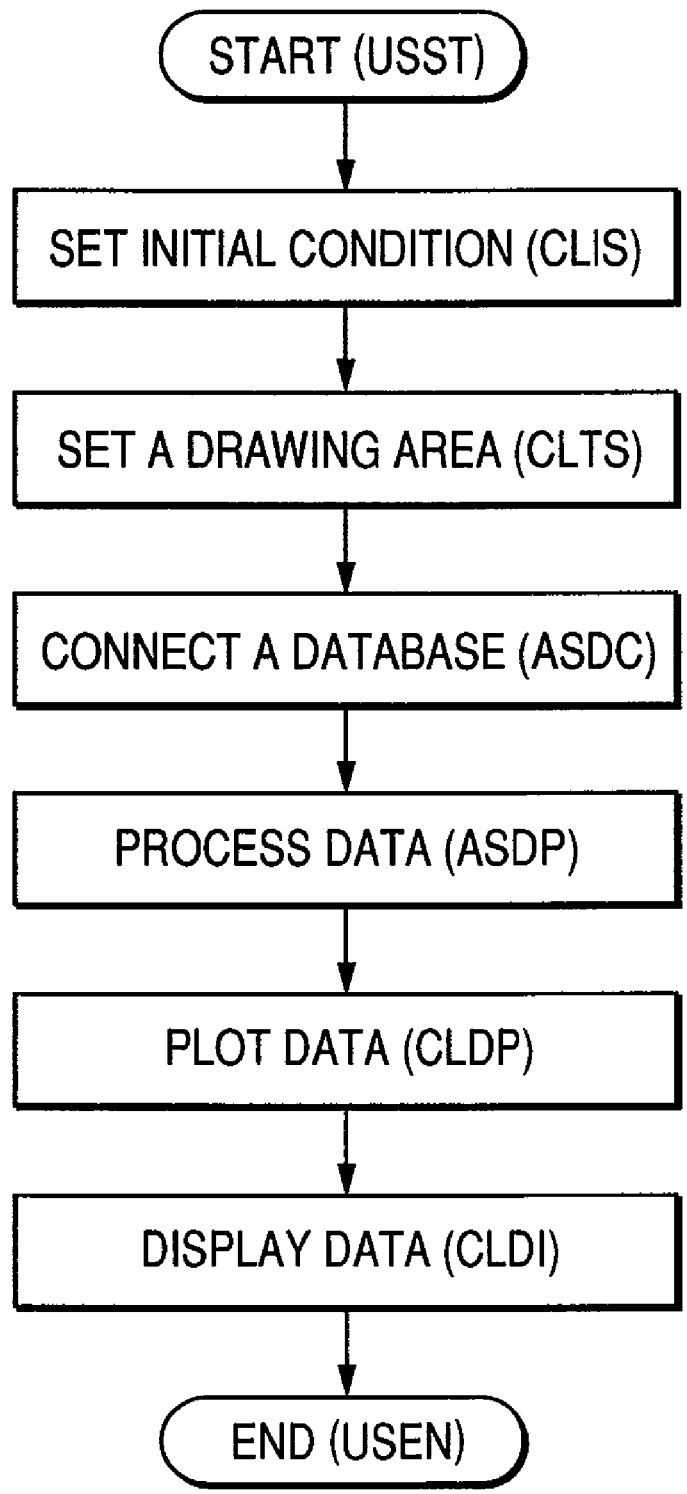
FIG. 5 is a flowchart of processes for creating a display screen in the first embodiment of the present invention.

FIG. 5 shows a flowchart of the processes for creating a display screen in the first embodiment of the present invention.

And in order to create the display screen, the procedures of the set initial condition (CLIS), the set drawing area (CLTS), the database connection (ASDC), the data processing (ASDP), the data plotting (CLDP), and the data display (CDDI) are executed sequentially.

The set initial condition (CLIS) is a procedure for setting basic conditions to display a screen. The set drawing area (CLTS) is a procedure for calculating a size of each area on an object display screen.

The database connection (ASDC) is a procedure for obtaining necessary sensor data by connecting the database unit (SSDB) provided in the storage server (SS). The data processing (ASDP) is a procedure for processing the obtained data for proper display. The data plotting (CLDP) executed in the client (CL) is a procedure for plotting processed data. The data display (CDDI) is a procedure for displaying plotted data on a display (CLSC).

Next, there will be described those procedures in detail with reference to FIGS. 6 through 12.

Figure 6:
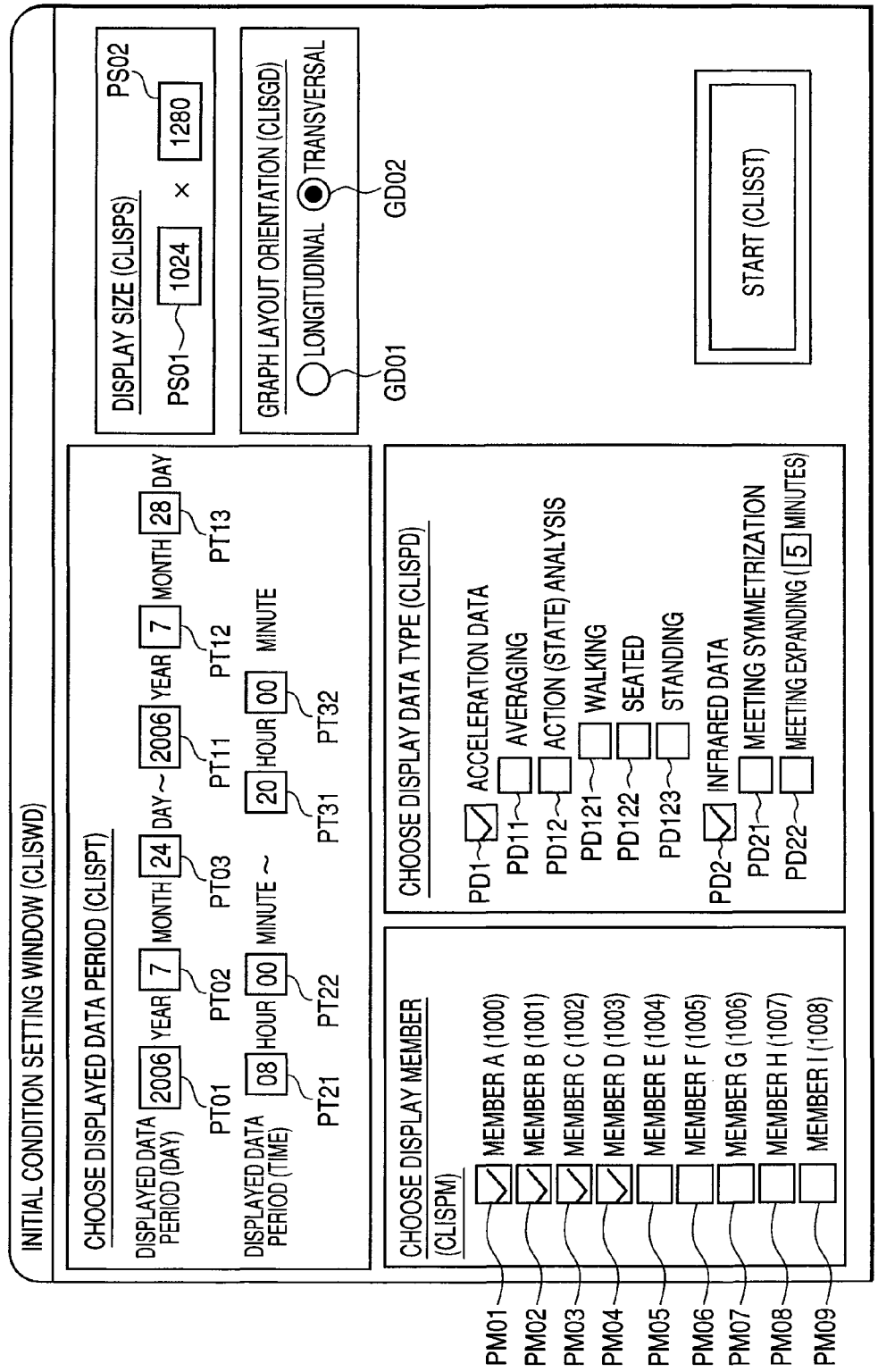
FIG. 6 is a diagram for describing an example of a screen displayed for setting initial conditions in the first embodiment of the present invention.

FIG. 6 shows an example of a screen displayed to set initial conditions in the first embodiment of the present invention.

In the set initial condition procedures (CLIS), the user (US) specifies parameters for a period for displaying object data, a plurality of members to be displayed, a type of display data, a method for processing data, a size of a display screen to be created, graph layout orientation, etc. through the input-output unit (CLIO) of the client (CL).

FIG. 6 shows an example of an input window for the set initial condition procedure (CLIS). The window (CLISWD) consists of areas of display period selection (CLISPT), display size (CLISPS), graph layout orientation (CLISGD), display member selection (CLISPM), display data selection (CLISPD), and START button (CLISST).

In the display period selection (CLISPT) area, the starting date (day, month, year) and the ending date (day, month, year) of a subject data display period are inputted to the text boxes (PT01 to PT03) and (PT11 to PT13) respectively. And the starting point time and the ending point time of the horizontal axis (time axis) to be displayed are inputted to the text boxes (PT21 and PT22) and (PT31 and PT32) respectively.

In the example shown in FIG. 6, ""24", "7", 2006", "28", "7", "2006", "08", "00", "20", and "00" are inputted to the text boxes (PT11 to PT13) and (PT21 to PT22) respectively. In this case, the data to be displayed corresponds to "Jul. 24, 2006 to Jul. 28, 2006. As for the data of each date, the data to be displayed corresponds to the time 8:00 to 20:00 (FIG. 4A).

In the display size (CLISPS) area, a subject image size is set. In this first embodiment, it is premised that a rectangular image is displayed on the screen. The vertical length of the image is inputted to the text box (PO01) and the horizontal length thereof is inputted to the text box (PO02). As a unit of input numerals, a unit of length such as pixels or centimeters is specified.

In the graph layout orientation (CLISGD) area, it is specified whether a plurality of types of graphs are disposed vertically or horizontally. A check mark is inputted to one of the RADIO buttons (GD01) and (GD02) to specify the graph layout orientation.

In the display member selection (CLISPM) area, members to be displayed are specified. The number put in parentheses after each member name denotes a unique ID of the terminal (TR) worn by the subject member. Members to be displayed are specified by inputting check marks in the check boxes (PM01 to PM09) respectively. The user (US) can specify a plurality of members at a time. If there are many sensed members, this area may be modified so that a plurality of members can be selected by specifying their positions. The area may also be provided with searching functions.

In the display data selection (CLISPD) area, a type of display data and its processing method are set. Basically, acceleration (PD1) and infrared ray (PD2) are selected. If an acceleration (PD1) averaging processing or an action analysis on the basis of acceleration is required, a check mark is put in the averaging processing (PD11) or action analysis (PD12). Here, the more the number of digits are added to a number of a drawing (e.g., PD1, PD11, etc.), a lower choice is selected. If an upper choice is not selected, no choice cannot be selected under the upper choice. Other various data selecting methods will be described in and after the second embodiment, so that the description will be omitted here.

After inputting all the above parameters, the user (US) is requested to press the START button (CLISST). Then, the application program is started up according to the inputted parameters.

The above input windows are just examples, however. Those input windows are not necessarily required if such items as display data period, members, data type, etc. can be set with any other means. The display size and the data processing method can also be set automatically on other conditions. And the graph layout orientation may be predetermined. Necessary items to be set on those graphs may also be increased as needed.

Figure 7:
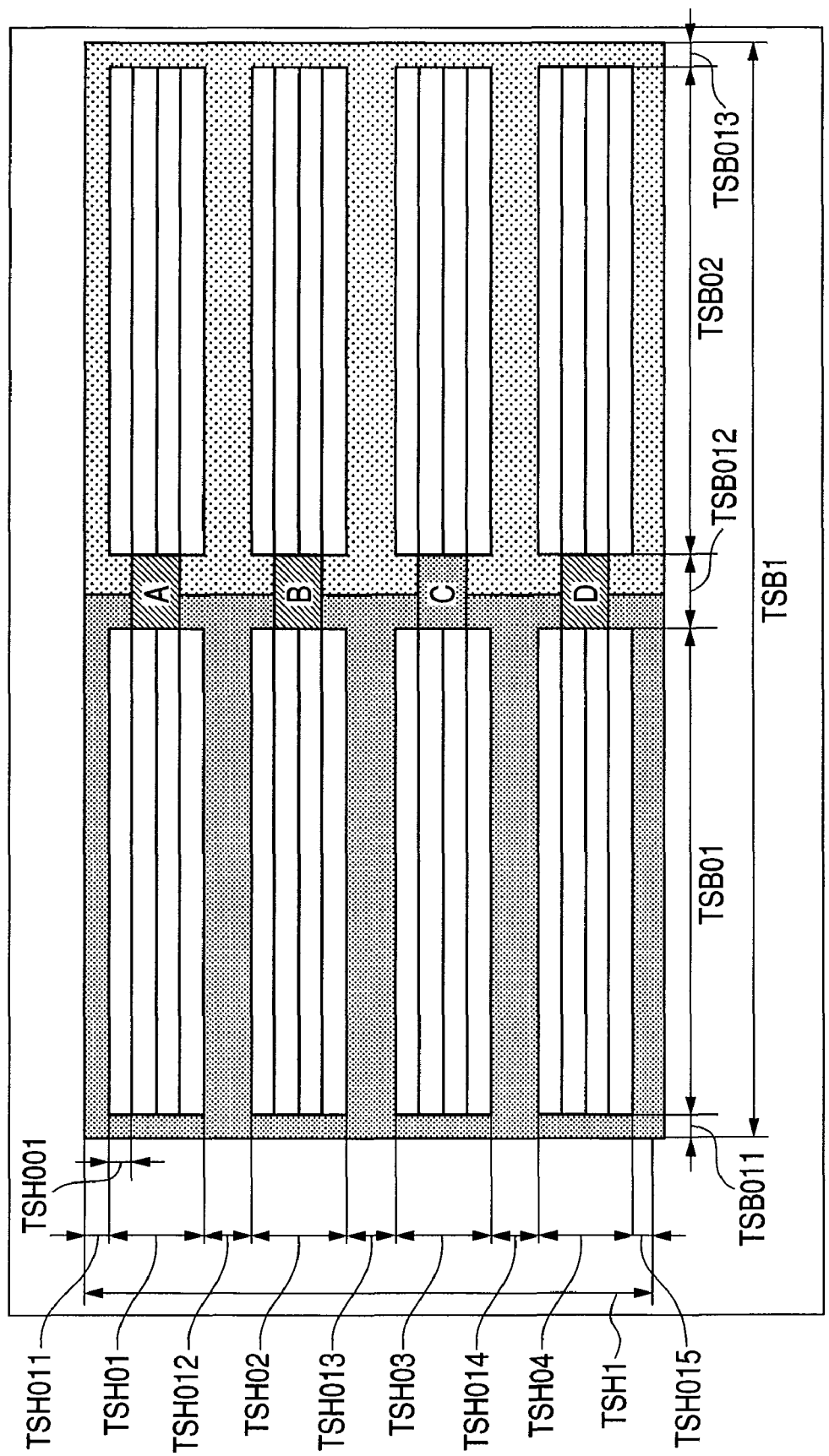
FIG. 7 is a diagram for describing a set drawing area procedure in the first embodiment of the present invention.

FIG. 7 shows a diagram for describing how to set a drawing area in the first embodiment of the present invention.

In the process of the set drawing area (CLTS), it is required to set a width and a height of a display area for a small graph in each part according to the display screen size, the number of members and the date period to be displayed, and the display data type set in the process of the set initial condition (CLIS). The horizontal axis denotes a time axis. Each vertical axis range is calculated and decided according to the maximum value of its estimated data.

FIG. 7 shows a size of each part when data for four days is displayed with respect to four members as shown in FIG. 4A.

This example corresponds to the example of the input window shown in FIG. 6. At first, the vertical length of the image set in the text box (PS02) in FIG. 6 is assumed as an image height (TSH1) and the horizontal length of the image set in the text box (PS01) is assumed as an image width (TSB1). The number of members corresponds to the number of check marks (that is, 4) put in the check boxes (PM01 to PM09) in FIG. 6. The number of days corresponds to the difference between the end time (PT11 to PT15) and the start time (PT01 to PT05) inputted by the user in FIG. 6. Fractions under the values of hours, minutes, and seconds are rounded up to the unit of days respectively.

Hereunder, there will be described a concrete example of how to calculate sizes with reference to the image height (TSH1) and the image width (TSB1).

The height of the single member areas (TSH01 to TSH04) takes a value calculated as the image height (TSH1)×0.8/the number of members. The height of the single member one day area (TSH001) takes a value calculated as the image height (TSH1)/the number of days. The height of the margin between members (TSH012 to TSH014) takes a value calculated as the image height (TSH1)×0.2/the number of members. The height of upper and lower margins (TSH011 to TSH015) takes a value calculated as the height of margin between members (TSH012 to TSH014)/2.

The graph area width (TSB01) takes a value calculated as the image width (TSB1)×0.8/2. The center margin in the graph area (TSB012) takes a value calculated as the image width (TSB1)×0.2/2. The right and left margins in the graph area (TSB011 and TSBO13) take values calculated as the center margin in the graph area (TSB012)/2 respectively.

Furthermore, the height of each graph for acceleration (x, y, z) can be determined by a value calculated as the height of the single member single day area (TSH001)/3.

The above concrete examples are just examples. Any other dimensional ratios may be employed to make it easier to read data on the screen.

FIG. 8 shows a diagram for describing a database unit (SSDB) provided in the storage server (SS) in the first embodiment of the present invention.

The application server (AS), upon connecting the database (SSDB) in the process (ASDC), sends a command to the storage server (SS), thereby a query is executed in the database (SSDB) according to the object time and the terminal ID, then the application server (AS) obtains necessary data from the database (SSDB).

The database (SSDB) stores sensor data sensed by the terminal (TR) and arranged in order. One line in the database (SSDB) format records elements of start time (SSDB_STM), end time (SSDB_OID), terminal ID (SSDB_SID), infrared sending ID (SSDB_OID), receiving count (SSDB_NIR), as well as elements ranged from acceleration x1 (SSDB_AX1), acceleration y1 (SSDB_AY1), and acceleration z1 (SSDB_AZ1) to acceleration x100 (SSDB_AX100), acceleration y100 (SSDB_AY100), acceleration z100 (SSDB_AZ100).

The end time (SSDB_ETM) denotes a time stamp time and the start time (SSDB_STM) denotes a time obtained by subtracting the sensing interval from the time stamp time.

The terminal ID (SSDB_SID) denotes the unique ID of the terminal (TR) that has made the subject sensing.

The infrared sending ID (SSDB_OID) denotes the unique ID of the terminal (TR) that has sent an infrared ray.

As shown in FIG. 6, if the terminal (TR) unique ID and the terminal (TR) wearing member correspond to each other, it is possible to identify the terminal wearing member according to the terminal unique ID.

The receiving count (SSDB_NIR) denotes the number of times an infrared ray has received from a terminal (TR) denoted by the infrared sending ID (SSDB_OID) between the start time (SSDB_STM) and the end time (SSDB_ETM). The infrared sending ID (SSDB_OID) may be added to the column of the receiving count (SSDB_NIR) as needed.

The acceleration x1 (SSDB_AX1) denotes the first acceleration value obtained by the acceleration sensor in the X axis direction.

The acceleration y1 (SSDB_AY1) denotes the first acceleration value obtained by the acceleration sensor in the Y axis direction.

The acceleration z1 (SSDB_AZ1) denotes the first acceleration value obtained by the acceleration sensor in the Z axis direction.

Hereinafter, the acceleration sensor obtains acceleration values consecutively up to the acceleration x100 (SSDB_AX100), acceleration y100 (SSDB_AY100), and acceleration z100 (SSDB_AZ100) that are the 100th values.

Records 1 (RE01) to 6 (RE06) denote concrete stored data examples.

Basically, data is stored in order of the start time (SSDB_STM). The number of records may be added each time the storage server (SS) receives new data from the base station (BA).

The format and elements of the database (SSDB) may be changed, added, or deleted as needed.

Figure 9:
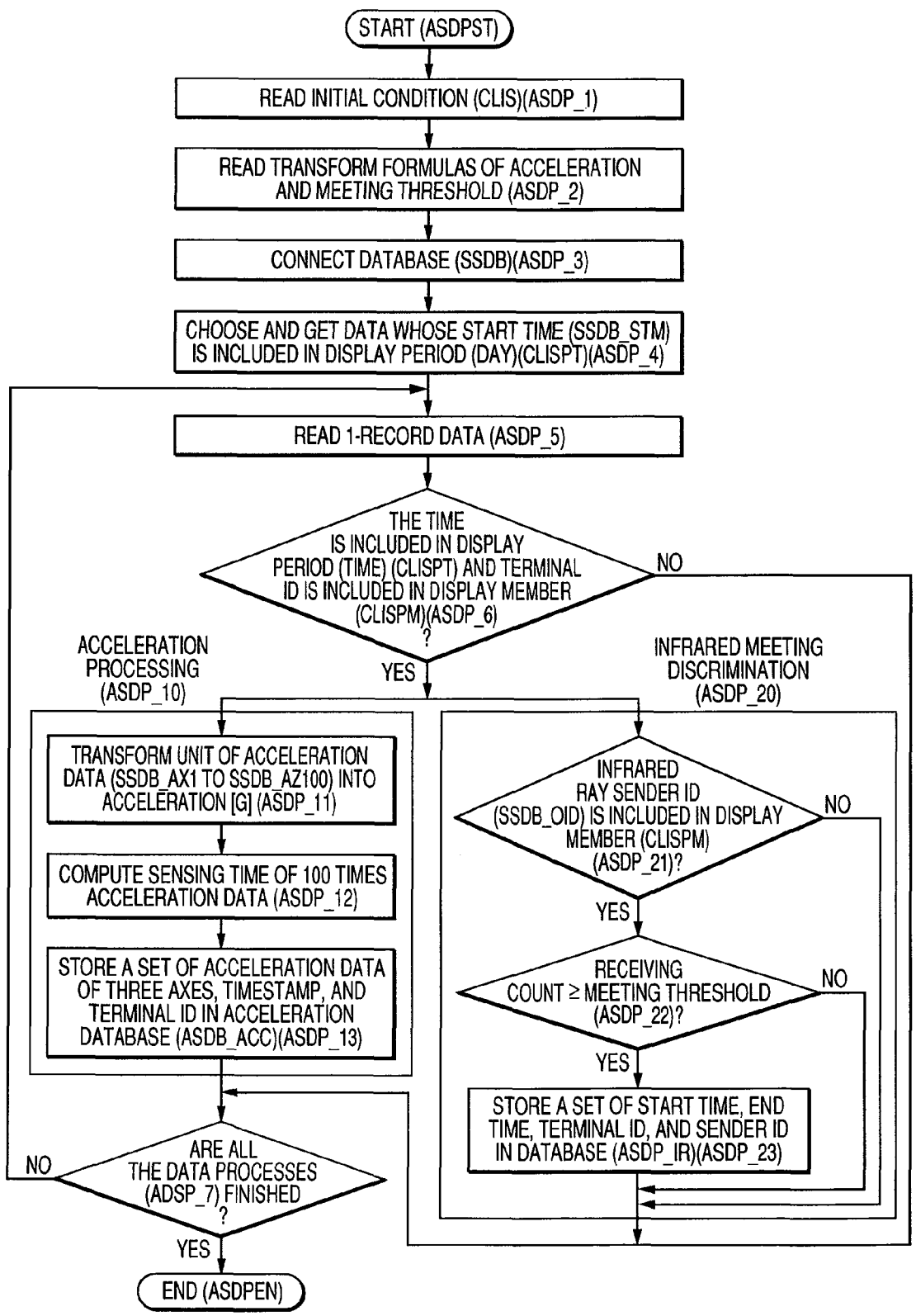
FIG. 9 is a flowchart of data processes executed by an application server in the first embodiment of the present invention.

FIG. 9 shows a flowchart of the processing (ASDP) executed by the application server (AS) in the first embodiment of the present invention.

In the process of the data processing (ASDP), the data processing unit (ASDP) of the application server (AS) executes a processing of meeting discrimination (ASFD) for non-processed sensor data obtained from the database unit (SSDB) of the storage server (SS) according to the unit transformation (ASMC) processing result and the infrared ray receiving count and stores the processed sensor data in the database unit (ASDB).

In FIG. 9, the data processing unit (ASDP), after starting such a data processing (ASDPST), reads the set initial condition (CLIS) in the process (ASDP_1), then reads the transform formulas of acceleration (ASME_ACC) and the meeting threshold (ASME_IRT) in the process (ASDP_2). The recorded transform formula of acceleration (ASME_IRT) is a predetermined one. The meeting threshold (ASME_IRT) denotes a criterion for whether to decide that a subject member has met another member (the lower limit count of infrared ray receiving from the same member to make the decision). The meeting threshold (ASME_IRT) may be a predetermined one or the user specified one set in the set initial condition process and stored in the recording unit (ASME).

After that, the data processing unit (ASDP) connects the database (SSDB) of the storage server (SS) (ASDP_3) and selects data of which start time (SSDB_STM) is within the display period (CLISPT) set in the process of the set initial condition (CLIS) in the database (SSDB) and obtains the selected data therefrom (ASDP_4). Then, the data processing unit (ASDP) reads one oldest record among the obtained data (ASDP_5). One record means a line of data shown in FIG. 8.

After that, the data processing unit (ASDP) goes to the acceleration data processing (ASDP_SID), then to the infrared meeting discrimination (ASDP_20) (ASDP_6) if the start time (SSDB_STM) and the end time (SSDP_STM) of the data included in the read record are within the display time (CLISPT) set in the set initial condition (CLIS) and the terminal ID (SSDB_SID) is a display member (CLIS'M). Otherwise, it means that the read record does not include any data to be displayed. In this case, the data processing unit (ASDP) goes to step (ASDP_7) without processing the read record.

After that, the data processing unit (ASDP) executes two processes of acceleration data processing (ADSP_10) and infrared meeting discrimination (ASDP_20). Those processes may be executed in parallel or sequentially. In the sequential processing, they may be executed in random order.

Next, there will be described the acceleration data processing (ASDP_10). At first, the data processing unit (ASDP) converts acceleration data obtained 100 items from each direction of the X, Y, and Z axes using the transform formulas of acceleration (ASME_ACC), thereby unifying those data into one format (acceleration [G]) (ASDP_11). This processing is equivalent to the function of the unit transformation (ASMC) shown in FIG. 1.

The following formula is used as such an transform formulas of acceleration (ASME_ACC), for example.

$$\text{Acceleration }[G] = \{(\text{original data} \times 4 - 477)/1023\} \times (3000/333) \times (3/2.8)$$

Note that, however, this conversion formula is just an example. The conversion formula should be selected appropriately to the sensor used in the subject terminal.

One record of data includes acceleration data for 100 sensing times. Consequently, the data processing unit (ASDP) adds a sensing time to each of the acceleration data obtained in those 100 sensing times at one-to-one correspondence. Concretely, the data processing unit (ASDP) counts sensing times backward with respect to the 100 sensing times with reference to the start time (SSDB_STM) shown in FIG. 8 to add the result to each object acceleration data (ASDP_12).

After that, the data processing unit (ASDP) divides those acceleration data into individual sensor data. Then, the data processing unit (ASDP) collects the elements of time (ASDB_ACCTM), terminal ID (ASDB_ACCSID), acceleration x (ASDB_AX), acceleration y (ASDB_AY), acceleration z (ASDB_AZ) into one record and stores the record in the acceleration database (ASDB_ACC) (ASDP_13). Consequently, one record shown in FIG. 8 comes to be divided into 100 records of data.

Next, there will be described the process of the infrared meeting discrimination (ASDP_20). This process is equivalent to the function of the meeting discrimination (ASDF) shown in FIG. 1.

At first, the data processing unit (ASDP) decides whether or not the infrared sending ID (SSDB_OID) in the read record is included in the display member set in the set initial condition (CLIS) process (ASDP_21). If it is included, the data processing unit (ASDP) goes to step (ASDP_22). If not, the data processing unit (ASDP) decides that the read data does not include any data to be displayed. In this case, the data processing unit (ASDP) goes to step (ADSP_22) without executing the processes in steps (ADSP_22) and (ADSP_23).

After that, the data processing unit (ASDP) compares the receiving count (SSDB_NIR) shown in FIG. 8 with the meeting threshold (ASME_IRT) (ASDP_22). If the receiving count (SSDB_NIR) is over the meeting threshold (ASME_IRT), the data processing unit (ASDP) decides that the terminal (TR) denoted by the terminal ID (SSDB_SID) has faced the terminal (TR) denoted by the infrared sending ID (SSDB_OID). In this case, the data processing unit (ASDP) collects the elements of start time (ASDB_IRSTM), end time (ASDB_IRETM), terminal ID (ASDB_IRSID), infrared sending ID (ASDB_IROID) into one record and stores the record in the infrared database (ASDB_IR) (ASDP_23).

Ending the processing of the record data read from the database (SSDB), the data processing unit (ASDP) reads the next one record (ASDP_5). And upon completing the processes of all the necessary records (ASDP_7), the data processing unit (ASDP) exits the processing (ASDPEN).

FIG. 10 shows a diagram for describing the acceleration database (ASDB_ACC) in the first embodiment of the present invention.

The acceleration database (ASDB_ACC) is created in the acceleration data processing (ASDP_10) shown in FIG. 9. The acceleration database (ASDB_ACC) includes elements of time (ASDP_ACCTM), terminal ID (ASDB_ACCSID), acceleration x (ASDB_AX), acceleration y (ASDB_AY), and acceleration z (ASDB_AZ).

For example, the records RE01 to RE100 shown in FIG. 10 are generated from the record RE10 shown in FIG. 8. Similarly, the records RE101 to RE200 shown in FIG. 10 are generated from the record RE02 shown in FIG. 8.

FIG. 11 shows a diagram for describing the infrared database (ASDB_IR) in the first embodiment of the present invention.

The infrared database (ASDB_IR) is created in the process of the infrared meeting discrimination (ASDP_20) shown in FIG. 9. The infrared database (ASDB_IR) includes elements of start time (ASDB_STM), end time (ASDB_IRETM), terminal ID (ASDB_IRSID), and infrared sending ID (ASDB_IROID).

For example, the record RE01 shown in FIG. 11 is generated from the record RE01 shown in FIG. 8.

Figure 12:
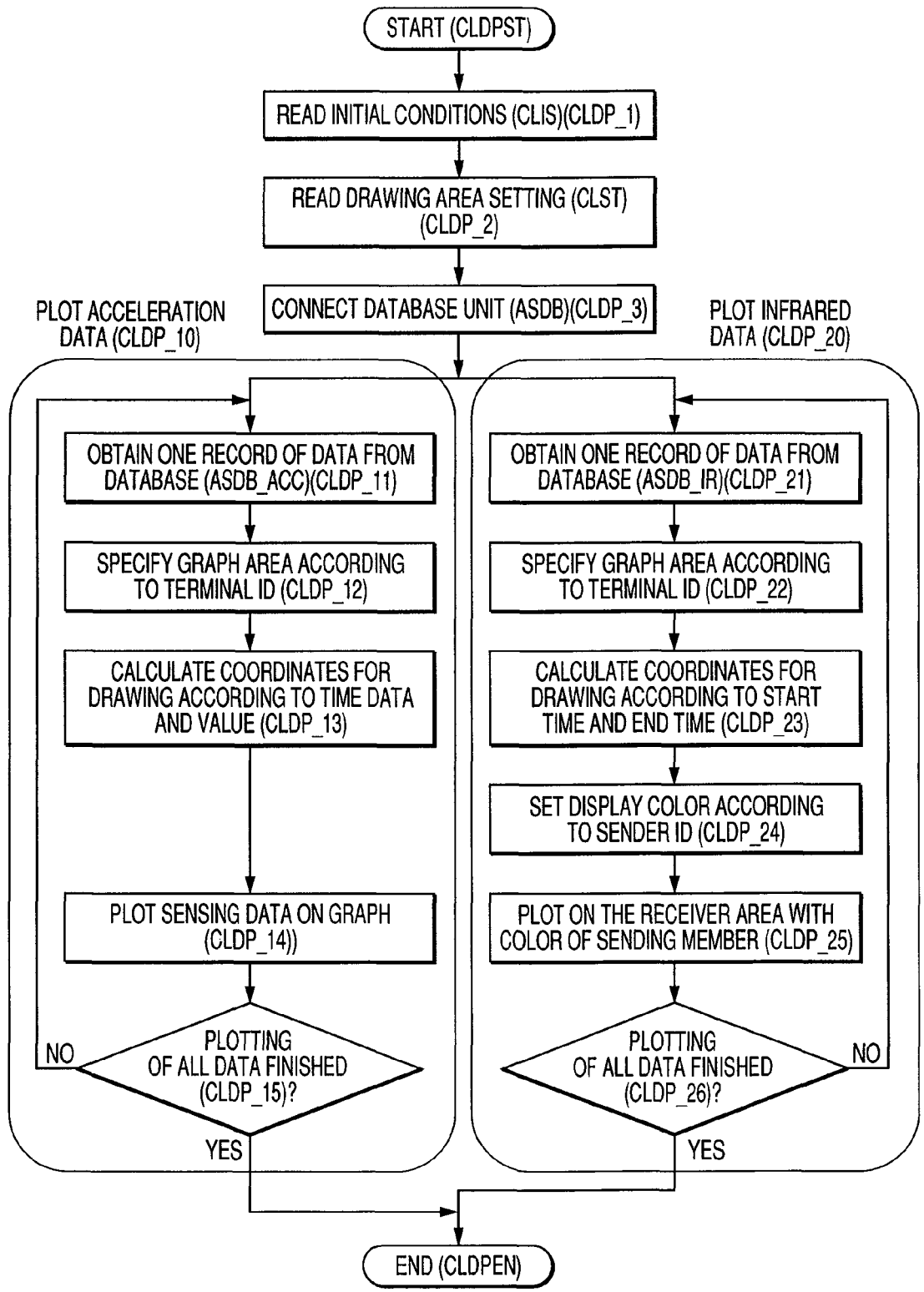
FIG. 12 is a flowchart of the processes for plotting in the first embodiment of the present invention.

FIG. 12 shows a flowchart of the processing for plotting data (CLDP) in the first embodiment of the present invention.

The plotting (CLDP) process is equivalent to the data processing (CLDP) process shown in FIG. 3. This processing (CLDP) plots processed data stored in the database unit (ASDB) in a position calculated from the data value, in an area set in the set drawing area (CLTS). The application unit (CLAP) of the client (CL) executes those processes.

Acceleration data is plotted onto a line graph or bar graph in this plotting (CLDP) process. Upon plotting infrared data, a color corresponding to the opposite member is laid on the subject band graph (horizontal axis=time axis) with respect to whether or not the subject terminal (TR) has faced another terminal (TR). As for the infrared data, its portion corresponding the 10 seconds is plotted.

After the plotting (CLDPST), the application unit (CLAP) reads the set initial condition (CLIS) from the recording unit (CLME) (CDP_1), then reads the set drawing area (CLTS) from the recording unit (CLME) (CLDP_2).

After that, the application unit (CLAP) connects the database unit (ASDB) provided in the application server (AS) (CLDP_3). Hereinafter, the application unit (CLAP) executes the two processes of acceleration data plotting (CLDP_10) and infrared data plotting (CLDP_20). These processes may be executed in parallel or sequentially.

Next, there will be described the process of the acceleration data plotting (CLDP_10).

At first, the application unit (CLAP) obtains one record of data in older of time series from the acceleration database (ASDB_ACC) (CLDP_11). Then, the application unit (CLAP) specifies a graph area to be plotted (CLDP_12) according to the terminal ID (ASDB_ACCSID). After that, the application unit (CLAP) calculates plotting coordinates (CLDP_13) from each of the values of the time (ASDB_ACCTM), the acceleration x (ASDB_AX), the acceleration y (ASDB_AY), and the acceleration z (ASDB_AZ) according to the formula set in the set drawing area (OLTS) processing. The application unit (CLAP) then plots those sensor data on a graph (CLDP_14).

The processes in the above steps (CLDP_11) to (CLDP_14) are repeated until plotting of all the data is completed (CLDP_15).

Next, there will be described the process of the infrared data plotting (CLDP_20).

At first, the application unit (CLAP) obtains one record of timely older data from the infrared database (ASDB_IR) (CLDP_21). The application unit (CLAP) then specifies a graph area to be plotted according to the terminal ID (ASDB_IRSID). The application unit (CLAP) then calculates plotting coordinates from the start time (ASDB_IRSTM) and the end time (ASDB_IRETM) (CLDP_23).

After that, the application unit (CLAP) sets a display color corresponding to the infrared sending ID (ASDB_IROID) (CLDP_24) and paints the width between the start time (ASDB_IRSTM) and the end time (ASDB_IRETM) in the color, thereby plotting the object infrared data (CLDP_25).

The application unit (CLAP) repeats the steps (CLDP_21) to (CLDP_25) until plotting of all the data is completed (CLDP_26).

Ending both the acceleration data plotting (CLDP_10) and the infrared data plotting (CLDP_20), the application unit (CLAP) executes the ending processing (CLDPEN) shown in FIG. 12.

The above display elements created in the first embodiment of the present invention make it easier to analyze interaction data from various points of view, such as comparison between meeting and action of a member at a time, comparison between actions of members upon interaction occurrence, comparison between actions of each member before and after the interaction occurrence, comparison between data of dates, and comparison between data in each time band.

More concretely, it is possible to analyze changes of postures of a member in an interaction, which of two members talked to the other in an interaction, an increase/decrease of temporary discussions, characteristic members who made interactions in a time band, etc. And according to those analysis results, it is possible to analyze and evaluate communication forms (e.g., which of members started an object interaction, who was positive to appeal in the interaction, who was passive in the interaction, how was the state of the interaction, what standpoints the members took, etc.), as well as how decision making was done and how influences were exerted from member to member.

Furthermore, because the application server (AS) processes data while the client (CL) plots and displays the data, duties of the sensor data processes are distributed. Consequently, even when there are a plurality of clients (CL), the application server (AS) can unify settings for data processes. As a result, all the clients (CL) can create display screens in the same format, so that even users who are not familiar with the system can execute processes easily as described above.

Next, there will be described a second embodiment of the present invention with reference to the accompanying drawings.

In the first embodiment, sensor data processed by the application server (AS) is stored once in the database (ASDB), then the client (CL) plots the data. On the other hand, in this second embodiment, the client (CL) processes and plots data consecutively; the application server (AS) takes no part in those processes. Consequently, the database unit (ASDB) for storing processed data is not required here. The client (CL) is provided with the functions that are required for processes executed by the application server (AS) in the first embodiment.

Others are similar to those in the first embodiment, so that the description for them will be omitted here.

Figure 13:
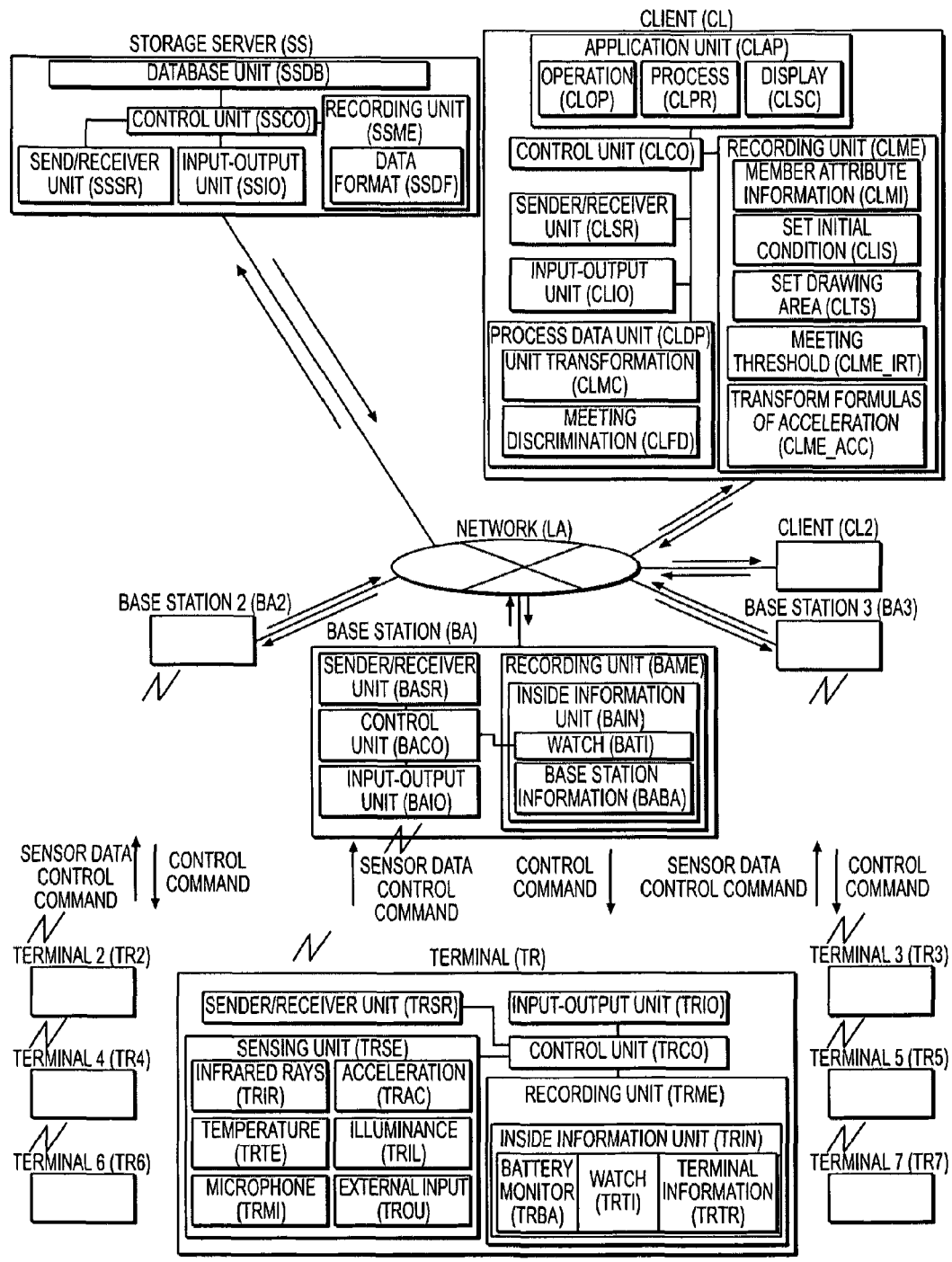
FIG. 13 is a diagram for describing an overall configuration of a system in a second embodiment of the present invention.

FIG. 13 shows a diagram for describing an overall configuration of a system in this second embodiment of the present invention.

There is only a difference between the configuration shown in FIG. 13 and the overall configuration of the system shown in FIG. 1 in the first embodiment; this second embodiment does not include the application server (AS) employed in the first embodiment. Consequently, the data processing unit provided in the application server (AS) in the first embodiment is provided in the client (CL) and furthermore, the meeting threshold (ASME_IRT) and the transform formulas of acceleration (ASME_ACC) in the recording unit (ASME) are stored in the recording unit (CLME) of the client (CL) as a meeting threshold (CLME_IRT) and transform formulas of acceleration (CLME_ACC), respectively.

The functions of the application server (AS) in the first embodiment are provided in the client (CL) in this second embodiment.

Figure 14:
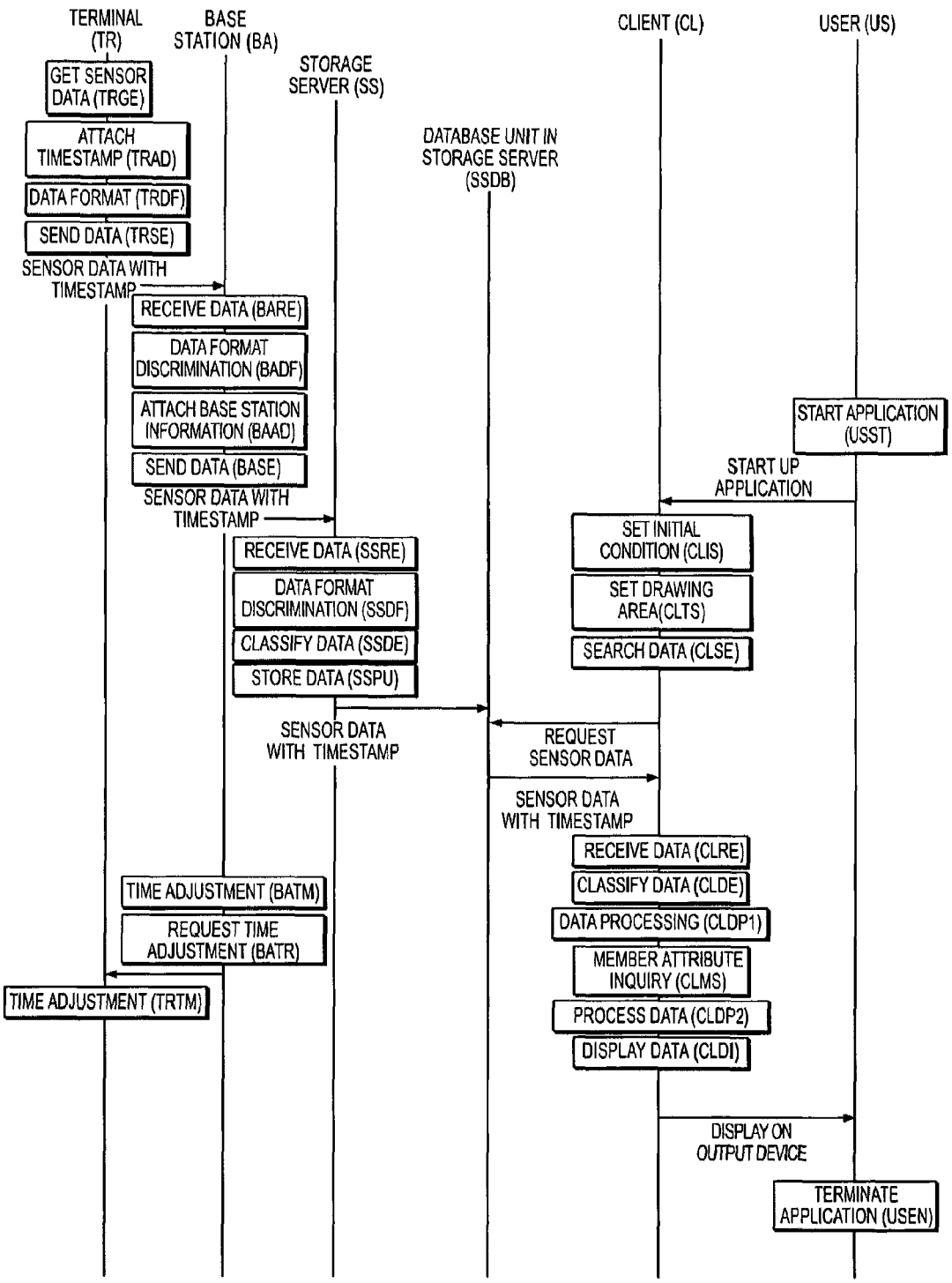
FIG. 14 is a sequence chart for describing the processes for supplying sensor data from a terminal to a user in the second embodiment of the present invention.

FIG. 14 shows a sequence chart of the processes for supplying sensor data from a terminal (TR) to a user (US) in this second embodiment of the present invention.

There is only a difference between the system configuration shown in FIG. 14 and that shown in FIG. 3; the client (CL) searches data (CLSE) directly in the database unit (SSDB) of the storage server (SS) without using the application server (AS) and furthermore, the client (CL) receives data (CLRE), classifies the data (CLDE), and processes the data (CLDP1) in this second embodiment. The receive data (ASRE), data classification (ASDE), and data processing (ASDP) in the second embodiment are the same as those in the first embodiment except for the receive data (CLRE), data classification (CLDE), and data processing (CLDP1) that are all executed by the client (CL), not by the application server (AS).

Figure 15:
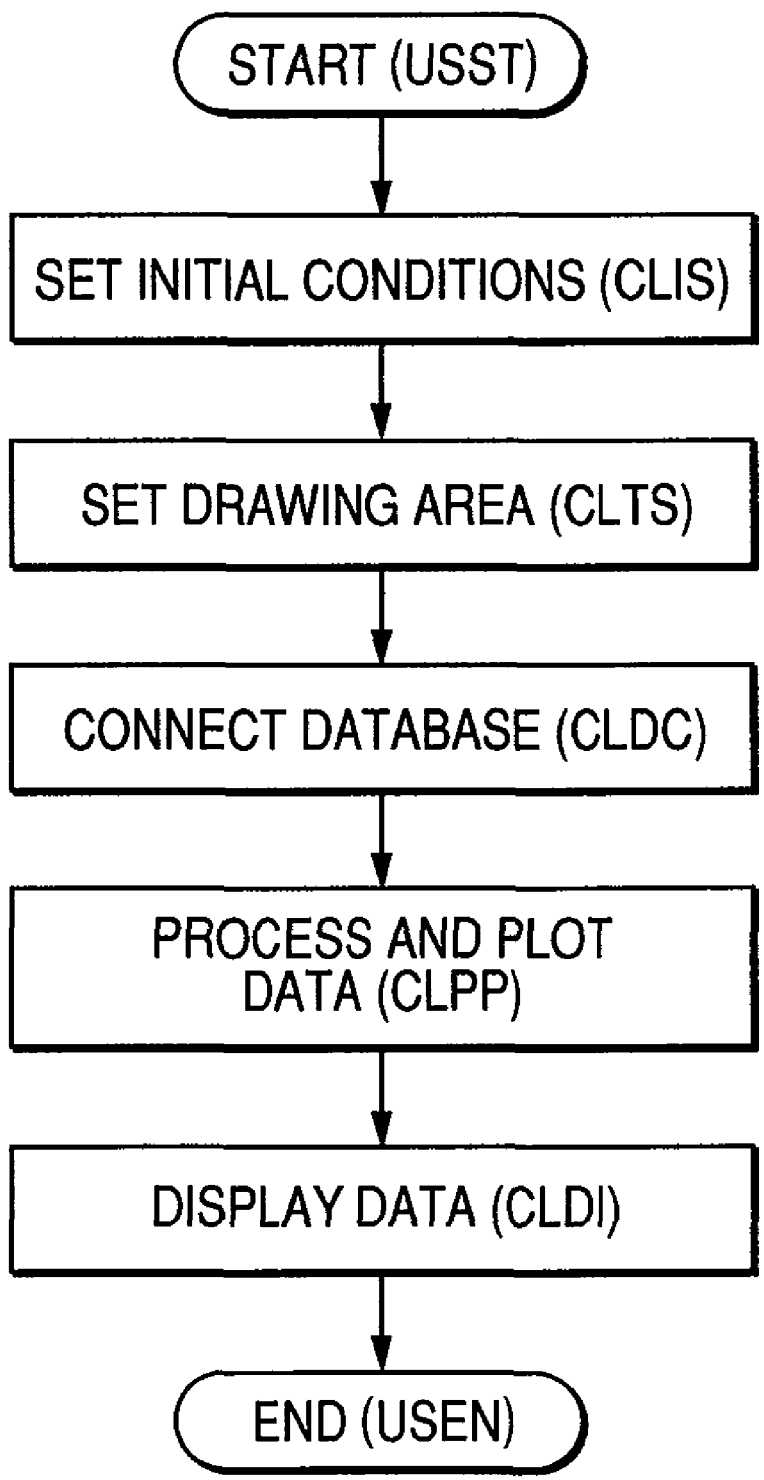
FIG. 15 is a flowchart of the processes for creating a display screen in the second embodiment of the present invention.

FIG. 15 shows a flowchart of the processes for creating a display screen in this second embodiment of the present invention.

There is only a difference between the processes shown in FIG. 15 and those shown in FIG. 5 in the first embodiment; the data processing (ASDP) and the data plotting (CLDP) are united into one, which is then substituted for the data processing/analyzing (CLPP) in this second embodiment.

Figure 16:
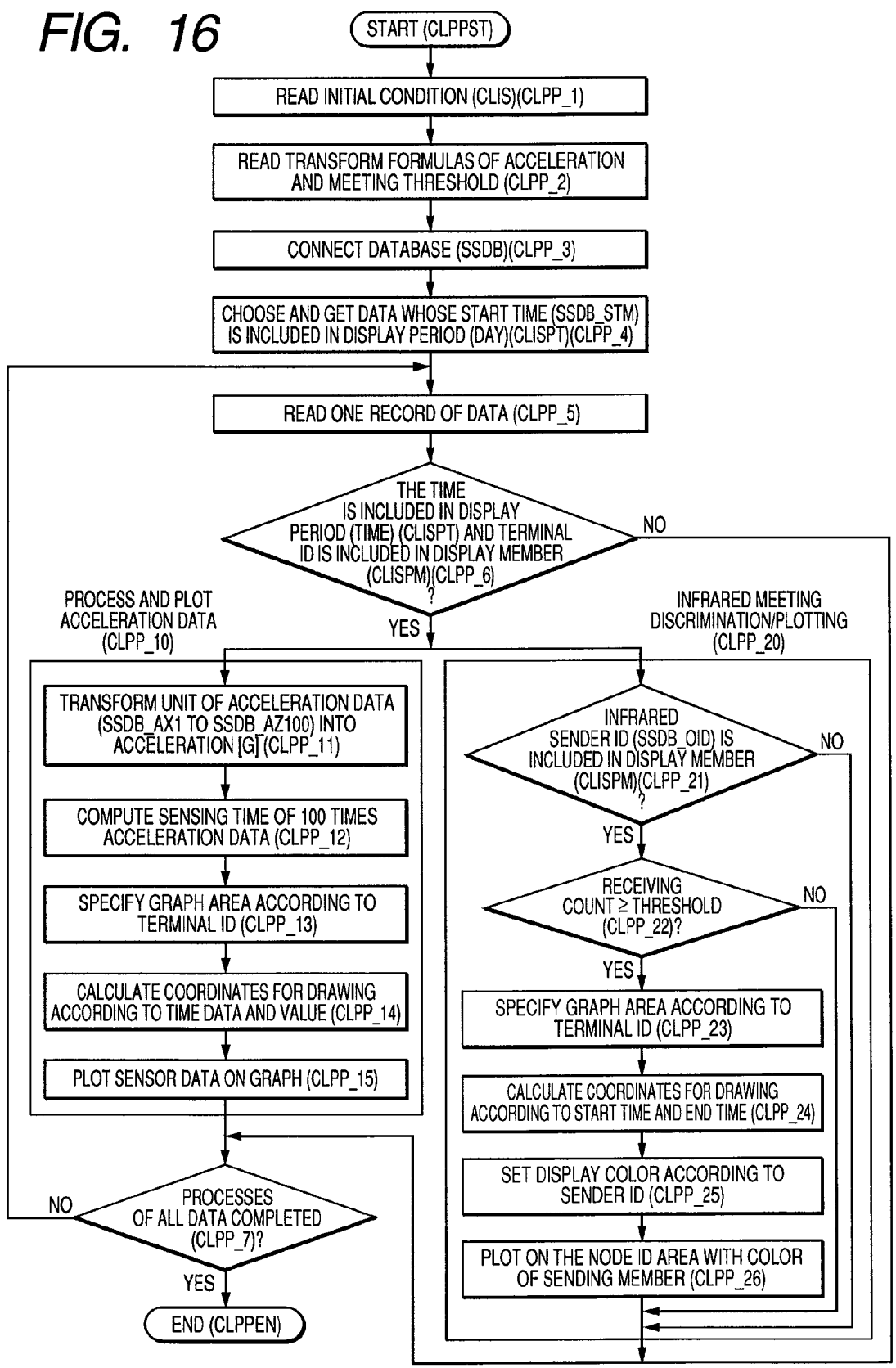
FIG. 16 is a flowchart of the processes for processing/analyzing data in the second embodiment of the present invention.

FIG. 16 shows a flowchart of the processes for processing/analyzing sensor data in this second embodiment of the present invention.

The processes shown in FIG. 16 are executed by the application unit (CLAP) of the client (CL) in this second embodiment as follows.

Upon starting a processing (CLPPST), the application unit (CLAP) reads the set initial condition (CLIS) on a window shown in FIG. 6 (CLPP_1). Then, the application unit (CLAP) reads the transform formulas of acceleration (CLME_ACC) and the meeting threshold (CLME_IRT) from the recording unit (CLME) (CLPP_2).

After that, the application unit (CLAP) connects the database (SSDB) of the storage unit (SS) (CLPP_3). The application unit (CLAP) then selects and obtains only the data having a start time (SSDB_STM) within a display period (CLISPT) set in the set initial condition (CLIS), from among the data stored in the database (SSDB) (CLPP_4).

After that, the application unit (CLAP) reads one record from the obtained data (CLPP_5). The application unit (CLAP) then goes to the processes of the acceleration data processing/plotting (CLPP_10) and the infrared meeting discrimination/plotting (CLPP_20) (CLPP_6) if the start time (SSDB_STM) and the end time (SSDB_ETM) included in the read record are within the range of the display time (CLISPT) set in the set initial condition (CLIS) and the terminal ID (SSDB_SID) denotes a display member (CLISPM). Otherwise, it means that the read record includes no data to be displayed. In this case, the application unit (CLAP) goes to step (CLPP_7) without processing and plotting the read record.

After that, the application unit (CLAP) executes two processes of the acceleration data processing/plotting (CLPP_10) and the infrared meeting discrimination/plotting (CLPP_20). Those processes may be executed in parallel or sequentially. If a sequential processing is selected, they may be executed in random order.

Hereunder, there will be described the acceleration data processing/plotting (CLPP_10) first. At first, the application unit (CLAP) converts the unit for 100 acceleration data (SSDB_AX1 to SSDB_AZ100) in each direction of the X, Y, and Z axes to acceleration [G] (CLPP_11). Then, the application unit (CLAP) counts the acceleration data sensing times (SSDB_STM) of the above 100 data in each axis direction backward from the start time (SSDB_STM) (CLPP_12). The processes in the above steps (CLPP_11) and (CLPP_12) may be executed similarly to the steps (ASDP_11) and (ASDP_12) shown in FIG. 9.

After that, the application unit (CLAP) specifies a plotting graph area according to the terminal ID (SSDB_SID) (CLPP_13). Then, the application unit (CLAP) calculates the drawing coordinates from the values of the time and acceleration data calculated in the steps (CLPP_11) and (CLPP_12) using the formula of the set drawing area (CLTS) stored in the recording unit (CLME). Then, the application unit (CLAP) plots the object acceleration data at a point denoted by the calculated coordinates (CLPP_15).

Next, there will be described the process of the infrared meeting discrimination/plotting (CLPP_20).

At first, the application unit (CLAP) decides whether or not the infrared sending ID (SSDB_OID) in the read record of data is included in a display member set in the set initial condition (CLIS) (CLPP_21). If it is included, the application unit (CLAP) goes to step (CLPP_22). If not, it means that the read record does not include any data to be displayed. In this case, the application unit (CLAP) goes to step (CLPP_7) without executing any processing/plotting for infrared data.

After that, the application unit (CLAP) compares the receiving count (SSDB_NIR) with the meeting threshold (CLME_IRT) (CLPP_22). If the receiving count (SSDB_NIR) is over the meeting threshold (CLME_IRT), the application unit (CLAP) decides that the terminal (TR) has faced another terminal (TR). In this case, the application unit (CLAP) executes the processes in steps (CLPP_23) to (CLPP_26) for plotting.

After that, the application unit (CLAP) specifies a plotting graph area according to the terminal ID (SSDB_SID) (CLPP_23). The application unit (CLAP) then calculates plotting coordinates from the start time (SSDB_STM) and the end time (SSDB_ETM) (CLPP_24). After that, the application unit (CLAP) sets a display color corresponding to the infrared sending ID (SSDB_OID) (CLPP_25). Then, the application unit (CLAP) plots infrared data (CLPP_26) by painting the band having the width between the start time (SSDB_STM) and the end time (SSDB_ETM) in the set display color in the area corresponding to the terminal ID (SSDB_SID).

Upon completing the processes for all the records read from the database (SSDB) (CLPP_7), the application unit (CLAP) executes the ending processing (CLPPEN). On the other hand, if not completing any of the processes for all the read records yet, the application unit (CLAP) reads the next one record of data (CLPP_5) and processes and plots the data as described above.

As described above, the client (CL) processes, plots, and displays object sensor data consecutively without using the application unit (CLAP) in this second embodiment of the present invention. Consequently, the memory capacity and the number of processes required for the system totally are reduced, thereby data is displayed in real time more efficiently.

Furthermore, because all the processing programs are stored in the client (CL), the user can display sensor data by changing setting and programs freely.

Next, there will be described a third embodiment of the present invention with reference to the accompanying drawings.

In the first embodiment, acceleration sensor data is displayed as activity data. In this third embodiment, however, data of acceleration, voice, etc. are processed using an action analysis algorithm and the analysis result is displayed. Action analysis means classifying a terminal (TR) movement (e.g., a terminal wearing member's action) into "walking", "seated", "talking", "static", etc. according to the acceleration data, etc. The analysis result (e.g., a classified action) is displayed in a color.

In this third embodiment, the method for sensing of meeting using an infrared ray is the same as that in the first embodiment. On the other hand, each action analysis result is displayed so as to be related to meeting data in this third embodiment. Consequently, each interaction state is analyzed more easily.

In this third embodiment, an area is created for each member (member). A sensing result of meeting is displayed in the upper portion in the area while an action sensing result analysis is displayed in the lower portion in the area. The areas corresponding to individual members such way are listed up vertically on the display screen (see FIG. 18A).

Figure 17:
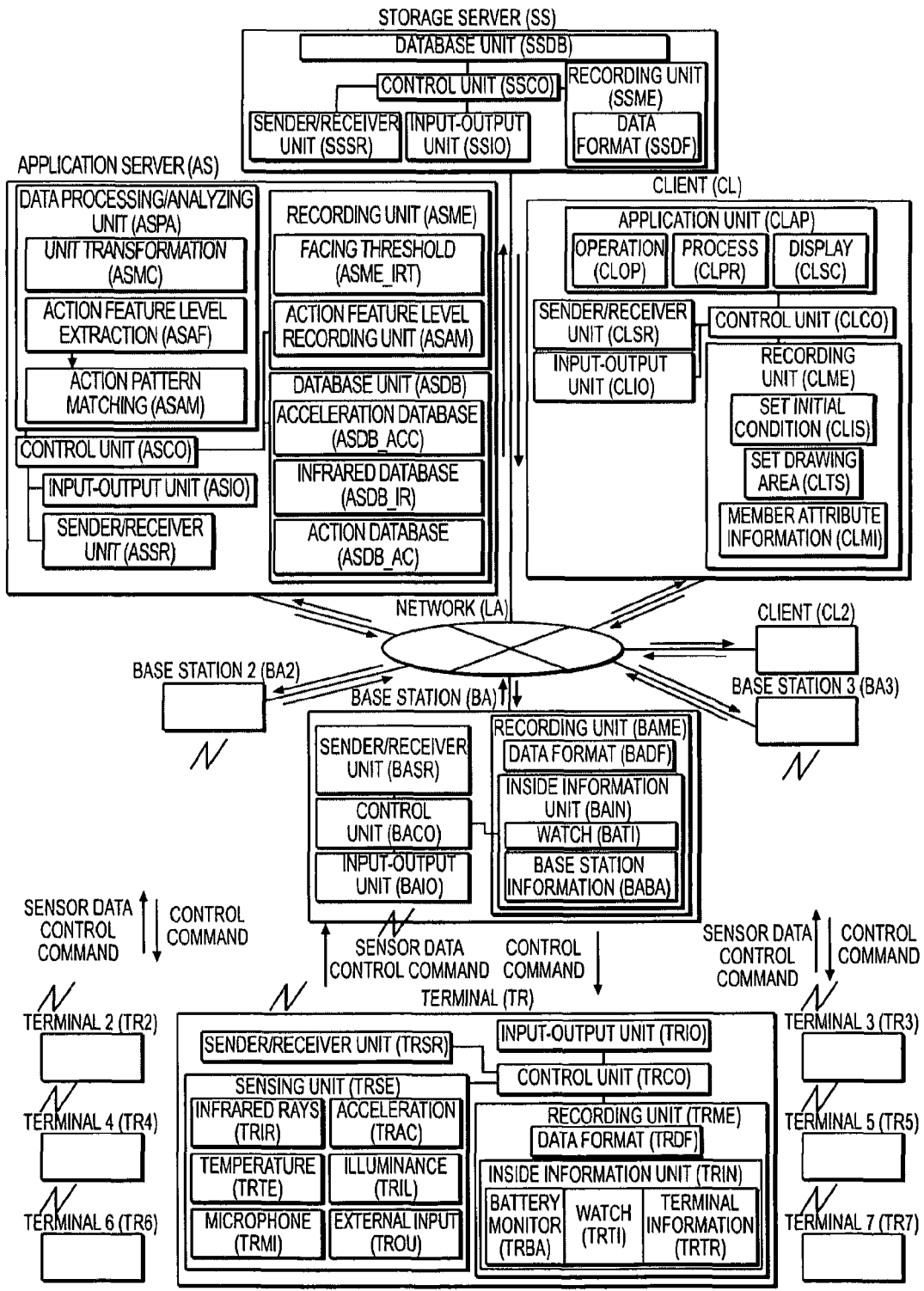
FIG. 17 is a diagram for describing an overall configuration of the system in a third embodiment of the present invention.

FIG. 17 shows an overall configuration of a system in this third embodiment of the present invention.

There is only a difference between the configuration shown in FIG. 17 and that shown in FIG. 1 in the first embodiment; some elements are added to the application server (AS) in this third embodiment.

The data processing unit (ASDP) provided in the application server (AS) (FIG. 1) is substituted for a data processing/analyzing unit (ASPA) in this third embodiment. In addition to the unit transformation (ASMC), the data processing/analyzing unit (ASPA) includes processes of the action feature abstraction (ASAF) and the feature matching (ASAM). Although not shown in FIG. 17, the data processing/analyzing unit (ASPA) may also execute the meeting discrimination (ASFD) just like the data processing unit (ASDP).

Similarly to the data processing unit (ASDP), the data processing/analyzing unit (ASPA) may be substituted for a program (not shown) stored in the recording unit (ASME) and executed by the CPU (not shown) of the control unit (ASCO). In this case, the CPU of the control unit (ASCO) comes to execute actually the processes having been executed by the data processing/analyzing unit (ASPA).

An action characteristic level memory (ASAM) is added to the recording unit (ASME) while an action database (ASDB_AC) is added to the database unit (ASDB) in this third embodiment.

Those added here are all used for action analysis.

Figure 18A:
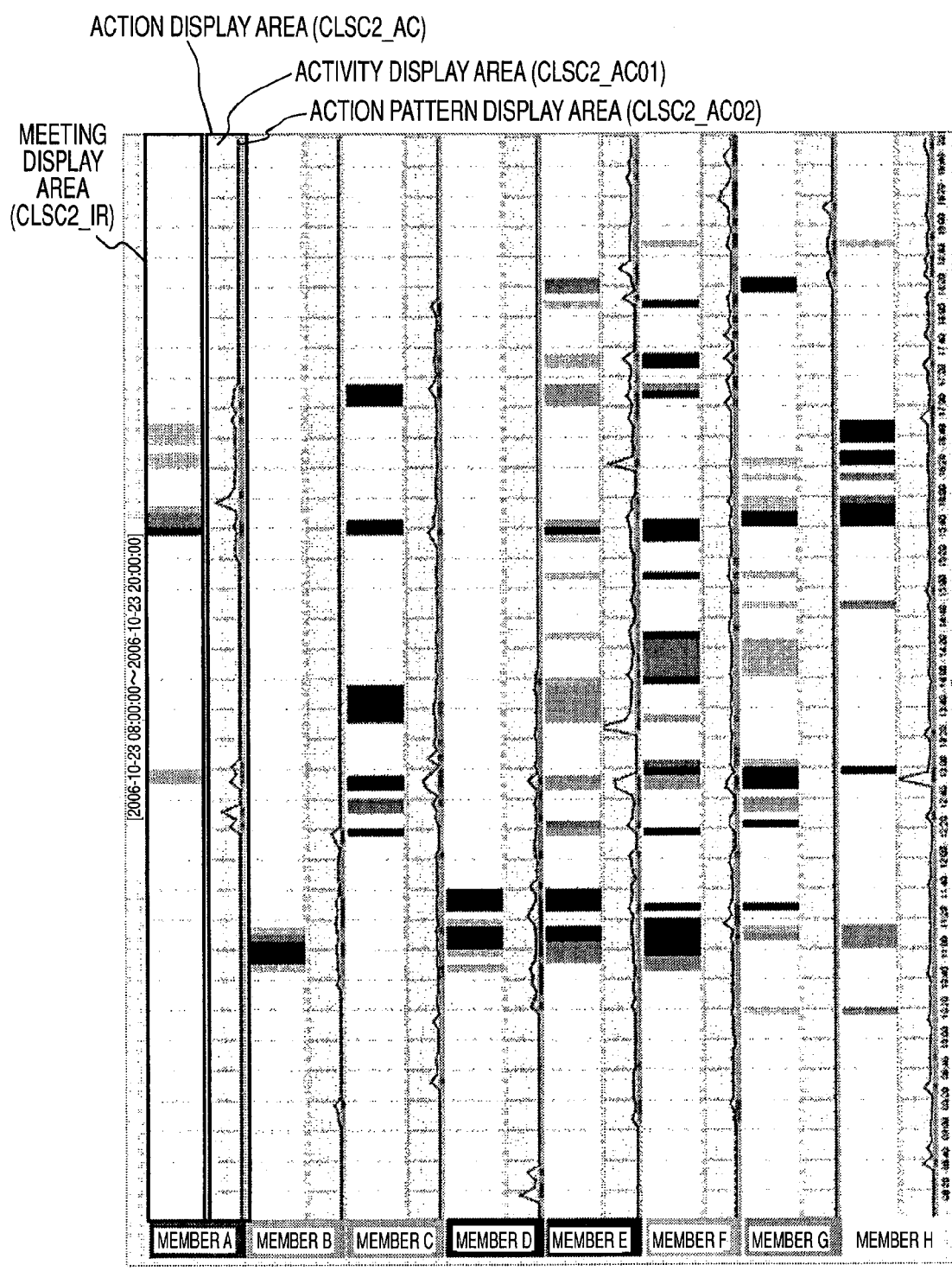
FIG. 18A is a diagram for describing an example of a display screen in the third embodiment of the present invention.

FIG. 18A shows an example of a display screen in this third embodiment of the present invention.

FIG. 18A differs from FIG. 4A in that data for only one day is displayed and data of both meeting and activity are arranged vertically. Meeting data and activity data are related to each other on the screen similarly to FIG. 4A.

In FIG. 18A, the horizontal axis is a time axis used commonly for the meeting data and for the activity data of each member. The graph area for one member consists of an upper meeting display area (CLSC2_IR) and a lower action display area (CLSC2_AC). The meeting display area (CLSC2_IR) displays meeting data and the action display area (CLSC2_AC) displays activity data. As described above, the graph areas for those members are listed up vertically, thereby meeting data and activity data for a plurality of members are displayed on a common time axis. Consequently, interaction data (meeting data and activity data) of one member are displayed so as to be related to each other according to time information. Furthermore, each member's interaction data is displayed so as to correspond to others. And each member's interaction data is displayed so as to be related to those of others according to time information.

The action display area (CLSC2_AC) consists of an activity value display area (CLSC2_AC01) and an action pattern display area (CLSC2_AC02). The activity value display area (CLSC2_AC01) displays a line graph for an activity value calculated from acceleration data. The activity value will be described later in detail in a fifth embodiment. The action pattern display area (CLSC2_AC02) displays a band graph in a color for each action pattern (e.g., an action classified according to acceleration data, etc.) obtained as a result of action analysis. Hereunder, there will be described in detail the display of each area described above, as well as analysis to be made according to the display with reference to FIG. 18B.

Figure 18B:
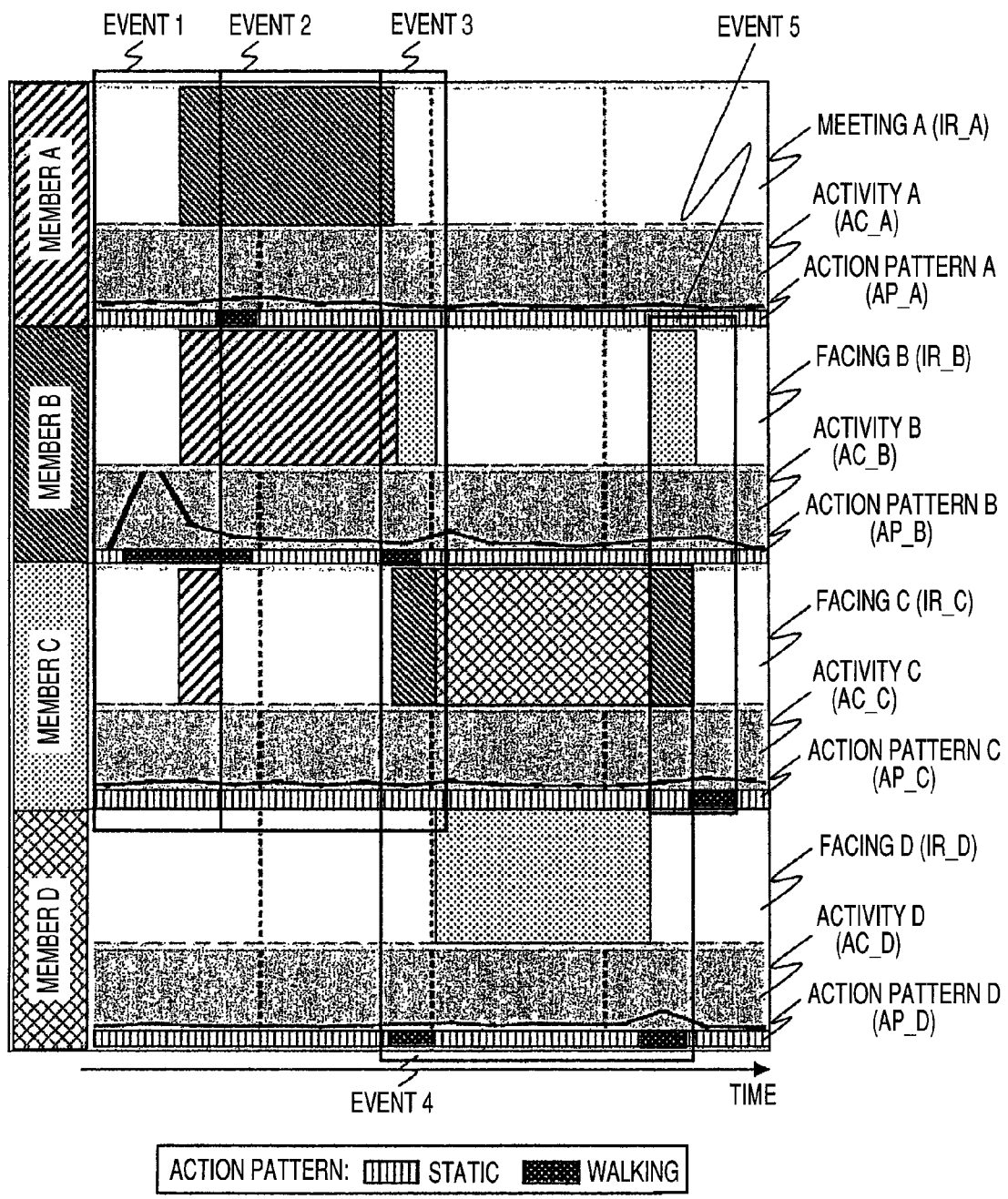
FIG. 18B is a diagram for describing an example of an organization dynamics analysis in the third embodiment of the present invention.

FIG. 18B shows an example of dynamics analysis of an organization in the first embodiment of the present invention.

Concretely, FIG. 18B shows a partially expanded view of FIG. 18A for detailed description. The area of the member A includes elements of meeting A (IR_A), activity value A (AC_A), action pattern A (AP_A) corresponding to the meeting display area (CLSC2_IR), activity value display area (CLSC_AC01), and action pattern display area (CLSC2_AC02) shown in FIG. 18A respectively. Similarly, the area of the member B includes elements of meeting B (IR_B), activity value B (AC_B), action pattern B (AP_B) and an area of the member C includes elements of meeting C (IR_C), activity value C (AC_C), and action pattern C (AP_C). The area of the member D includes elements of meeting D (IR_D), activity value D (AC_D), and action pattern D (AP_D). FIG. 18B shows the areas of only four members for description.

Action patterns A (AP_A) to D (AP_D) are displayed in respective colors classified according to the acceleration data, etc. In the example in FIG. 18B, each member's state (static or walking) is displayed.

Next, there will be described organization dynamics to be read from the display in FIG. 18B.

At first, in an event 1, the activity value (AC_B) of the member B rises, thereby the action pattern B (AP_B) of the member B denotes "walking". The meeting display B (IR_B) denotes that the member B is meeting the member A. And because the color of the member A also appears in meeting display C (IR_C), it is understood that the member C is also meeting the member A. In other words, the three members A, B, and C are together at this time. Consequently, it is understood that the member B, walking to the members A and C, has begun a conversation with them (event 1). Here, if infrared rays are received from a plurality of IDs at one sensing interval, the color of the member in the upper area is displayed preferentially. Therefore, the information denoting the meeting between the members B and C is not displayed in FIG. 18B.

In the event 2, the members A and B are meeting each other and walking together. Consequently, it is understood that the two members, moving together, have begun a conversion in another place (event 2).

Furthermore, in the event 3, the member B, walking again, has met the member C (event 3).

And almost in the same time band as that of the event 3, the member D is walking. After that, the member D meets the member C just when the member B has left. Then, the member D begins walking. Consequently, it is understood that the member D talks to the member C over a business matter and has gone away upon ending the business talk (event 4).

Finally, in the event 5, it is understood that the member C meets the member B for a while again, then walks away (event 5).

From a flow of those events, it is understood that a series of the events is started by the movement of the member B and four members A to D involve in the chained events, thereby the dynamics of the organization is analyzed.

Figure 19:
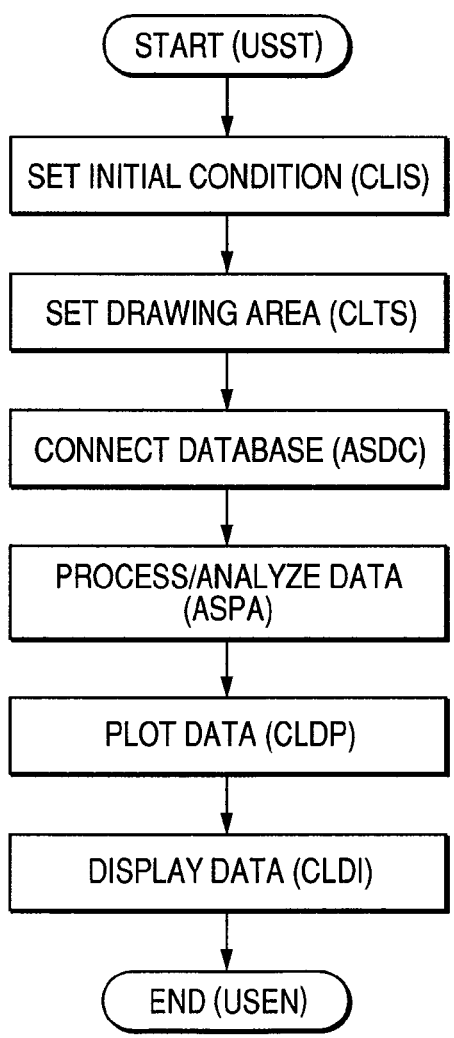
FIG. 19 is a flowchart of the processes for creating a display screen in the third embodiment of the present invention.

FIG. 19 shows a flowchart of the processes for creating a display screen in the third embodiment of the present invention.

There is only a difference between FIG. 19 and FIG. 5; the process of the data processing (ASDP) is substituted for the process of the data processing/analyzing (ASPA) in FIG. 19.

Next, there will be described the process of the data processing/analyzing (ASPA).

Figure 20:
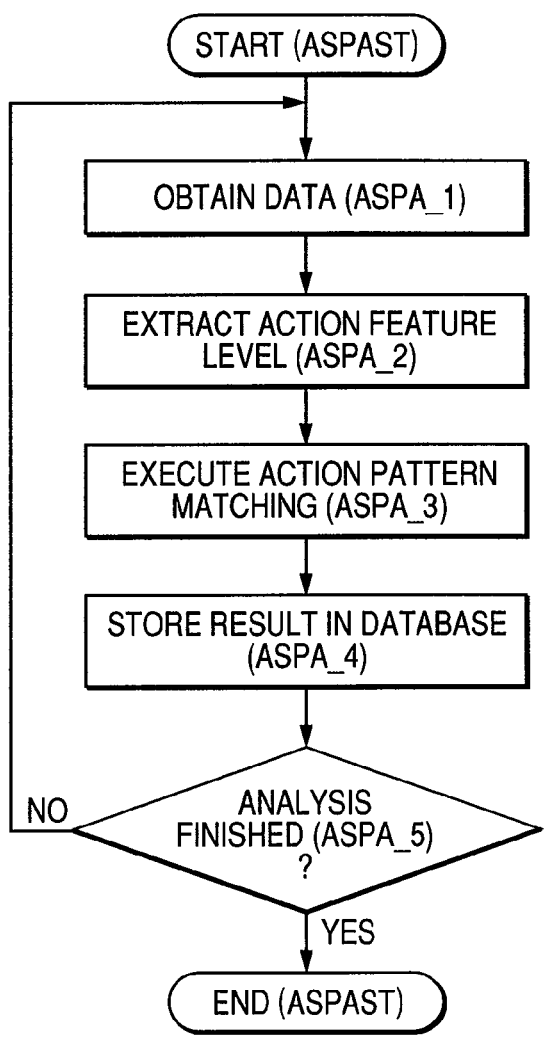
FIG. 20 is a flowchart of the processes for processing/analyzing data in the third embodiment of the present invention.

FIG. 20 shows a flowchart of the data processing/analyzing (ASPA) executed in this third embodiment of the present invention.

The data processing/analyzing unit (ASPA) in the application server (AS) shown in FIG. 17 executes the processes shown in FIG. 20. The sensing of meeting in this third embodiment is the same as that in the first embodiment, so that the description will be omitted here. As for the processes shown in FIG. 20, therefore, there will be described only the action analysis.

Upon starting a processing (ASPAST), the data processing/analyzing unit (ASPA) connects the database unit (SSDB) of the storage server (SS) to obtain necessary data for a predetermined section so as to analyze an action such as acceleration, voice, or the like (ASPA_1). Then, the data processing/analyzing unit (ASPA) extracts the action characteristic level from the obtained data (ASPA_2). Any of the existing methods may be used for extracting the characteristic level. After that, the data processing/analyzing unit (ASPA) compares the extracted action characteristic level with that stored in the action characteristic level memory (ASME) provided in the recording unit (ASME) to make pattern matching between those levels (ASPA_3). And the action of the terminal (TR) wearing member is classified into "walking", "static", or the like according to the pattern matching result.

The action characteristic level stored in the memory (ASAM) provided in the recording unit (ASME) may be existing one.

After that, the processing/analyzing unit (ASPA) stores the analysis result (e.g., classified action information) output after the pattern matching in the action database unit (ASDB_AC) of the application server (AS) (ASPA_4).

The data processing/analyzing unit (ASPA), upon completing the analysis of all the data, exits the processing (ASPAEN). When not completing all data analyses yet, the data processing/analyzing unit (ASPA) obtains the data for the next predetermined section from the database unit (SSDB) (ASPA_1) and repeats the processes described above (ASPA_5).

FIG. 21 shows an action database unit (ASDB_AC) in the third embodiment of the present invention.

The action database unit (ASDB_AC) includes elements of start time (ASDB_AC_STM), end time (ASDB_AC_ETM), terminal ID (ASDB_AC_SID), action (walking) (ASDB_AC1), action (seated) (ASDB_AC2), and action (standing) (ASDB_AC3).

The action (walking) (ASDB_AC1) denotes a walking state count as a result of the action analysis of the data sensed by a terminal (TR) denoted by the terminal ID (ASDB_AC_SID) between the start time (ASDB_AC_STM) and the end time (ASDB_AC_ETM). Similarly, the action (seated) (ASDB_AC2) denotes a seated state count decided from the subject action and the action (standing) (ASDB_AC3) denotes a standing state count decided from the subject action.

Another action analysis algorithm may be added or the current algorithm may be changed for the procedure of the data processing/analyzing (ASPA). Furthermore, in accordance with the addition or change of the action analysis algorithm, the display method can be changed. The elements related to the actions set in the action database unit (ASDB_AC) may also be changed, added, or deleted as needed. For example, an action (static) element may be added to the database unit (ASDB_AC).

One record of data (e.g., RE01) shown in FIG. 21 is generated from one record of data (e.g., RE01) shown in FIG. 8. It is also possible to generate one action database record from a plurality of records shown in FIG. 8.

In the above third embodiment, a sensing result of meeting of each member and an action analysis result are related to each other in the display. Consequently, each member's action can be grasped intuitively. This is why it is easy to find who spoke to whom. In other words, it is possible to trace an interaction started with a member's action and how it induced other interactions consecutively from member to member just like a message sending game, as well as how a member walked around in a room to adjust opinions among members. This is why the elements of the organization dynamics have come to be found and analyzed according to the sensor data of the members in a subject organization.

Next, there will be described a fourth embodiment of the present invention with reference to the accompanying drawings.

In the first embodiment, all the counted sensor data are plotted. On the other hand, in this fourth embodiment, sensor data is averaged and averaged sensor data is displayed. This averaging processing is required particularly for collectively displaying the data sensed at short intervals just like acceleration data and collected for a long period. This is to avoid an increase of the memory load when the number of data to be plotted increases. And if it is expected that sensor data is to be displayed/printed out on a general PC display screen/A4-size paper, the intervals of the plotted points become finer beyond the human's sense of sight and the resolution of printers. Thus there is no need to plot every sensor data faithfully. This is why data is averaged when there are many data, thereby the number of plotting processes is reduced in this fourth embodiment. As a result, the memory load is reduced and the total plotting time is reduced.

In this fourth embodiment, there will be described an example of the averaging processing executed for each integral multiple of 100 acceleration data samples. Here, it is also possible to set the number of samples freely for the acceleration data to be averaged. Furthermore, the same processing can also apply to averaging of numerical data in other types than acceleration as needed.

Figure 22:
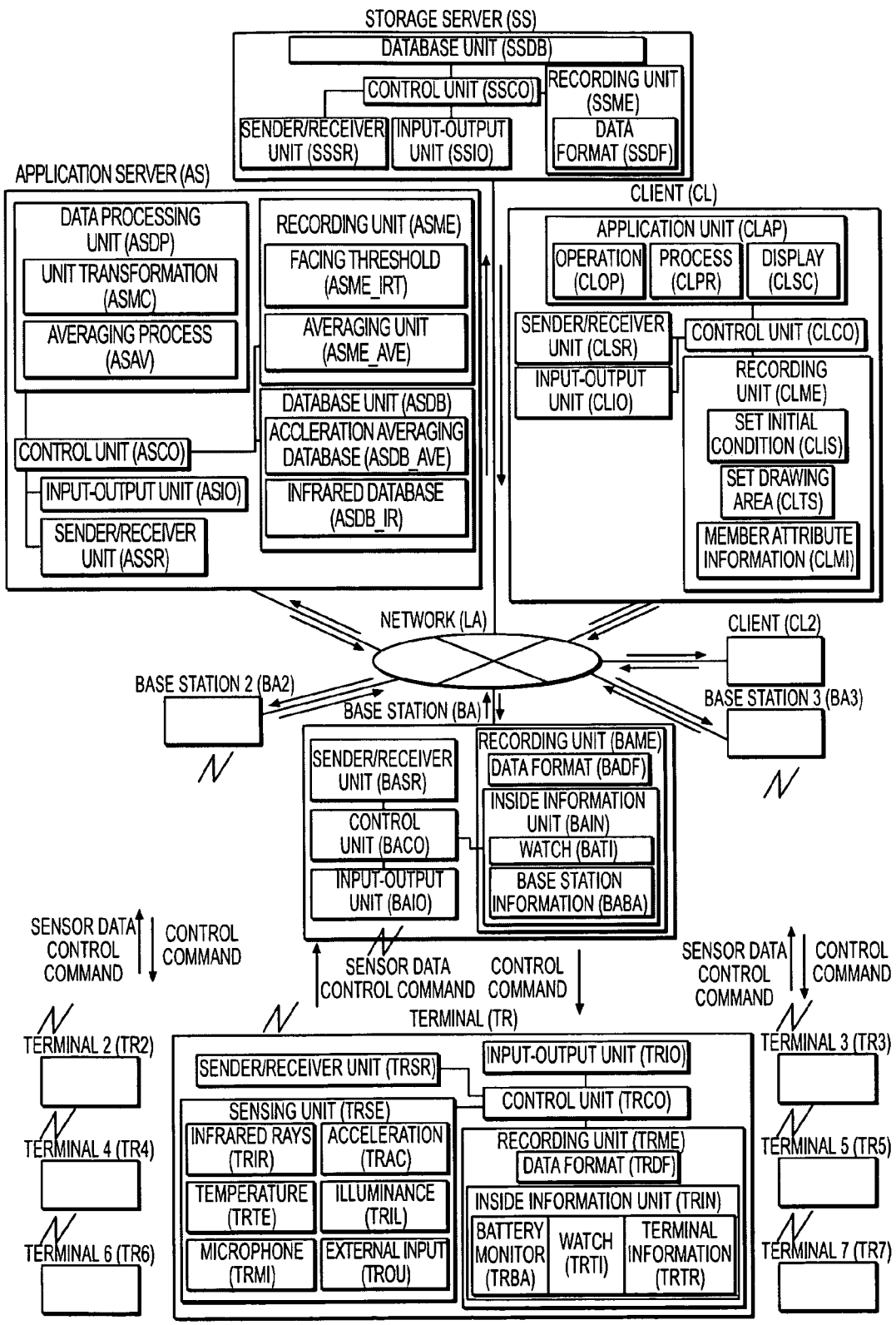
FIG. 22 is a diagram for describing an overall configuration of a system in a fourth third embodiment of the present invention.

FIG. 22 shows an overall configuration of a system in a fourth embodiment of the present invention.

There is only a difference between the configuration shown in FIG. 22 and the overall system configuration shown in FIG. 1 in the first embodiment; some elements are added to the application server (AS) in this fourth embodiment.

Concretely, an averaging processing (ASAV) is added to the data processing unit (ASDP) provided in the application server (AS) in this fourth embodiment. Furthermore, a unit of averaging (ASME_AVE) is added to the recording unit (ASME) and acceleration averaged data (ASDB_AVE) is added to the database unit (ASDB) respectively.

Those added in this embodiment are all used for averaging processes.

Figure 23:
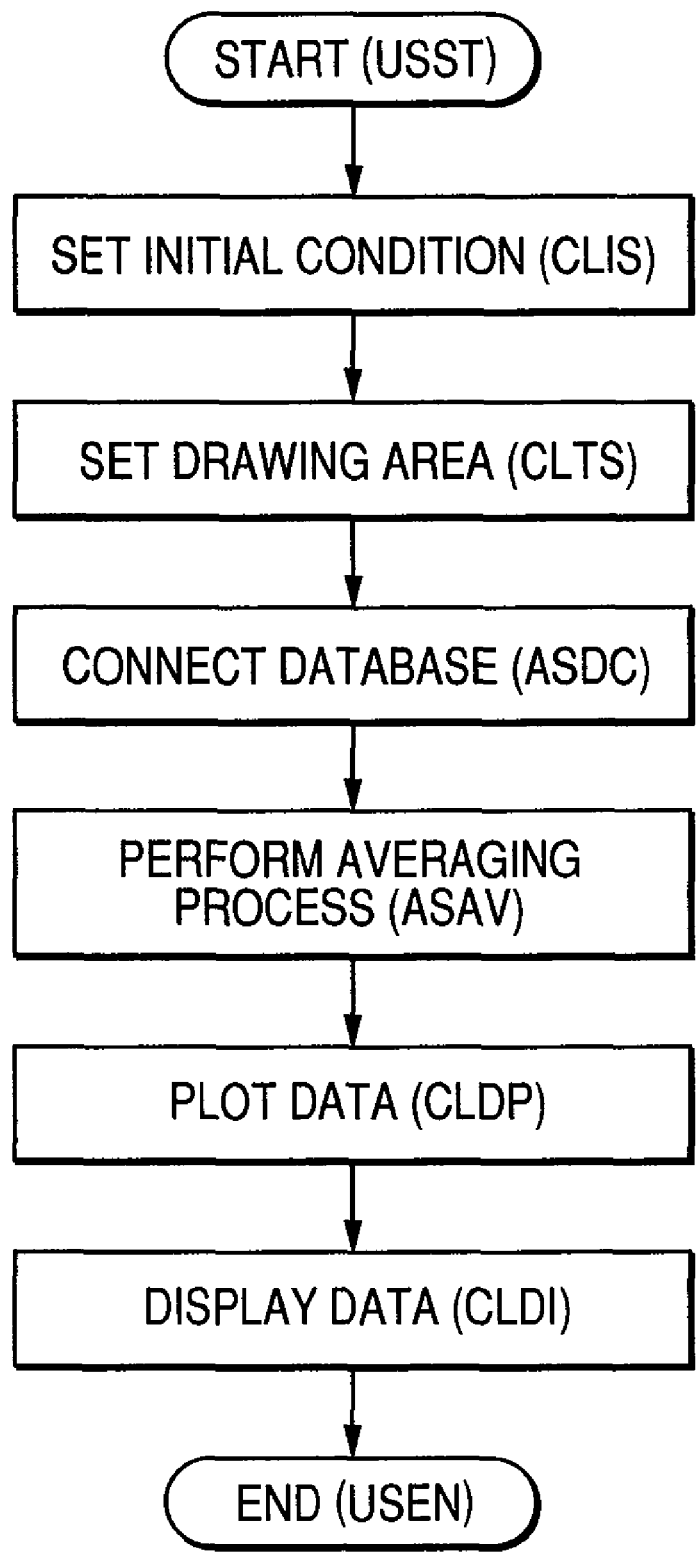
FIG. 23 is a flowchart of the processes for creating a display screen in the fourth embodiment of the present invention.

FIG. 23 shows a flowchart of the processes for creating a display screen in the fourth embodiment of the present invention.

The processes shown in FIG. 23 differ from those shown in FIG. 5 in the first embodiment only in that the data processing (ASDP) is substituted for the averaging processing (ASAV).

The sensing processes of meeting are the same as those in the first embodiment, so that the description will be omitted here. Hereunder, therefore, only the averaging processing (ASAV) for acceleration data will be described.

Figure 24:
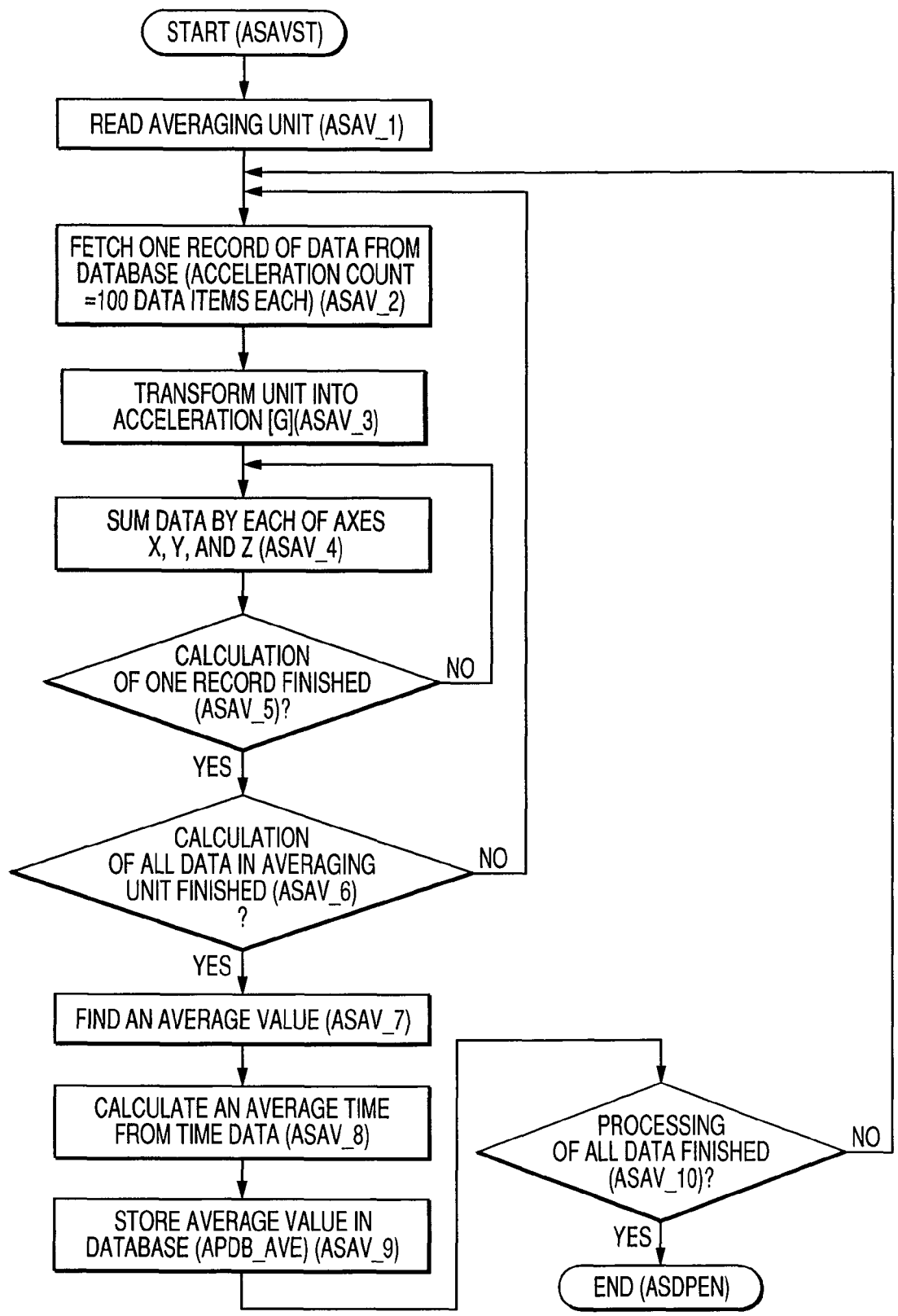
FIG. 24 is a flowchart of the processes for averaging in the fourth embodiment of the present invention.

FIG. 24 shows a flowchart of the averaging processing (ASAV) executed in this fourth embodiment of the present invention.

Upon starting a processing (ASAVST), the data processing unit (ASDP) reads the unit of averaging (ASME_AVE) from the recording unit (ASME) (ASAV_1).

The unit of averaging (ASME_AVE) means a value obtained by dividing the number of data (samples) to be processed in an averaging processing by 100. For example, if the unit of averaging (ASME_AVE) is "1", a value obtained by multiplying "1" by 100, that is, 100 acceleration data are processed in an averaging processing. If acceleration data includes contents in each direction of the three X, Y and Z axes, 100 data in each axis direction are processed in an averaging processing. In this case, the total sum of the 100 data of acceleration data in each axis direction is divided by 100 to obtain averaged acceleration data. 100 acceleration data are equivalent to one record of acceleration data in the database unit (SSDB).

After that, the data processing unit (ASDP) connects the database unit (SSDB) of the storage server (SS) to obtain each record of data sequentially in order of the start time series (SSDB_STM) (ASAV_2). One record of data includes 100 acceleration data in each direction of the X, Y, and Z axes.

The data processing unit (ASDP) then converts the unit of the obtained data to the acceleration unit [G] (ASAV_3). This method for transform formulas of acceleration is the same as that in the first embodiment.

After that, the data processing unit (ASDP) adds up the unit-converted data sequentially in each direction of the X, Y, and Z axes (ASAV_4). Ending the calculation for the one record (100 data) (ASAV_5), the data processing unit (ASDP) takes out the next one record of data and repeats the above processes. Ending the calculation for all the data denoted by the unit of averaging (ASAV_AVE) (ASAV_6), the data processing unit (ASDP) goes to step (ASAV_7). At this time, the data processing unit (ASDP) takes out those data sequentially in order of the start time series (SSDB- _STM), thereby data stored in the database unit (SSDB) is averaged rightly even when those data are not arranged in order of time series.

After that, the data processing unit (ASDP) divides the total value in each axis direction by 100 of the unit of averaging (ASME_AVE), respectively, that is, the total number of data, thereby finding an average value of the acceleration in each axis direction (ASAV_7).

Then, the data processing unit (ASDP) adds one second to a value obtained by dividing the sum of the oldest data start time and the newest data start time by 2, thereby obtaining an average time (ASAV_8). And because acceleration data is sensed 100 times for two seconds just after the last time is stamped, the above calculation is effective to obtain the average time.

After that, the data processing unit (ASDP) collects the average time and the average acceleration in each direction of the X, Y, and Z axes into one record and stores the record in the acceleration averaging database (ASDB_AVE) of the application server (AS (ASAV_9).

The data processing unit (ASDP), upon completing all the data processes, exits the processing (ASAVEN). If any of the data processes is not completed yet, the data processing unit (ASDP) repeats the processes in and after the process of the data obtaining (ASAV_2) (AVAV_10).

FIG. 25 shows a diagram for describing an acceleration averaging database (ASDB_AVE) in this fourth embodiment of the present invention.

The acceleration averaging database (ASDB_AVE) includes elements of average time (ASDB_AVE_TM), terminal ID (ASDB_AVE_SI), acceleration x (ASDB_AVE_X), acceleration y (ASDB?AVE_Y), and acceleration z (ASDB_AV_Z).

If the unit of averaging is "1", the averaging result of the one record (e.g., RE01) of acceleration data shown in FIG. 8 is stored in one record (e.g., RE01) in FIG. 25. If the unit of averaging is "n", the "n" records of data shown in FIG. 8 is averaged and the result is stored in one record shown in FIG. 25.

Next, there will be described a method for setting a unit of averaging (ASME_AVE). The unit of averaging (ASME_AVE) may be determined automatically or determined by the user in the process of the set initial condition with reference to the following description. The unit of averaging (ASME_AVE) determined automatically or by the user is stored in the recording unit (ASME).

If the unit of averaging (ASME_AVE) is too large, data is smoothed, thereby no data change characteristic appears in the graph. On the other hand, if the unit of averaging (ASME_AVE) is too small, the memory load cannot be reduced. Consequently, a proper value should be set as the unit of averaging (ASME_AVE).

In this fourth embodiment, therefore, plotting intervals are calculated according to the width of the graph area and the length of the time axis for the subject display data, thereby setting a proper value as the unit of averaging. For example, it is assumed that the minimum value of the plotting intervals decidable by human beings is defined as 0.1 millimeter and the maximum value of the plotting intervals of which changes appear smoothly is defined as 0.5 millimeters and the sizes of individual dots on the subject display screen or upon printing out are decided so that the plotting intervals are set within that range. And it is assumed that the width of the display graph area is defined as B_length (mm) and the width of the display time is defined as B_time (hour) and those values are set by the user in the set initial condition process.

The number of original data is 100 per 10 seconds, that is, B_time×36000 data. If averaging is made for each group of K_average×100 data, the number of data to be plotted will be calculated as follows: (B_time×36000)/(K_average×100) =360×B_time/K_average (Formula 1)

At this time, the plotting intervals are calculated as follows:

$$B\_lngth/(\text{number of data to be plotted}) = (B\_length \times K\_average)/(360 \times B\_time) \quad \text{(Formula 2)}$$

In order to assume 0.1 to 0.5 as the plotting intervals, the unit of averaging (K_average) should be selected to satisfy (36×B_time/B_length)<K_average<(180×B_time/B_length) (Formula 3)

Then, the object drawing will be made almost properly.

For example, if it is assumed that the width (B_length) of the display graph area is 200 mm, the minimum and maximum values of the unit of averaging (K_average) and a proper unit of averaging assumed at that time will be as shown in Table 1 shown below.

TABLE 1

| Standards for Selecting a Unit of Averaging (at Graph Area Width = 200 mm) | | | | | | | | |
|---|---|---|---|---|---|---|---|---|
| | Display Time Width (hour) | | | | | | | |
| | 1 | 2 | 3 | 4 | 5 | 6 | 7 | 8 |
| Minimum Value of Unit of Averaging | 0.18 | 0.36 | 0.54 | 0.72 | 0.90 | 1.08 | 1.26 | 1.44 |
| Maximum Value of Unit of Averaging | 0.9 | 1.8 | 2.7 | 3.6 | 4.5 | 5.4 | 6.3 | 7.2 |
| Range of Unit of Averaging | 0 (not averaged) | 1 | 1-2 | 1-3 | 1-4 | 2-5 | 2-6 | 2-7 |

By executing the averaging processing in the above fourth embodiment as described above, memory-over error occurrence is prevented. Consequently, long time data display is enabled. Furthermore, the displaying time is reduced.

Next, there will be described a fifth embodiment of the present invention with reference to the accompanying drawings.

In the first embodiment, acceleration data in each direction of the X, Y, and Z axes are processed and plotted as member's activity information. In this fifth embodiment, in addition to those acceleration data, activity values are calculated and processed. An activity value means a scale of a terminal (TR) in movement (e.g., an index denoting a scale of a movement of a terminal (TR) wearing member). As described above, acceleration data is sensed in three axis directions, so that complicated data analysis is possible. On the other hand, it is difficult to grasp changes of acceleration data intuitively. This is why activity calculation and its graph display are added to this fifth embodiment to represent the scale of a simple movement.

Furthermore, instead of such activity values, zero-cross calculation may be employed. The zero-cross calculation is also made to find an index denoting a scale of a terminal (TR) in movement. Another type of formula is used for the zero-cross calculation. The zero-cross processing flow except for the formula is the same as that of the activity value processing. Whether to employ the activity value or zero-cross is selected at the start of the processing flow. Both activity value and zero-cross may also be calculated.

Figure 26:
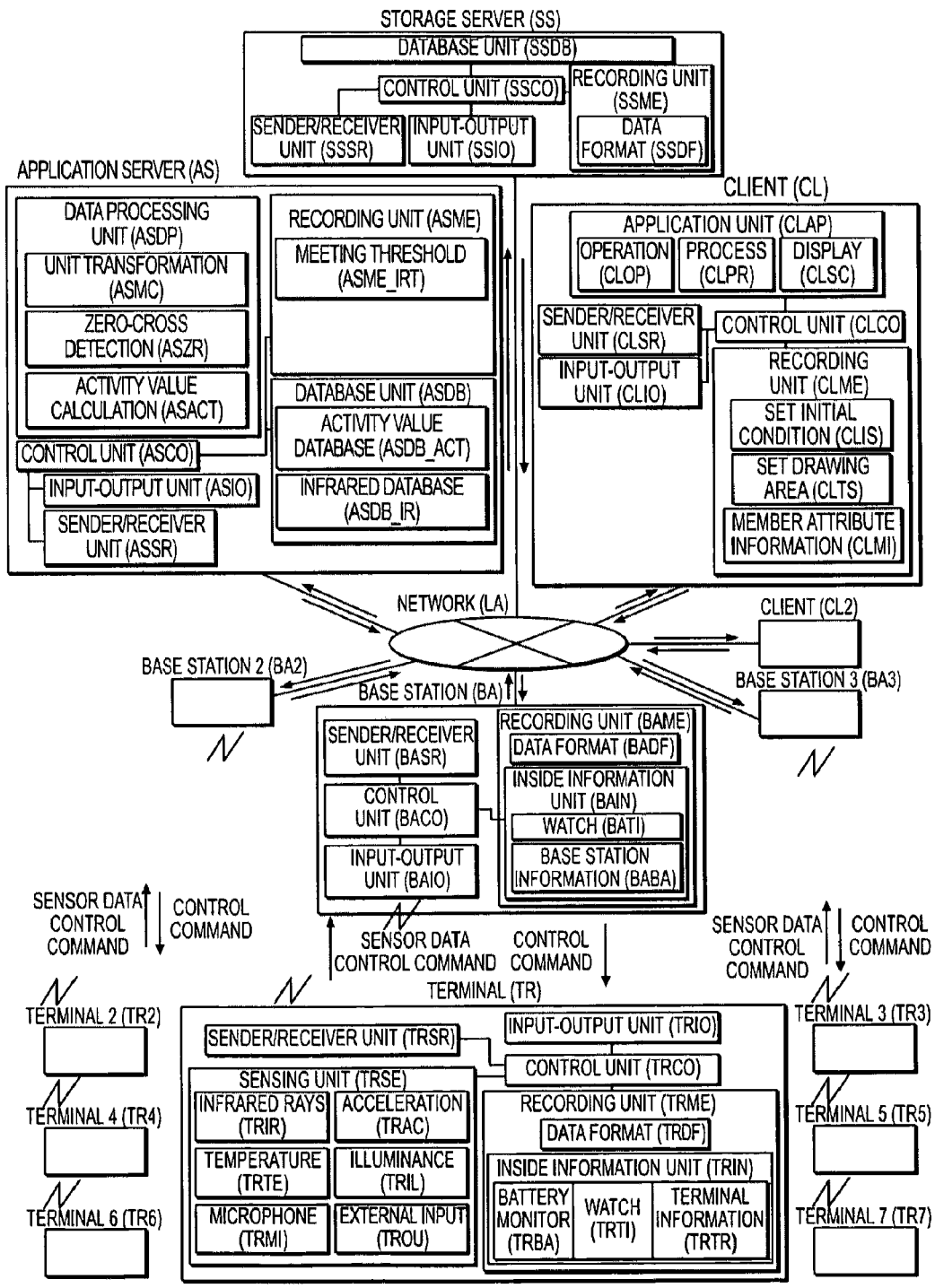
FIG. 26 is a diagram for describing an overall configuration of a system in a fifth third embodiment of the present invention.

FIG. 26 shows an overall configuration of a system in this fifth embodiment of the present invention.

There is only a difference between the configuration shown in FIG. 26 and the configuration shown in FIG. 1 in the first embodiment; some elements are newly added to the application server (AS) in this fifth embodiment.

Concretely, in the application server (AS) in this fifth embodiment, the data processing unit (ASDP) is provided newly with an activity value processing (ASAV) and a zero-cross processing (ASZR). Furthermore, the database unit (ASDB) is newly provided with an activity value database (ASDB_ACT).

Those added in this fifth embodiment are all used for activity value or zero-cross calculation.

Figure 27:
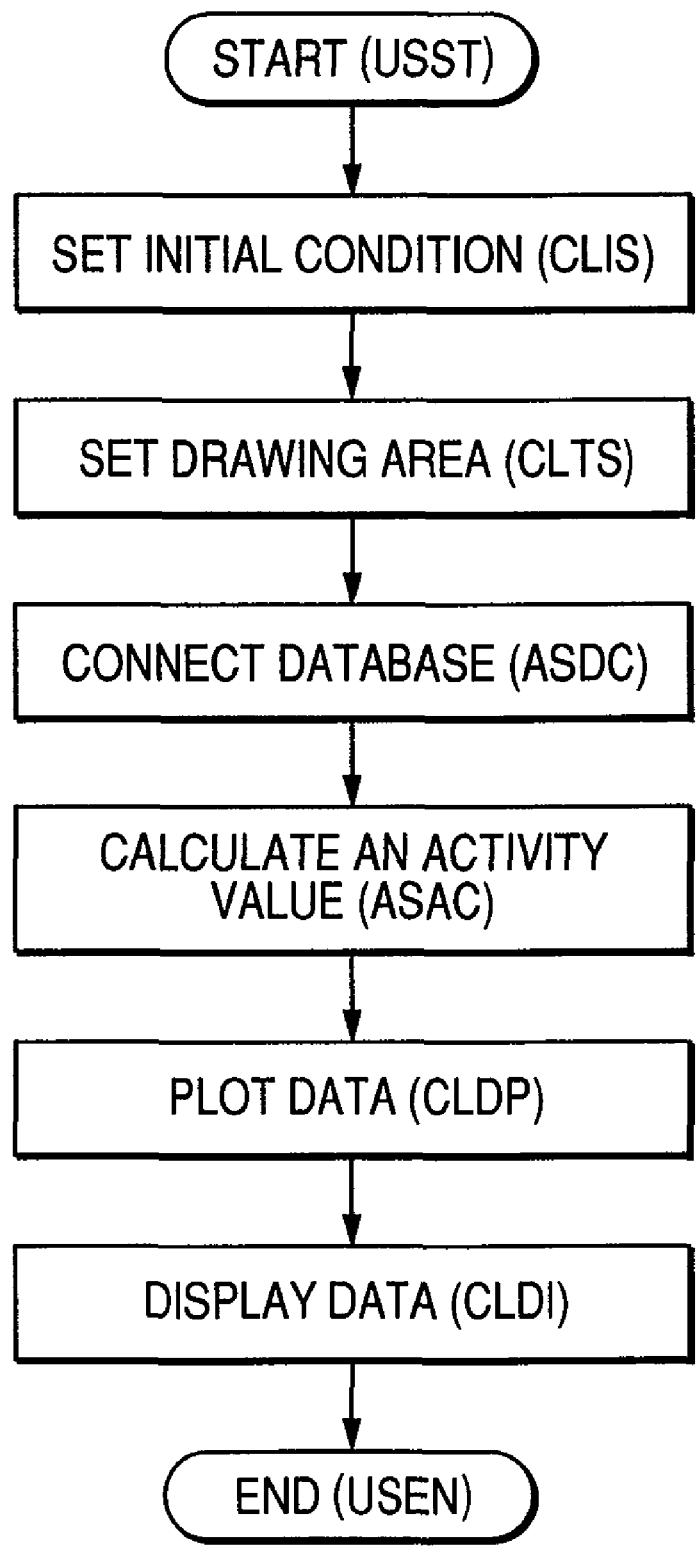
FIG. 27 is a flowchart of the processes for creating a display screen in the fifth embodiment of the present invention.

FIG. 27 shows a flowchart of the processes for creating a display screen in this fifth embodiment of the present invention.

There is only a difference between the flowchart in FIG. 27 and that in FIG. 5 in the first embodiment; the data processing (ASDP) is replaced with the activity value calculation (ASAC) in this fifth embodiment.

The sensing processes of meeting are the same as those in the first embodiment, so that the description will be omitted here. Therefore, there will be described only the activity value calculation (ASAC) below.

Figure 28:
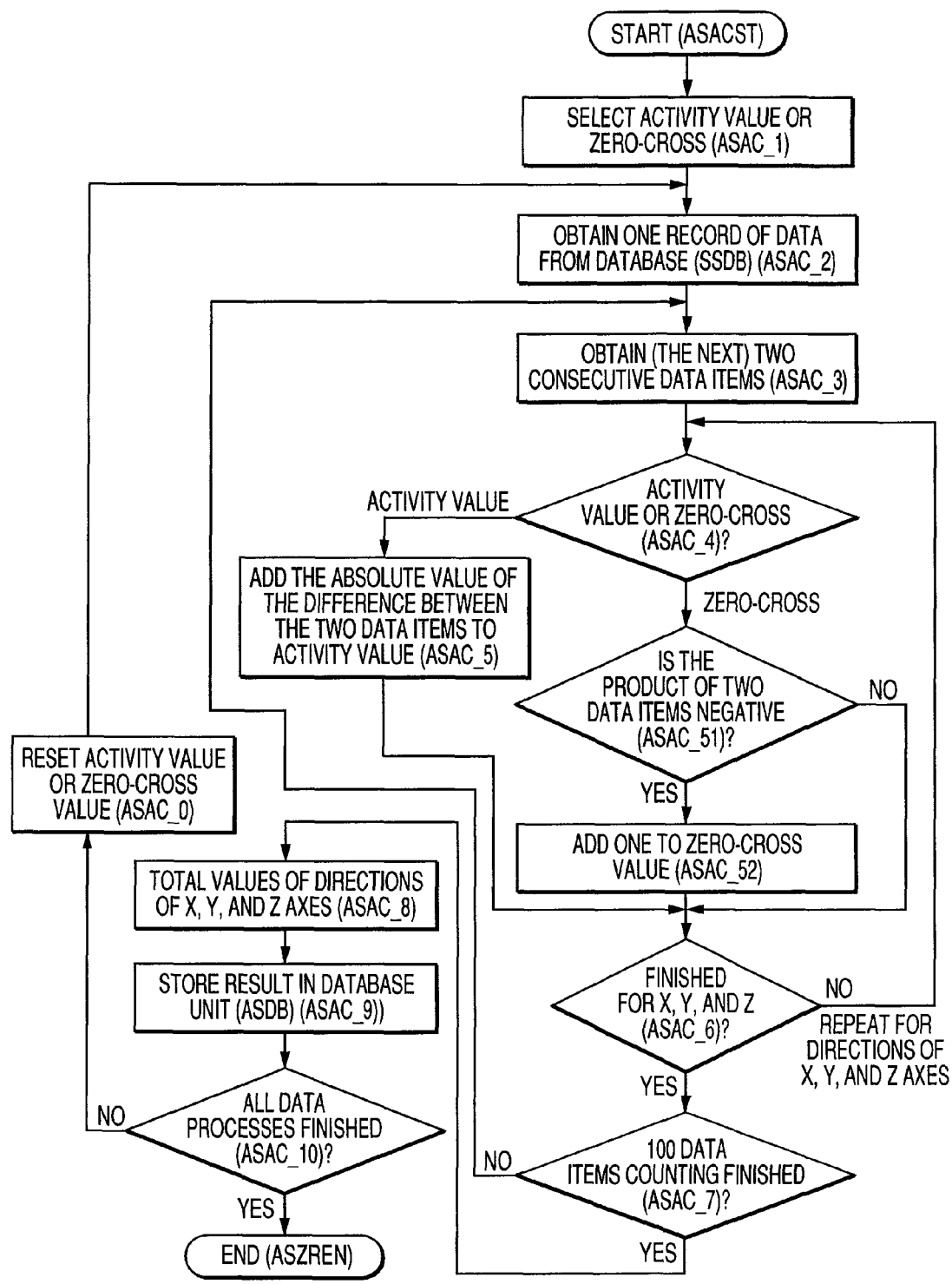
FIG. 28 is a flowchart of the processes for activity value calculation in the fifth embodiment of the present invention.

FIG. 28 shows a flowchart of the activity value calculation executed in this fifth embodiment of the present invention.

Upon starting a processing (ASACST), activity value or zero-cross value is selected as an index (ASAC_1). An activity value denotes a value obtained by calculating an absolute value of each difference between consecutive acceleration data for a certain period and totaling those values. (An absolute value is a value of a difference, for example, between acceleration data at a sensing time and acceleration data at the next sensing time). A zero-cross value means a value obtained by totaling the number of times of code conversion from positive to negative or from negative to positive executed for a certain period. The zero-cross value requires an amount of less data in the database, but it has a disadvantage that it is insensible to the movement in the direction of gravity (Y axis direction).

It may also be predetermined to use the activity value or the zero-cross value as an index. It is also possible for the user to select either of them as an index each time the processing in FIG. 28 is to be executed. In step (ASAC_1), either or both of an activity value and a zero-cross value may be selected.

After that, the data processing unit (ASDP) connects the database (SSDB) to obtain one record of acceleration data (ASAC_2) just like in the first embodiment. One record of data includes 100 sensor data in each direction of the X, Y, and Z axes. The data processing unit (ASDP) then executes unit transformation for all those sensor data to the unit of acceleration [G] (ASMC).

The data processing unit (ASDP) then obtains two records of data having smaller numbers (e.g., older sensing times) from among the 100 sensor data (ASAC_3).

After that, the data processing unit (ASDP) counts the activity value if the activity value is selected upon starting the processing (ASAC_1) and counts the zero-cross value if the zero-cross value is selected upon starting the processing (ASAC_1) (ASAC_4).

In the activity value counting, the absolute value of each difference between two consecutive acceleration data is added up sequentially with respect to each direction of the X, Y, and Z axes (ASAC_5).

In the zero-cross counting, if the product of two consecutive acceleration data is negative (ASAC_51), one is added to the zero-cross count (ASAC_52).

The processing in step (ASAC_5) or the processes in steps (ASAC_51) and (ASAC_52) are executed for each direction of the X, Y, and Z axes (ASAC_6).

If both an activity value and a zero-cross value are selected in step (ASAC_1), the data processing unit (ASDP) executes the processes in step (ASAC_5), (ASAC_51), and (ASSC_52).

When not completing counting for any of the 100 data obtained from the database (SSDB), the data processing unit (ASDP) obtains the next two data in order of time series (ASAC_3). In other words, the data processing unit (ASDP) obtains the data corresponding to a later sensing time and the data corresponding to the next sensing time from the two data obtained in the previous step (ASAC_3). The data processing unit (ASDP) then repeats the activity value or zero-cross calculation for the obtained data.

Completing the calculation of one record, that is, 100 data (ASAC_7), the data processing unit (ASDP) totals the activity value or zero-cross values in each direction of the X, Y, and Z axes (ASAC_8) and stores the total activity value or zero-cross value in the database unit (ASDB) of the application server (AS) (ASAC_9). At this time, as the time data corresponding to the totaled activity value or zero-cross value, an average time (ASDB_AC_TM) is stored. The average time (ASDB_AC_TM) is an intermediate value between the start time (SSDB_STM) and the end time (SSDB_ETM).

Upon completing the processes for all the plotting data, the data processing unit (ASDP) executes the ending processing (ASACEN) shown in FIG. 28. If not completing the processing for any of those plotting data yet, the data processing unit (ASDP) resets the activity value or zero-cross count and executes the processes in and after the process of the data obtaining (ASAC_2) again (ASAC_10).

Figures 29, 30:
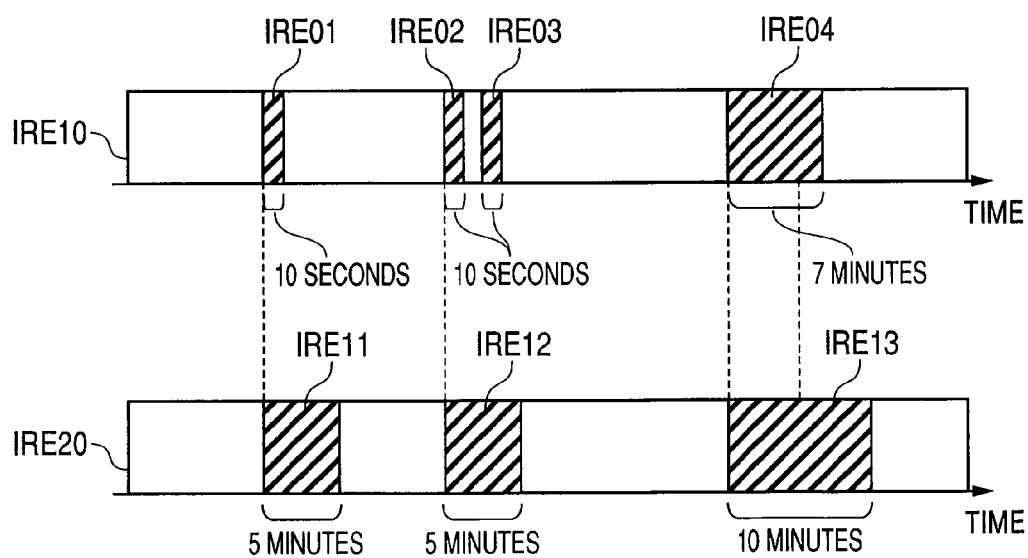
FIG. 29 is a diagram for describing an activity value database in the fifth embodiment of the present invention.
FIG. 30 is a diagram for describing a display screen on which expansion display processes are executed in a sixth embodiment of the present invention.

FIG. 29 shows a diagram for describing an activity database (ASDB_ACT) in this fifth embodiment of the present invention.

The activity value database (ASDB_AXT) includes elements of average time (ASDB_ACT_TM), terminal ID (ASDB_ACT_SID), activity value (ASDB_ACT), and zero-cross (ASDB_ACT_ZERO). In step (ASAC_1) shown in FIG. 28, one or both of the activity value and zero-cross value are selected. Consequently, if only either of them is selected, a blank is set for the non-selected item.

The value calculated form one record (e.g., RE01) as shown in FIG. 8 is stored in one record (e.g., RE01) shown in FIG. 29. The value calculated from a plurality of records in FIG. 8 may be stored in one record in the action database at this time.

According to this fifth embodiment, therefore, because an activity value (or zero-cross value) is calculated, it is possible to know a movement of a terminal (TR) or a terminal (TR) wearing member. Changes of a member's action with time can be grasped with the member's active movement. According to such an action change, it is possible to roughly decide the state of the member, for example, cleaning, resting, leaving the terminal (TR) over.

In this sixth embodiment, one display of meeting data is expanded to make it easier to watch the display in the process of the infrared meeting discrimination (ASDD) similarly to the first embodiment.

There are some cases in which meeting is not sensed due to the excessively high directivity of the terminal (TR) or unstable orientation of the intended member. In the first embodiment, the shortest meeting data is displayed in units of 10 sec. In this case, display data is turned into thin stripes if some data is missing, thereby it is difficult to distinguish among colors. Particularly, when data collected for a long time are displayed collectively, the 10 sec width is too thin for the overall display. To avoid such a problem, a piece of data is expanded to smooth the display in this sixth embodiment.

In this sixth embodiment, in order to solve the problem, a time over 10 sec is set as a unit of expanded display (ASME_IREU) and whether or not meeting is sensed is decided in that period. If meeting is sensed in that period, the meeting is displayed at a width in accordance with the unit of expanded display (ASME_IREU).

There are many cases in which sensed meeting does not appear as meeting data more than cases in which non-sensed meeting is decided as meeting. This is a very serious problem. It is considered to be one of the effective methods to avoid this problem that each single piece of meeting data is used to decide existence of meeting.

The acceleration data processing method in this sixth embodiment is the same as that in the first embodiment. Hereunder, therefore, there will be described only the infrared data expanded display processing.

FIG. 30 shows a diagram for describing a display screen on which the expanded display processing is executed, in the sixth embodiment of the present invention.

Concretely, FIG. 30 shows a display screen used when the unit of expanded display (ASME_IREU) is set at 5 minutes as an example of the expanded display processing.

It is premised here that displaying meeting data according to the method of the first embodiment is display before expansion (IRE10) and displaying meeting data according to the expanded display processing method in this sixth embodiment is display after expansion (IRE20). Data after expansion (IRE11) is displayed by painting a 5 min width beginning from the same time as that at the left end of data before expansion (IRE01).

If data before expansion appears consecutively several times within 5 min just like data before expansion (IRE02, IRE03), those data are displayed as one data after expansion (IRE12).

Furthermore, if data before expansion is continued for more than 5 minutes just like the data (IRE04), the data display time is rounded up to an integral multiple of the unit of expanded display (ASME_IREU)(5 minutes)(IRE13). In the example shown in FIG. 30, the data after expansion (IRE13) corresponding to the data before expansion (IRE04) for more than 7 minutes is displayed at a width of an integral multiple of 5 minutes and equivalent to 10 minutes, which is the minimum value among the values for 7 or more minutes.

Figure 31:
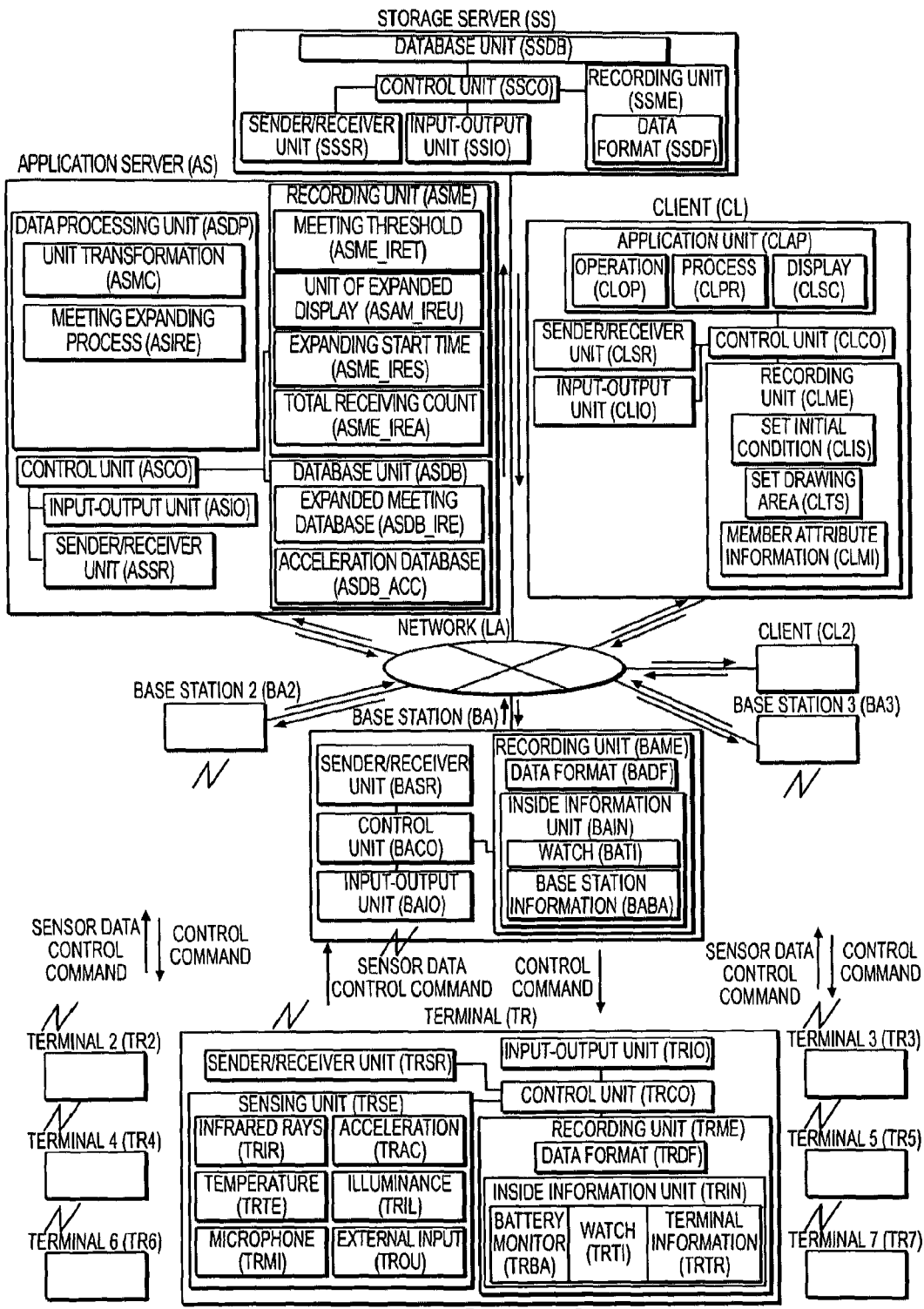
FIG. 31 is a diagram for describing an overall configuration of a system in the sixth third embodiment of the present invention.

FIG. 31 shows an overall configuration of a system in the sixth embodiment of the present invention.

There is only a difference between the configuration shown in FIG. 31 and the overall configuration shown in FIG. 1 in the first embodiment; some elements are newly added to the application server (AS) in this sixth embodiment.

Concretely, in the data processing unit (ASDP) of the application server (AS), a meeting threshold (ASME_IRET), a unit of expanded display (ASME_AIREU), an expansion start time (ASME_JRES), and a total receiving count (ASME_IREA) are added to the recording unit (ASME) while an expanded meeting database (ASDB_IRE) is added to the database unit (ASDB).

As for the meeting threshold (ASME_IRET) and the unit of expanded display (ASME_AIREU), their preset values are recorded. On the other hand, blanks are set initially for the expansion start time (ASME_JRES) and the total receiving count (ASME_IREA). They are variables prepared temporarily for recording data during a processing.

Those added in this sixth embodiment are all used for expanded display.

Figure 32:
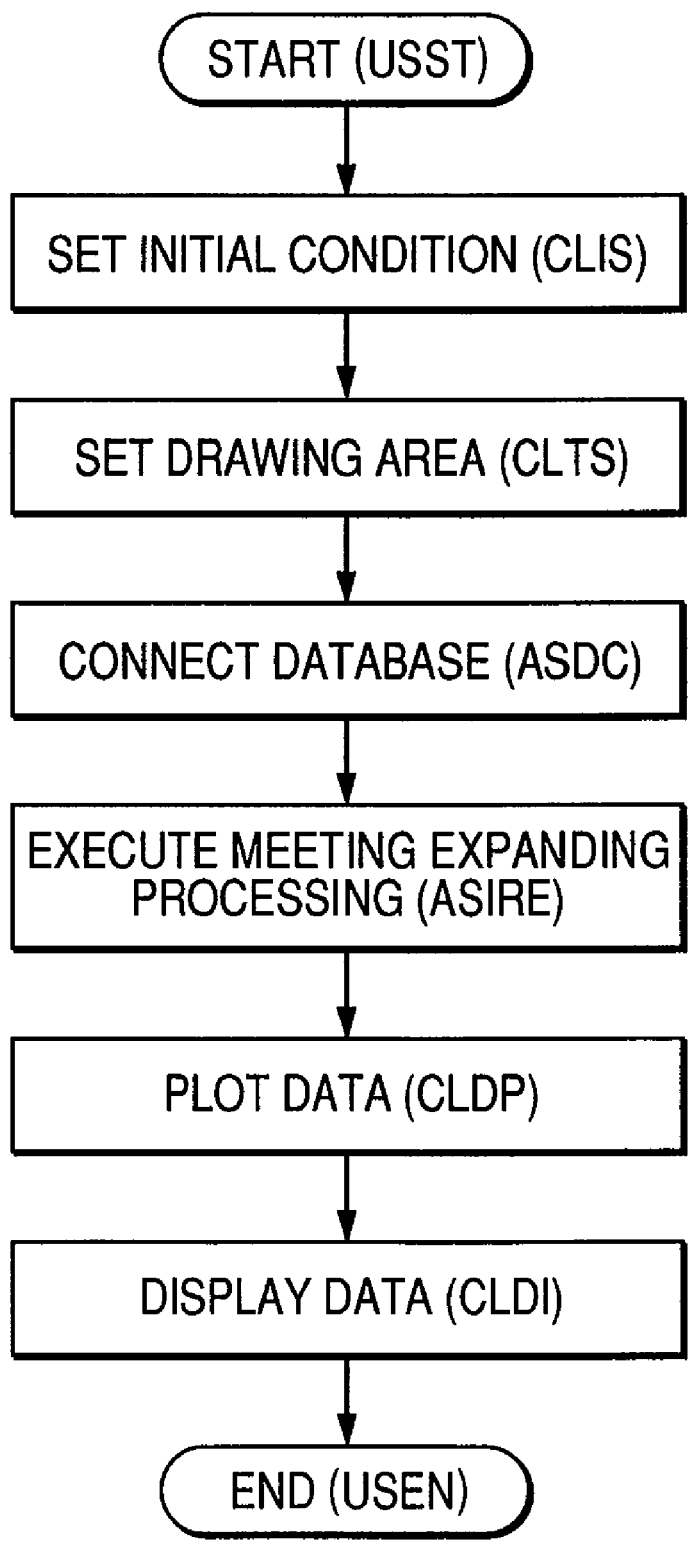
FIG. 32 is a flowchart of the processes for creating a display screen in the sixth embodiment of the present invention.

FIG. 32 is a flowchart of the processes for creating a display screen in the sixth embodiment of the present invention.

There is only a difference between the flowchart shown in FIG. 32 and that shown in FIG. 5 in the first embodiment; the data processing (ASDP) is replaced with a meeting expanding process (ASIRE) in this sixth embodiment.

The acceleration related processes are the same as those in the first embodiment, so that the description will be omitted here. Hereunder, therefore, there will be described only the meeting sensing related processes (ASIRE).

Figure 33:
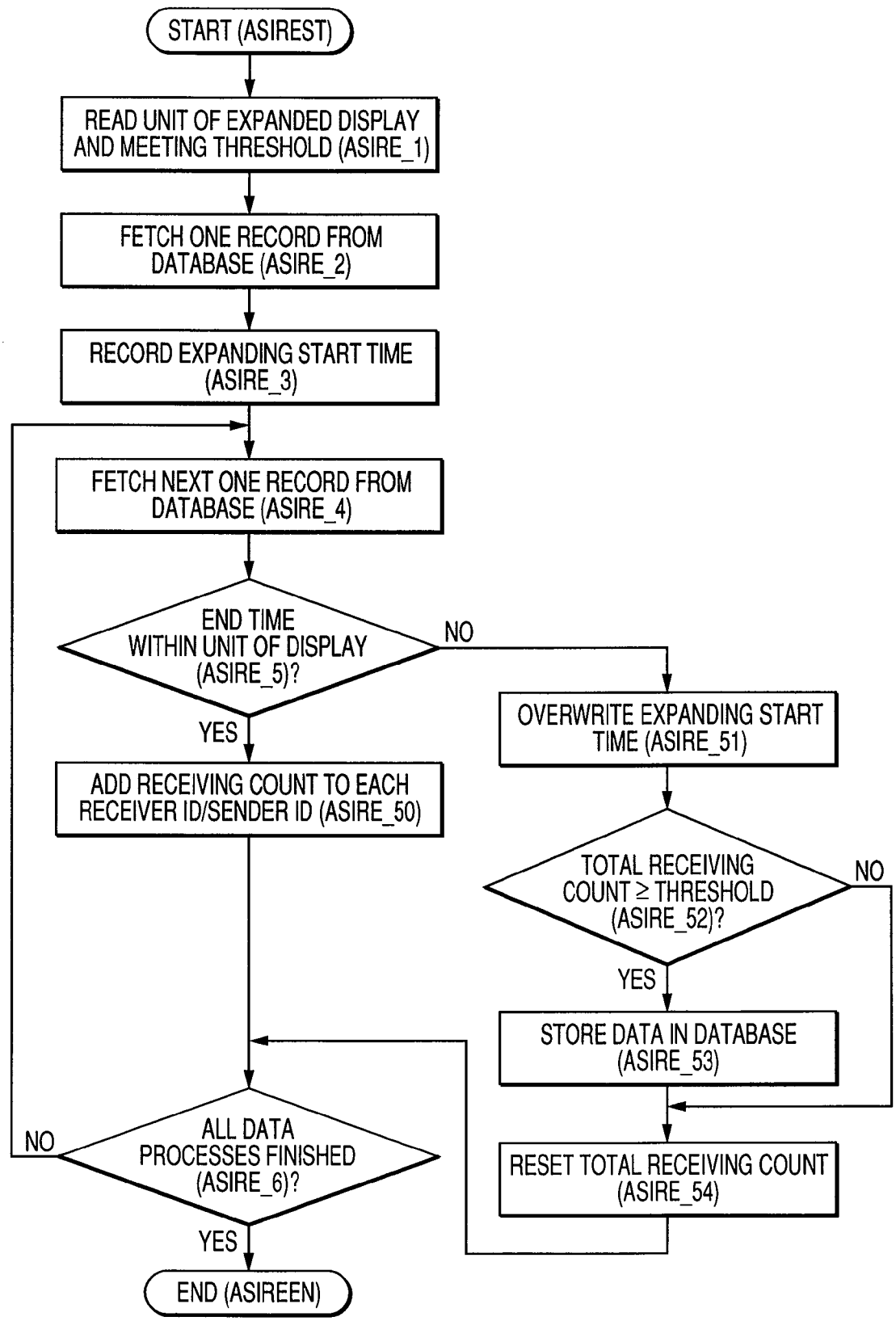
FIG. 33 is a flowchart of the meeting expansion processes in the sixth embodiment of the present invention.

FIG. 33 is a flowchart of the meeting expansion processes (ASIRE) executed in the sixth embodiment of the present invention.

Upon starting a processing (ASIREST), the data processing unit (ASDP) reads the meeting threshold (ASME_IRET) and the unit of expanded display (ASME_IREU) from the recording unit (ASME) first. The meeting threshold (ASME_IRET) is used to decide whether or not the subject terminal (TR) has faced another terminal (TR). Concretely, if an infrared ray receiving count from a specific terminal (TR) is over the meeting threshold (ASME_IRET), it is decided that the terminal (TR) has faced another terminal (TR). The unit of expanded display (ASME_IREU) means a width on a time axis. The unit is assumed as a minimum value for displaying meeting data.

Those values may be set by the user (US) in the set initial condition process or may be set automatically. Set values are stored in the recording unit (ASME).

After that, the data processing unit (ASDP) connects the database unit (SSDB) of the storage server (SS) to obtain one record of data having the earliest start time (SSDB_STM) in the range set in the set initial condition process (ASIRE_2). This one record includes elements of start time (SSDB_STM), end time (SSDB_ETM), terminal ID (SSDB_SID), infrared sending ID (SSDB_OID), and infrared ray receiving count in 10 sec (SSDB_NIR).

The start time (SSDB_STM) is stored as an expansion start time (ASIRE_3) only when the time data is obtained for the first time (ASIRE_3).

After that, the data processing unit (ASDP) obtains the next one record from the database (SSDB) in order of the start time series (SSDB_STM) (ASIRE_4).

If the end time (SSDB_ETM) of the obtained data is within the range of the currently recorded (expansion start time+unit for expanded display (ASME_IREU)) (ASIRE_3), the data processing unit (ASDP) adds an infrared ray receiving count to each combination of receiver ID and sender ID (ASIRE_50).

Otherwise, the data processing unit (ASDP) overwrites the expansion start time on its old data (ASIRE_51). If the total receiving count is over the meeting threshold (ASME_IRET) (ASIRE_52), it is decided that the terminal (TR) has faced another terminal (TR). Consequently, the data processing unit (ASDP) assumes the expansion start time as a start time (ASDB_IRE_STM) and the time of (expansion start time+unit for expanded display (ASME_IREU)) as an end time (ASDB_IRE_ETM). In addition to those time data, the data processing unit (ASDP) stores one record of data, which includes elements of terminal ID (ASDB_IRE_SID) and infrared sending ID (ASDB_IRE_OID), in the expanded meeting database (ASDB_IRE) (ASIRE_53). After that, the data processing unit (ASDP) resets the total ray receiving count (ASIRE_54).

Upon completing the processes for all the object data (ASIRE_6), the data processing unit (ASDP) executes the ending processing (ASIREEN) shown in FIG. 33. When any of the processes is not completed yet, the data processing unit (ASDP) obtains the next one record of data and repeats the processes in and after the process of the data obtaining (ASIRE_4).

The unit of expanded display (ASME_IREU) is set according to the width of the object display graph and the width of the object display time similarly to the acceleration averaging processing. At this time, proper values are selected with reference to both the condition of expansion and the upper limit of the unit of expanded display.

At first, there will be examined conditions for expansion. It is assumed here that expanded display is required when the plotting area width is 0.1 mm or under upon displaying meeting data of 10 sec as the minimum unit. At this time, a ratio between the whole graph area width and the minimum data width is calculated first. For example, if the whole graph area width is 20 cm and the graphing time width is 5 hours or more, it is decided to expand the unit of display.

Next, there will be examined the upper limit of the unit of expanded display (ASME_IREU). The upper limit of the unit of expanded display (ASME_IREU) is selected in accordance with the desired analysis object. For example, an interaction in a daily business job may have various patterns such as about 10-sec greeting, about 5-min chat while standing, over 30-min meeting, or the like. Therefore, in order to decide whether meeting date denotes a short time conversation or a long time meeting, the upper limit of the unit of expanded display (ASME_IREU) should preferably be about 15 minutes.

Next, there will be described how to set a meeting threshold (ASME_IRET). The maximum receiving count in the unit of expanded display (ASME_IREU) can be found from a ratio between the unit of expanded display (ASME_IREU) (sec) and the sensing interval (10 sec here). The meeting threshold (ASME_IRET) is set according to the maximum receiving count.

FIG. 34 shows a diagram for describing an expanded meeting database (ASDB_IRE) in this sixth embodiment of the present invention.

Concretely, FIG. 34 shows an example of the expanded meeting database (ASDB_IRE) in case where 5-min is set for the unit of expanded display.

The expanded meeting database (ASDB_IRE) includes elements of start time (ASDB_IRE_STM), end time (ASDB_IRE_ETM), terminal ID (ASDB_IRE_SID), and infrared sending ID (ADSB_IRE_OID).

One record (RE01) shown in FIG. 34 is generated from a plurality of records (RE01, etc.) shown in FIG. 8.

The unit of expanded display (ASME_IREU) is always applied to the interval between the start time (ASDB_IRE_STM) and the end time (ASDB_IRE_ETM). Therefore, the meeting display is expanded as required by plotting the data in this database ASDB_IRE) faithfully.

According to the expanded display processing in this sixth embodiment, the frame of each element is well-defined, thereby the element impact is strengthened. The user (US) thus can see the whole displayed meeting data on one sheet of "drawing". As a result, the user (US) can grasp an active member and a time band of the subject interaction at a glance.

In the first embodiment, if two members (A and B) meet each other, the terminals worn by those members exchange their IDs using an infrared ray. Consequently, it is expected that the infrared display area (CLSC_IR) displays a pair of data for two places while they are meeting so that the area of the member A displays a color denoting the ID of the member B and the area of the member B displays a color denoting the ID of the member A.

In the first embodiment, however, data is often displayed only in one of the areas of the members A and B due to a sending error, unmatched timing, or the like.

In order to correct such an error-occurred place in this seventh embodiment, meeting data is symmetrized (ASSY), thereby symmetrized data is created for the obtained data (original data). In the symmetrized data, the receiver ID and the sender ID are replaced with each other. As a result, both original data and its symmetrized data are plotted.

Figure 35:
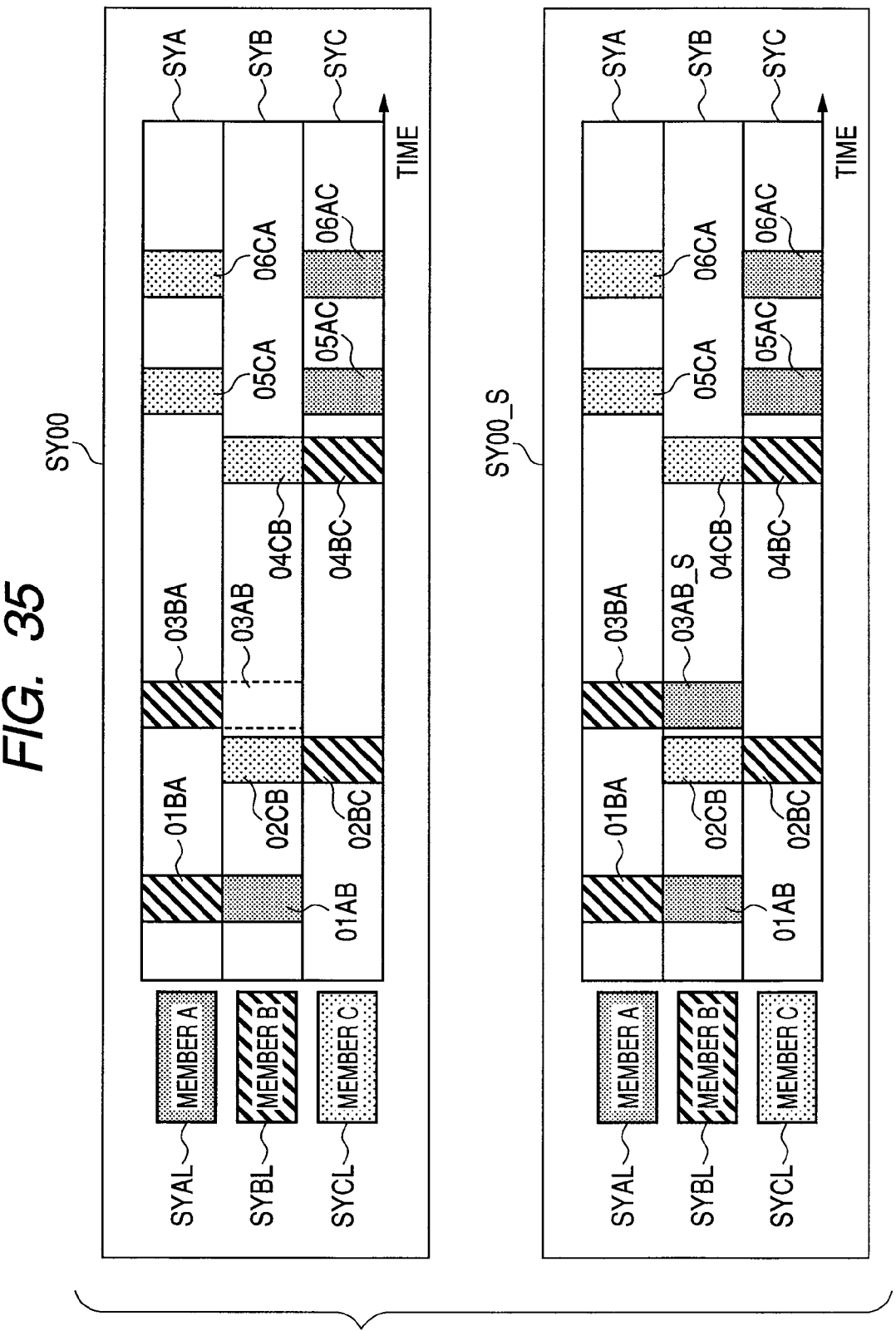
FIG. 35 is a diagram for describing a display screen on which meeting symmetrization processes are executed in a seventh embodiment of the present invention.

FIG. 35 shows a display screen on which meeting symmetrization is executed in this seventh embodiment of the present invention.

The upper portion in FIG. 35 shows a display (SY00) before symmetrization (ASSY) is executed and the lower portion in FIG. 35 shows a display (SY00_S) after symmetrization (ASSY) is executed.

In FIG. 35 are displayed a member A's area (SYA), a member B's area (SYB), and a member C's area (SYC). The color corresponding to each of those members A to C is denoted by a member tag (one of the SYAL, SYBL, and SYCL).

Among those members, the data sent from the member B to the member A is displayed in the data (01BA) and the data sent from the member A to the member B is displayed in the data (01AB). Those two data makes a pair. However, there is no data (03AB) corresponding to the data (03BA) of the display before meeting symmetrization.

Symmetrization is executed for each data that is not paired such way. In the display (SY00_S) after symmetrization, data (03BA) can be copied into the member B's area (SYB) to compensate the data (03AB_S). This copied data is referred to as symmetrized data.

Figure 36:
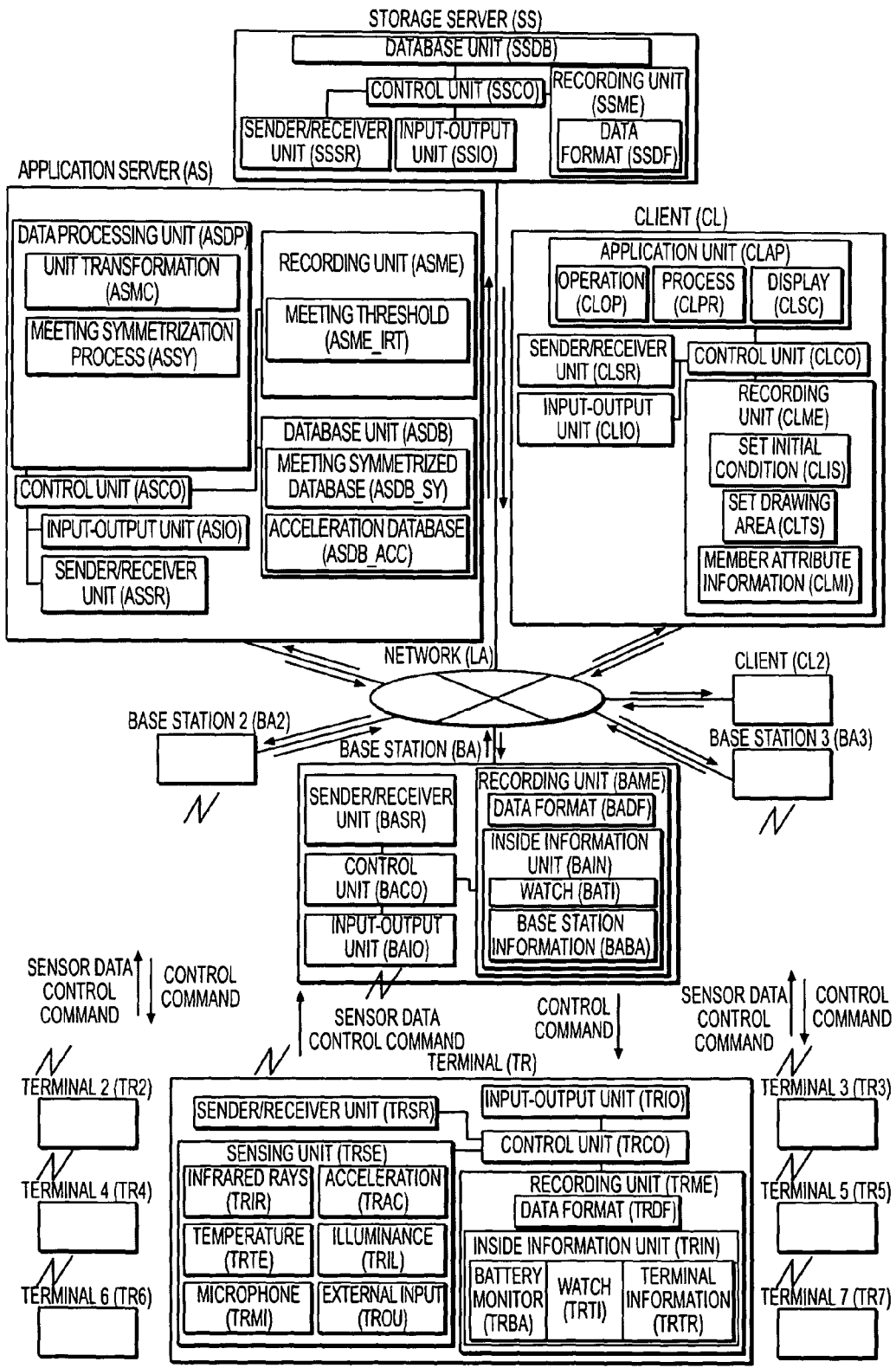
FIG. 36 is a diagram for describing an overall configuration of a system in the seventh third embodiment of the present invention.

FIG. 36 shows an overall configuration of a system in this seventh embodiment of the present invention.

There is only a difference between the configuration shown in FIG. 36 and the overall configuration shown in FIG. 1 in the first embodiment; some elements are newly added to the application server (AS) in this seventh embodiment.

Concretely, a meeting symmetrization process (ASSY) is added to the data processing unit (ASDP) and a meeting symmetrized database (ASDB_SY) is added to the database unit (ASDB) in the application server (AS) respectively in this seventh embodiment.

Those added in this seventh embodiment are all used for meeting symmetrization.

Figure 37:
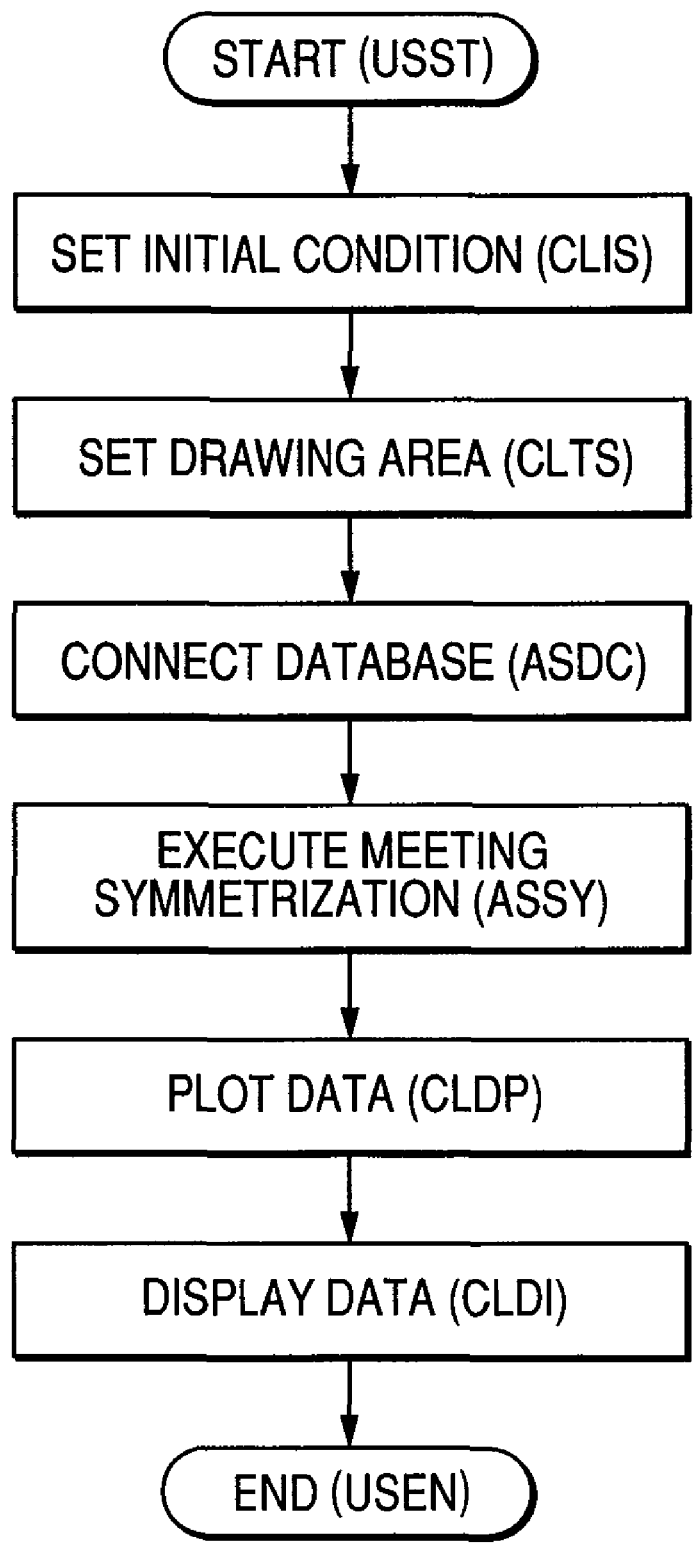
FIG. 37 is a flowchart of the processes for creating a display screen in the seventh embodiment of the present invention.

FIG. 37 shows a flowchart of the processes for creating a display screen in this seventh embodiment of the present invention.

There is only a difference between the processes shown in FIG. 37 and those shown in FIG. 5 in the first embodiment; the data processing (ASDP) is replaced with a meeting symmetrization processing (ASSY) in this seventh embodiment.

The acceleration related processes in this seventh embodiment are the same as those in the first embodiment, so that the description will be omitted here. Hereunder, therefore, there will be described only the procedure of the meeting symmetrization processing (ASSY).

Figure 38:
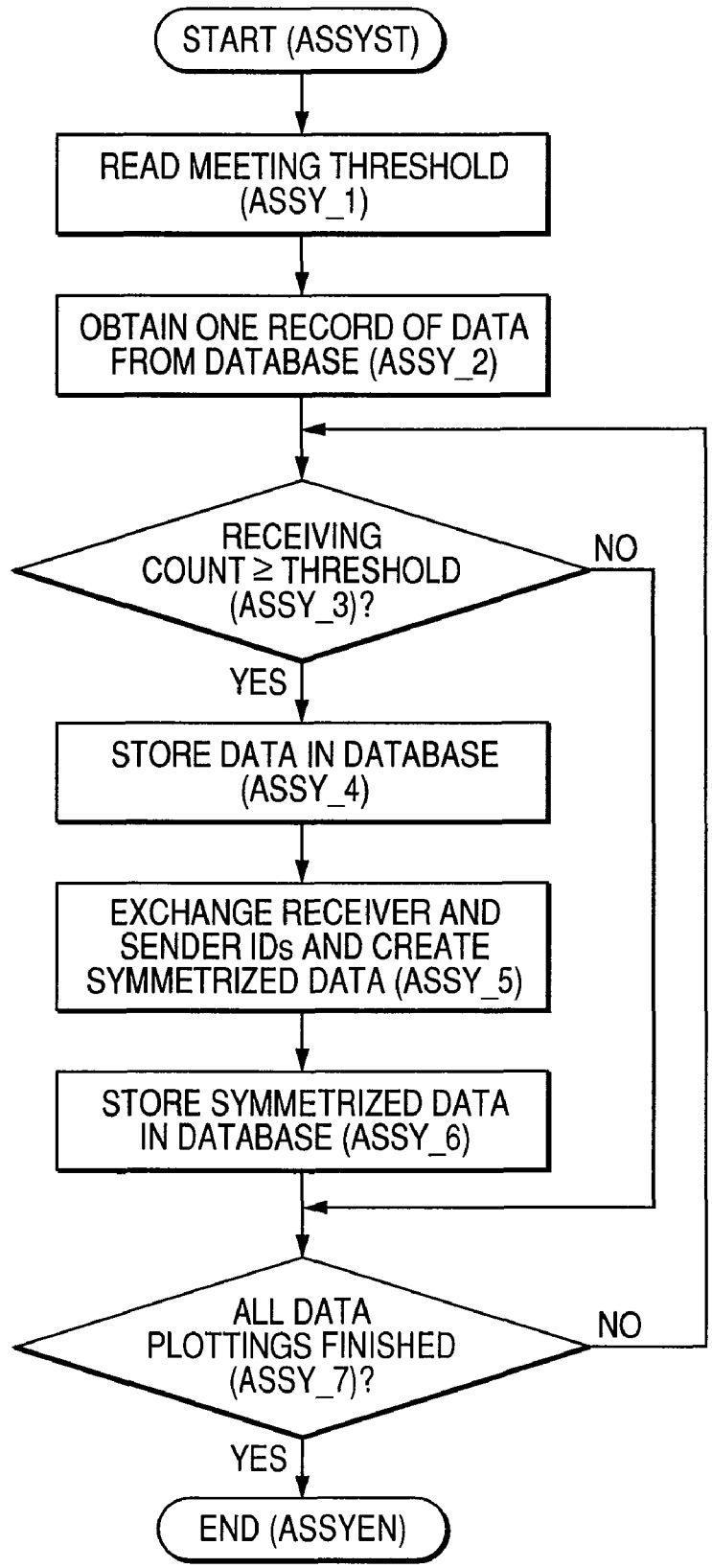
FIG. 38 is a flowchart of the meeting symmetrization processes in the seventh embodiment of the present invention.

FIG. 38 shows a flowchart of the meeting symmetrization processing (ASSY) executed in this seventh embodiment of the present invention.

Upon starting a processing (ASSYST), the data processing unit (ASDP) reads the meeting threshold (ASME_IRT) from the recording unit (ASME) first (ASSY_1). Then, the data processing unit (ASDP) connects the database (SSDB) to obtain one record of data therefrom sequentially in an ascending order of the start time series (ASDB_IRE_STM) (ASSY_2).

Then, the data processing unit (ASDP) compares the infrared ray receiving count (SSDB_NIR) of each obtained data with the meeting threshold (ASME_IRT) (ASSY_3). If the infrared ray receiving count (SSDB_NIR) is over the meeting threshold (ASME_IRT), it is decided that the terminal (TR) wearing member has faced another terminal (TR) wearing member. In this case, the data processing unit (ASDP) executes the processes in the steps (ASSY_4 to ASSY_6).

At first, the data processing unit (ASDP) stores elements of start time (SSDB_STM), end time (SSDB_ETM), terminal ID (SSDB_SID), and infrared sending ID (SSDB_OID) of the original data (data obtained in step (ASSY_2) in the meeting symmetrization database (ASDB_SY) of the application server (AS) as are.

After that, the data processing unit (ASDP) replaces the terminal ID of the original data (SSDB_SID) with the infrared sending ID (SSDB_OID), thereby creating symmetrized data (ASSY_5).

The data processing unit (ASDP) then stores the created symmetrized data in the meeting symmetrization database (ASDB_SY) of the application server (AS) without changing the start time (SSDB_STM) and the end time (SSDB_ETM) (ASSY_6).

Completing the processes for all the object data (ASSY_7), the data processing unit (ASDP) executes the ending processing (ASSYEN) shown in FIG. 38. If not completing any of the processes yet, the data processing unit (ASDP) repeats the processes in and after the process of the next one record obtaining (ASSY_2).

In the above processes, there is no need to create symmetrized data for every data. It is also possible to add a step of confirming existence of data to be paired with any given data, thereby creating symmetrized data only when the data has no symmetrized data.

FIG. 39 shows a diagram for describing a meeting symmetrization database (ASDB_SY) in this seventh embodiment of the present invention.

The meeting symmetrization database (ASDB_SY) includes elements of start time (ASDB_SY_STM), end time (ASDB_SY_ETM), terminal ID ADB_SY_SID, and infrared sending ID (ASDB_SY_OID).

The meeting symmetrization database (ASDB_SY) always stores symmetrized data (RE02) that follows the original data (RE01). Both start time (ASDB_SY_STM) and end time (ASDB_SY_ETM) are equal between the original data (RE01) and the symmetrized data (RE02). Furthermore, the terminal ID (ASDB_SY_SID) of the original data (RE01) is equal to the infrared sending ID (ASDB_SY_OID) of the symmetrized data (RE02) and the infrared sending ID (ASDB_SY_SID) of the original data (RE02) is equal to the terminal ID (ASDB_SY_SID) of the symmetrized data (RE02).

Consequently, meeting data display is symmetrized as desired only by plotting the data in this database (ASDB_SY) faithfully.

According to this seventh embodiment, data to be paired is always represented as a pair of data. Consequently, the correspondence between those paired meeting data is grasped at a glance. Furthermore, changes of interactions of a specific member with time can be checked just by checking the member's area; there is no need to correlate the area with areas of other members.

And if a member meets another member, the member's color is always displayed in the area of the opposite member. It is thus possible to grasp the tendency of a member in time band in an interaction only by checking the displayed color. As a result, even in a data display for as long as several months, the data can be seen like an air view in colors.

In the first to seventh embodiments described above, a series of processes are executed after the user (US) starts up an application program (USST). Then, the series of processes from data request (ASSRQ) and data processing (ASDP) to data display (CLDI) are executed. In this case, it takes a long time to execute all those processes each time as needed and the user (US) is long awaited. This has been a problem. Furthermore, if many users (US) make attempts to display images at a time, the application server (AS) and the storage server (SS) are loaded significantly, thereby the storage server (SS) might not be able to cope with new data to be stored, resulting in data missing in some cases.

In order to avoid such problems, in an eighth embodiment of the present invention, the user (US) is enabled to set the initial conditions for display, as well as a time for starting an object processing in the application server (AS) beforehand. And data processes are executed automatically at nights, at lunch breaks, etc. while the server has a sufficient margin in processing capacity. Processed data is stored in the database (ASDB) of the application server (AS).

When the user (US) wants to see an image, the user is just required to plot/display the processed data in the client (CL). The plotting/display is thus done quickly. As a result, the application server (AS) and the storage server (SS) come to be less loaded.

Figure 40:
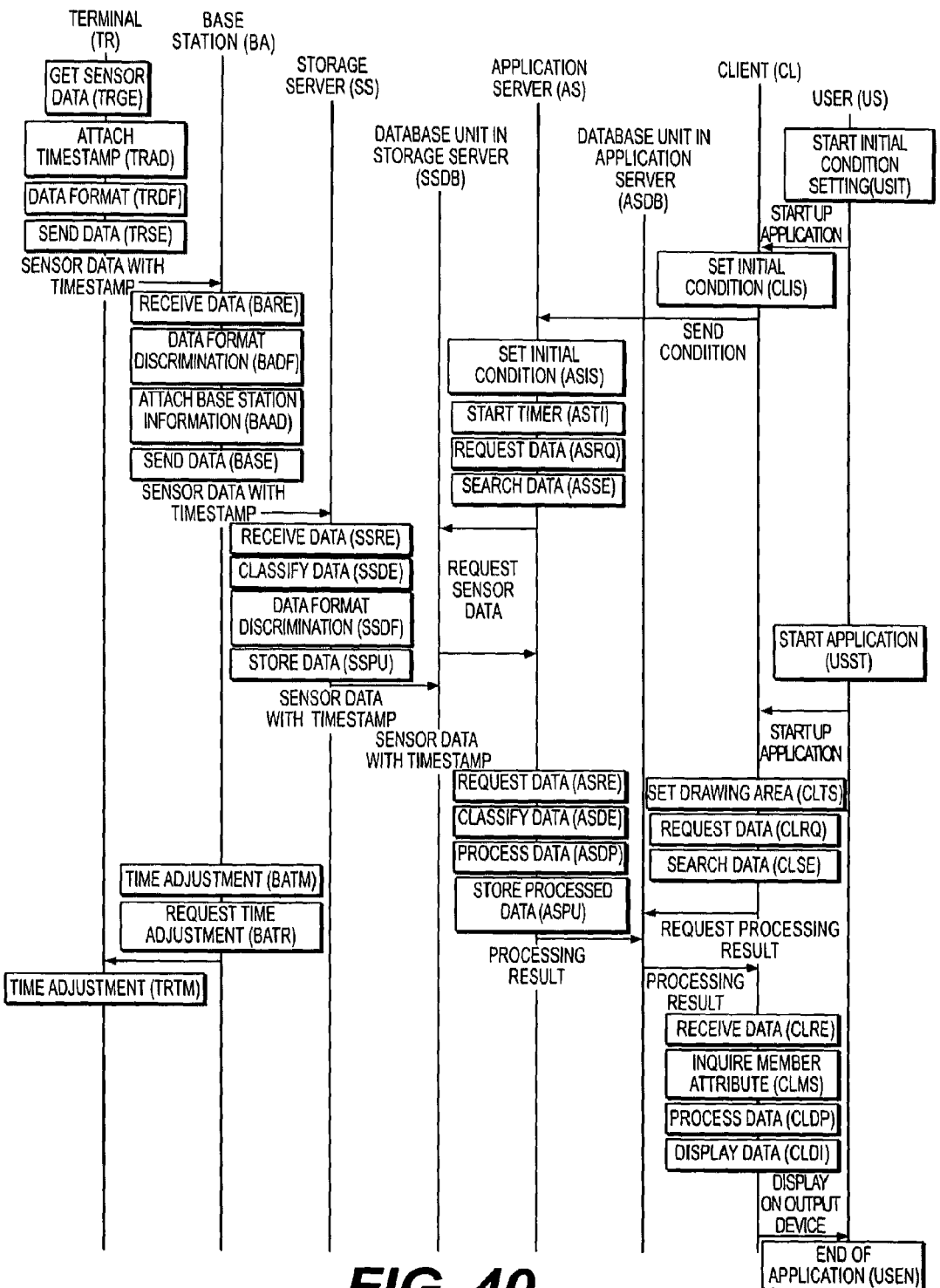
FIG. 40 is a sequence chart for describing the processes for supplying sensor data from a terminal to a user in an eighth embodiment of the present invention.

FIG. 40 shows a sequence chart for describing the processes for supplying sensor data from a terminal (TR) to a user (US) in the eighth embodiment of the present invention.

The processing flow from the sensor data obtaining (TRGE) at a terminal (TR) to the sensor data storing (SSPU) in the database (SSDB) of the storage server (SS), as well as the procedures of the time adjustment (BATM), time adjustment request (BATR), and time adjustment are completely the same as those in the first embodiment (FIG. 3).

On the other hand, the user (US) is required to specify the data to be processed and the time for starting the data processing beforehand for the application server (AS). And the application server (AS) starts the series of data processes at the specified time and stores the processed sensor data in the database (ASDB).

At first, the user (US) starts up (USIT) the set initial condition (CLIS). For example, the set initial condition (CLIS) is started up when the setting window is displayed and the user (US) clicks the START button.

In the set initial condition (CLIS), information required for object processes in the client (CL) is set. For example, the information denotes a processing start time, a processing type, etc. to be set when the user (US) clicks a button on the screen. The client (CL) sends the set conditions to the application server (AS). The application server (AS) then executes the set initial condition (CLIS) according to the condition received from the client (CL).

Those initial conditions are stored in the recording unit (ASME) of the application server (AS).

The timer starting (ASTI) is a procedure for starting a processing at a time set in the set initial condition (CLIS).

In the procedure of the data request (ASRQ), the application server (AS) sends the data obtaining time and the ID of the terminal (TR) from which the data is to be obtained to the database (SSDB) of the storage server (SS) according to the data set in the set initial condition (ASSC).

Procedures from the data searching (ASSE) to the receive data (ASRE), data classification (ASDE), data processing (ASDP), and processing result storing (ASPU) are the same as those in the first embodiment. In those procedures, the application server (AP) processes each data obtained from the database unit (SSDB) of the storage server (SS) and stores the processing result in the database unit (SSDB) of the storage server (SS).

The application starting (USST) is a procedure executed by the user (US) to start up an application program.

The set drawing area (CLTS) is a procedure for setting a drawing area. The contents of the set drawing area (CLTS) is the same as that in the first embodiment.

The data request (CLRQ) is a procedure for sending information required to create a display screen to the database unit (SSDB) of the application server (AS).

The data searching (CLSE) is a procedure for searching data in the application server (AS) according to the data request (CLRQ).

The receive data (CLRE) is a procedure for receiving a processing result from the database unit (ASDB) of the application server (AS) according to a command of the data searching (CLSE).

The member attribute inquiry (CLMS) is the same as that in the first embodiment.

The data processing (CLDP) is a procedure for selecting information required to display object data according to the processing result obtained in the process of the receive data (CLRE) and storing the selected information in the recording unit (CLME).

The data display (CLDI) is a procedure for creating a screen by processing information selected in the process of the data processing (CLDP) according to the display method stored in the recording unit (CLME). The created screen is presented to the user (US).

The terminate application (USEN) is a procedure for enabling the user (US) to exit the subject application program.

The procedures from the data request (CLRQ) to data searching (CLSE), receive data (CLRE), data processing (CLDP), data display (CLDI), and terminate application (USEN) are the same as those in the first embodiment.

The timer starting (ASTI) of the application server (AS) may be set so as to start the timer at periodical cycles, not at a specific time. The application unit (CLAP) of the client (CL) may also be set so as to be started up automatically. In that case, the client (CL) may create an image displayed due to the above processes in the image format and store the created image beforehand. It is also possible in that case to provide the application server (AS) with an image creating function to enable the application server (S) to draw similar images and store the drawn images therein beforehand.

Figure 41:
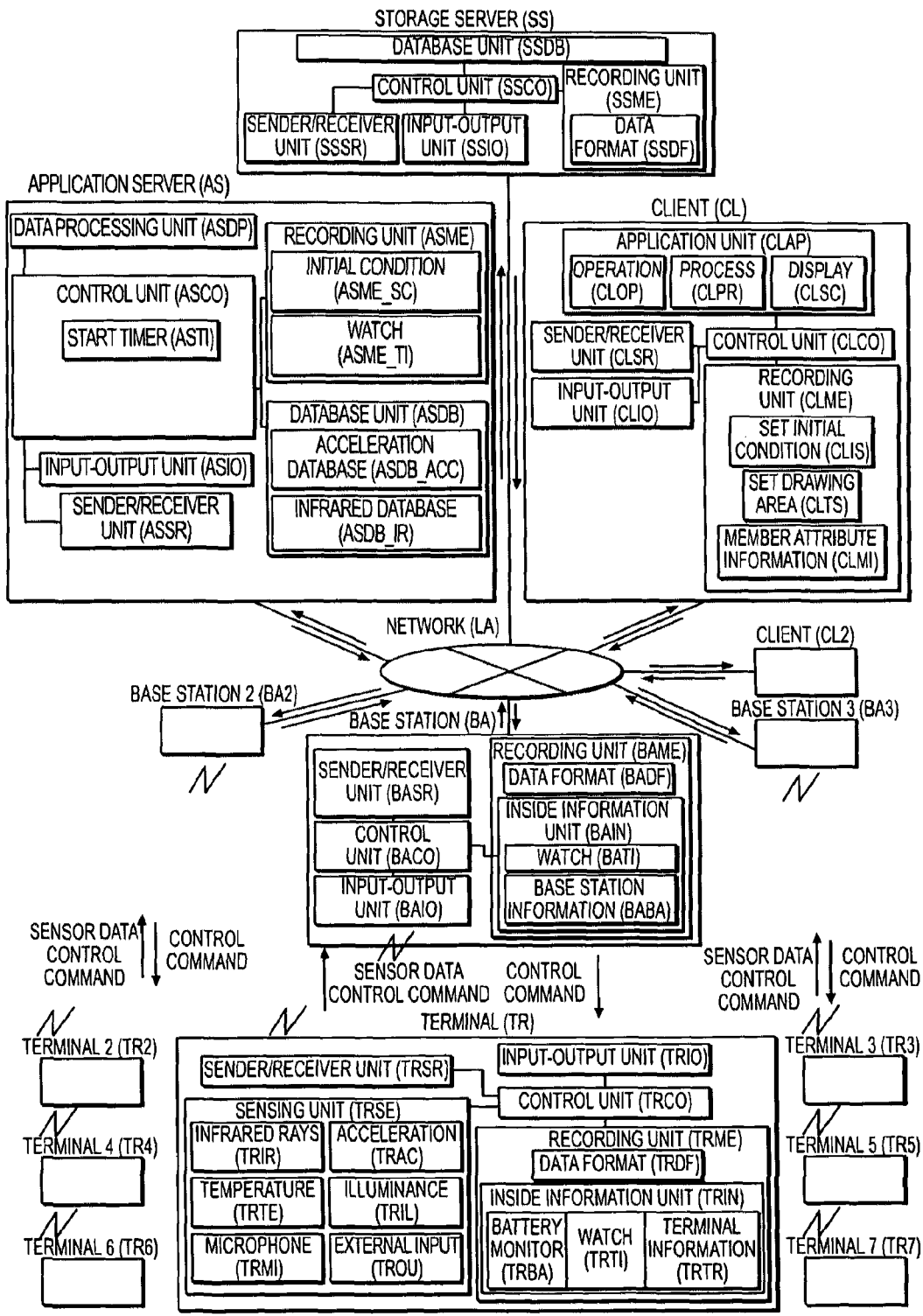
FIG. 41 is a diagram for describing an overall configuration of a system in the eighth embodiment of the present invention.

FIG. 41 shows an overall configuration of a system in the eighth embodiment of the present invention.

There is only a difference between the configuration shown in FIG. 41 and that shown in FIG. 1 in the first embodiment; some elements are newly added to the application server (AS) in this eighth embodiment.

Concretely, the timer starting (ASTI) procedure is added to the control unit (ASCO) and the initial condition (ASME_SC) and clock (ASME_TI) procedures are added to the recording unit (ASME) in the application server (AS).

The timer starting (ASTI) is a procedure for starting the built-in timer at a specified time automatically. The clock (ASME_TI) is a procedure for keeping monitoring of the watch to start the timer (ASTI). The initial condition (ASME_SC) is a procedure for storing user specified conditions.

The procedures added here are all used for automatic processes.

Figure 42:
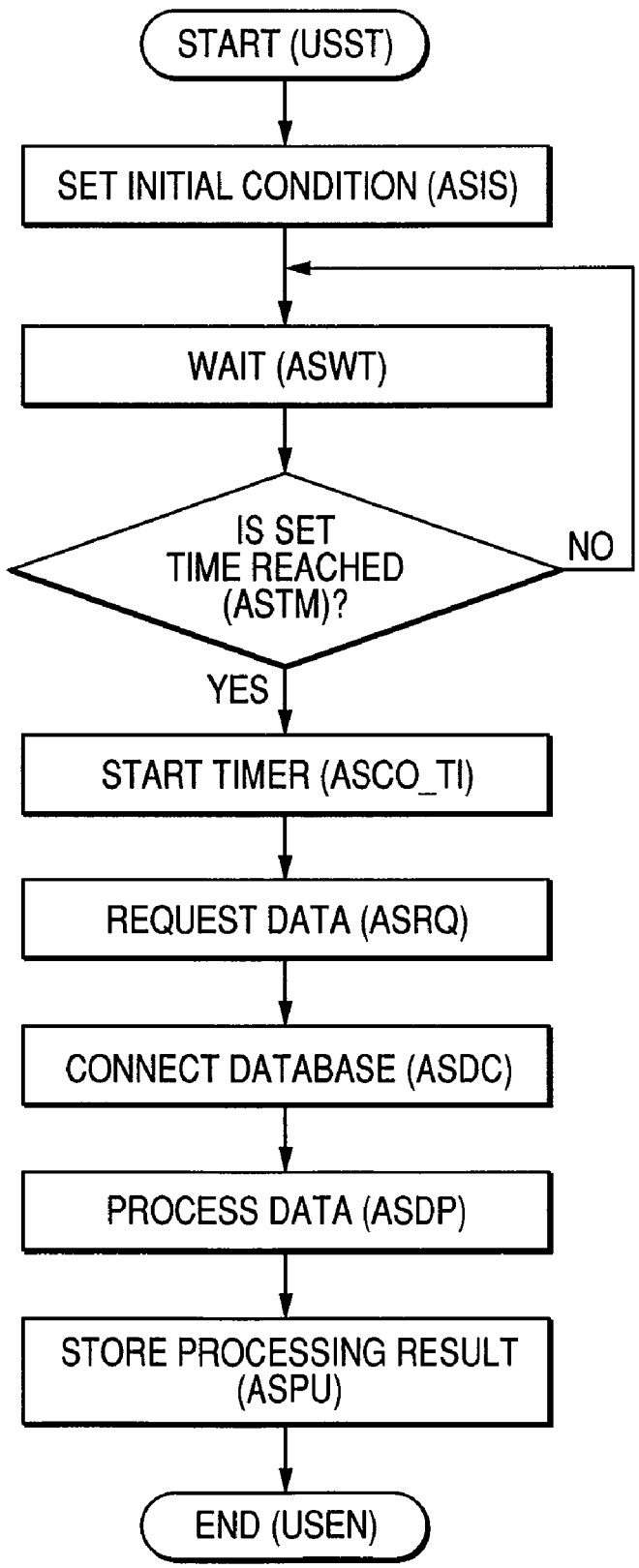
FIG. 42 is a flowchart of the automatic data processes executed in an application server in the eighth embodiment of the present invention.

FIG. 42 shows a flowchart of the automatic data processes executed in the application server (AS) in this eighth embodiment of the present invention.

Upon starting a processing (ASST), the application server (AS) stands by until the start time set in the set initial condition (ASIS) procedure is reached (ASWT).

When the clock (ASME_TI) reaches a set time (ASTM), the timer starts (ASCO_TI), enabling a specified processing to be started.

The procedures of the data request (ASRQ), database connection (ASDC), data processing (ASDP), and processing result storing (ASPU) to be executed after that are the same as those in the first embodiment (FIG. 5). One or more processes in any of the third to seventh embodiments may be executed in the data processing (ASDP) in accordance with the data set in the set initial condition (CLIS).

In this eighth embodiment, data processes are executed automatically beforehand before receiving a request from the user (US). Consequently, the user (US) can display any existing screen quickly as needed. Furthermore, the application server (AS) and the storage server (SS) are less loaded in this embodiment.

If the application server (AS) creates and stores an image automatically, what is required in the client (CL) is just to display the image. Consequently, screens come to be displayed more quickly. After new data is added, images are updated automatically and periodically. This eighth embodiment is thus effective for laborsaving.

The aspects of the present invention described above will be summarized typically as follows.

(1) The first aspect of the present invention is to provide an interaction data display apparatus for displaying interaction data of a terminal unit. The interaction data includes first information denoting whether or not the terminal unit has faced a different terminal unit and second information denoting a state of the terminal unit and excluding the information denoting the positions of the terminal unit and the first information.

The interaction data display apparatus includes a receiving unit for receiving interaction data from the terminal unit and a display unit for displaying the received interaction data.

The display unit displays the first and second information items included in the interaction data received by the receiving unit so as to be related to each other according to the times at which those first and second information items are obtained respectively.

(2) In the interaction data display apparatus described in (1), the first information includes identifying information for identifying the different terminal unit that the terminal unit has faced.

(3) In the interaction data display apparatus described in (2), the first information includes information denoting whether or not a radio signal that includes identifying information for identifying the different terminal unit has been received from the different terminal unit.

(4) In the interaction data display apparatus described in (3), the second information includes acceleration information denoting the acceleration of the terminal unit.

(5) In the interaction data display apparatus described in (4), the second information includes information denoting a movement state of the terminal, classified according to the acceleration information.

(6) In the interaction data display apparatus described in (4), each of the first and second information items included in the first interaction data includes identifying information for identifying a terminal unit that the first terminal unit has faced and other than the first terminal unit, as well as acceleration information denoting the acceleration of the first terminal unit.

Each of the first and second information items included in the second interaction data includes identifying information for identifying a terminal unit that the second terminal unit has faced and other than the second terminal unit, as well as acceleration information denoting the acceleration of the second terminal unit.

The display unit displays the first and second interaction data so as to be related to each other according to a time.

(7) In the interaction data display apparatus described in (6), the first interaction data includes information for relating the first information included in the first interaction data to a time at which the first terminal unit has received the radio signal, as well as information for relating the second information included in the first interaction data to a time at which the acceleration of the first terminal unit has been measured.

The second interaction data includes information for relating the first information included in the second interaction data to a time at which the second terminal unit has received the radio signal, as well as information for relating the second information included in the second interaction data to a time at which the acceleration of the second terminal unit has been measured.

(8) In the interaction data display apparatus described in (7), the display unit displays the first information and the second information related to the same time as that related to the first information so as to be related to each other.

(9) In the interaction data display apparatus described in (8), the first interaction data includes identifying information for identifying the first terminal unit that has received the radio signal and the second interaction data includes identifying information for identifying the second terminal unit that has received the radio signal.

(10) In the interaction data display apparatus described in (9), the display unit displays the first and second information items included in the first interaction data so as to be related to the identifying information for identifying the first terminal unit respectively.

The display unit further displays the first and second information items included in the second interaction data so as to be related to the identifying information for identifying the second terminal unit respectively.

(11) In the interaction data display apparatus described in (10), the display unit displays a first time axis on a display screen included therein and a second time axis having the same scale and the same direction as those of the first time axis on an extended line of the first time axis on the display screen.

The display unit further displays the first information by relating a time related to the first information to the first time axis and the second information by relating a time related to the second information to the second time axis.

(12) In the interaction data display apparatus described in (11), the time denoting information includes a date and a time of the date and the first and second time axes denote a time of the date respectively.

The display unit displays the first information included in the first interaction data in a place having a first distance from the first time axis by relating a time related to the first information included in the first interaction data to the first time axis and displays the second information included in the first interaction data in a place having the first distance from the second time axis by relating a time related to the second information included in the first interaction data to the second time axis if the first and second information items included in the first interaction data are related to a time of the same day.

(13) In the interaction data display apparatus described in (11), the time denoting information includes a date and a time of the date and the first and second time axes denote a time of the date respectively.

The display screen included in the display unit is divided into a plurality of areas in a direction approximately perpendicularly to the first and second time axes.

The display unit displays, if the first information included in the first interaction data includes a first portion related to a first date and a second portion related to a second date, displays the first portion in a first one of the plurality of divided areas by relating a time related to the first portion to the first time axis and displays the second portion in a second of the divided areas by relating a time related to the second portion to the first time axis.

(14) In the interaction data display apparatus described in (11), the time denoting information includes a day and a time of the day and the first and second time axes denote the day and a time of the day respectively.

The display unit displays, if the first information included in the first interaction data includes a first portion related to a first date and a second portion related to a second date, displays the first portion in a place having a first distance from the first time axis by relating a time related to the first portion to the first time axis and displays the second portion in a place having the first distance from the first time axis by relating a time related to the second portion to the first time axis.

(15) In the interaction data display apparatus described in (11), the display screen included in the display unit is divided into a plurality of areas in a direction approximately perpendicularly to the first and second time axes.

The display unit displays the first information included in the first interaction data in the first area by relating a time related to the first information included in the first interaction data to the first time axis and the second information included in the first interaction data in the first area by relating a time related to the second information included in the first interaction data to the second time axis.

The display unit further displays the first information included in the second interaction data in the third area by relating a time related to the first information included in the second interaction data to the first time axis and the second information included in the second interaction data in the third area by relating a time related to the second information included in the second interaction data to the second time axis.

(16) In the interaction data processing apparatus described in (15), the time denoting information includes a date and a time of the date and the first and second time axes denote a time of the date.

The display screen included in the display unit is divided into a plurality of areas in a direction approximately perpendicularly to the first and second time axes.

The display unit, if the first information included in the first interaction data and the first information included in the second interaction data are related to a time of the same date, displays the first information included in the first interaction data in the first area by relating a time related to the first information included in the first interaction data to the first time axis and the first information included in the second interaction data in the third area by relating a time related to the first information included in the second interaction data to the first time axis.

(17) In the interaction data display apparatus described in (15), the time denoting information includes a date and a time of the date and the first and second time axes denote the date and a time of the date.

The display unit, if the first information included in the first interaction data and the first information included in the second interaction data are related to a time of the same date, displays the first information included in the first interaction data in a place having a first distance from the first time axis by relating a time related to the first information included in the first interaction data to the first time axis and the first information included in the second interaction data in a place having the first distance from the first time axis by relating a time related to the first information included in the second interaction data to the first time axis.

(18) In the interaction data display apparatus described in (10), the display screen included in the display unit is divided into a plurality of areas in a direction approximately perpendicularly to the first and second time axes.

The display unit displays the first time axis on the display screen included therein and the first information in the first area by relating a time related to the first information to the first time axis.

The display unit also displays the second information in a fourth area by relating a time related to the second information to the first time axis.

(19) The interaction data display apparatus described in (10), upon receiving a specified range of each of the first and second information items to be displayed, receives the first and second information items in the specified range respectively through the receiving unit.

The interaction data display apparatus, upon receiving a specified display format for the first and second information items, displays the first and second information items in the specified format on the display screen respectively.

The display format specification includes a display position on the display screen with respect to each of the first and second information items, as well as at least one of the colors of the first and second information items to be displayed on the display screen.

(20) In the interaction data display apparatus described in (10), the terminal unit includes a wireless sensor for receiving a radio signal including identifying information for identifying the different terminal unit; an acceleration sensor for measuring acceleration of the different terminal unit; and a wireless sending unit for sending the first and second information items. The terminal unit is to be worn by the member.

The first information denotes whether or not the terminal unit wearing member has met the member who wears the different terminal unit and the second information denotes the state of an activity of the member who wears the terminal unit.

The interaction data denotes the state of an exchange between the members who wear the terminal units.

(21) The second aspect of the present invention is to provide an interaction data processing apparatus for processing interaction data of a terminal unit.

The interaction data includes first information denoting whether or not the terminal unit has faced a different terminal unit and second information denoting a state of the terminal unit, except for positions of the terminal unit and excluding the first information.

The interaction data processing apparatus includes a receiving unit for receiving interaction data from the terminal unit, a control unit for processing the received interaction data, and an output unit for outputting the processed interaction data.

The receiving unit receives interaction data from the terminal unit, the control unit processes the received interaction data, and the output unit outputs the first and second information items included in the processed interaction data so as to be related to each other according to a time.

(22) In the interaction data processing apparatus described in (21), the first information includes identifying information for identifying the different terminal unit that the terminal unit has faced.

(23) In the interaction data processing apparatus described in (22), the first information includes information denoting whether or not a radio signal including identifying information for identifying the different terminal unit has been received from the different terminal unit.

(24) In the interaction data processing apparatus described in (23), the second information includes acceleration information denoting the acceleration of the terminal unit.

(25) In the interaction data processing apparatus described in (24), the control unit classifies the movement state of a terminal unit that has sent the second information according to the acceleration information included in the second information and adds the information denoting a classified movement state to the second information.

(26) In the interaction data processing apparatus described in (25), the control unit compares the acceleration information included in the second information with predetermined acceleration information to classify the movement state of the terminal that has sent the second information to a movement state related to the predetermined acceleration information according to the result of the comparison.

(27) In the interaction data processing apparatus described in (26), the control unit classifies the movement state of the terminal unit that has sent the second information to a predetermined movement state that includes at least one of the moving state and the static state of the terminal unit.

(28) In the interaction data processing apparatus described in (26), the control unit calculates an average value within a predetermined period of the acceleration included in the second information and adds the calculated average value to the second information.

(29) In the interaction data processing apparatus described in (28), the control unit calculates an amount of an acceleration change of the terminal unit that has sent the second information according to the acceleration information included in the second information and adds the calculated amount of the acceleration change to the second information.

(30) In the interaction data processing apparatus described in (29), the control unit calculates a total of the absolute values of the difference between a value of measured acceleration information and its precedingly measured acceleration information within a predetermined period as an amount of the acceleration change.

(31) In the interaction data processing apparatus described in (29), the control unit calculates the number of zero-cross points of the acceleration information within a predetermined period as an amount of the acceleration change.

(32) In the interaction data processing apparatus described in (29), the terminal unit decides whether or not the radio signal has been received at a predetermined time interval and the control unit counts the number of times the terminal unit has received the radio signal within a predetermined period longer than the predetermined time interval.

If the count exceeds a predetermined threshold, the control unit adds the information denoting that the terminal unit that has received the radio signal has faced the terminal unit that has sent the radio signal for the predetermined period to the first information.

(33) In the interaction data processing apparatus described in (32), the first information included in the first interaction data includes identifying information for identifying a terminal unit that the first terminal unit has faced and other than the first terminal unit.

The first interaction data includes information for relating the first information included in the first interaction data to a time at which the first terminal unit has received a radio signal including the identifying information.

The first information included in the second interaction data includes identifying information for identifying a terminal unit that the second terminal unit has faced and other than the second terminal unit.

The second interaction data includes information for relating the first information included in the second interaction data to a time at which the second terminal unit has received a radio signal including the identifying information.

The control unit adds information denoting that the second terminal unit has received the radio signal including the identifying information of the first terminal unit at a first time to the first information included in the second interaction data if the first information included in the first interaction data includes information denoting that the first terminal unit has received the radio signal including the identifying information of the second terminal unit at the first time and the first information included in the second interaction data does not include information denoting that the second terminal unit has received the radio signal including the identifying information of the first terminal unit at the first time.

(34) In the interaction data processing apparatus described in (33), the apparatus further includes a storage unit for storing data and the control unit processes the interaction data at a predetermined time and stores the processed interaction data in the recording unit.

(35) In the interaction data processing apparatus described in (33), the apparatus further includes a storage unit for storing data and the control unit processes the interaction data when its processing load is under a predetermined threshold and stores the processed interaction data in the storage unit.

(36) In the interaction data processing apparatus described in (33), the apparatus further includes a storage unit for storing data and the control unit processes the interaction data at a predetermined time, creates image data for displaying the processed interaction data, and stores the processed interaction data and the created image data in the storage unit.

(37) In the interaction data processing apparatus described in (33), the apparatus further includes a storage unit for storing data and the control unit processes the interaction data when its processing load is under a predetermined threshold, creates image data for displaying the processed interaction data, and stores the processed interaction data and the created image data in the storage unit.

(38) In the interaction data processing apparatus described in (33), the terminal unit includes a wireless sensor for receiving a radio signal including identifying information for identifying the different terminal unit; an acceleration sensor for measuring acceleration of the different terminal unit; and a wireless sending unit for sending the first and second information items. The terminal unit is to be worn by the member.

(39) The third aspect of the present invention is to provide an interaction data acquiring terminal for acquiring interaction data exchanged between members in an organization.

The interaction data acquiring terminal includes an acquiring unit for acquiring the interaction data and a sending unit for sending the interaction data acquired by the acquiring unit.

(40) In the interaction data acquiring terminal described in (39), the acquiring unit includes one or more sensors for sensing physical information and acquires the physical information sensed by each of the sensors as interaction data.

(41) In the interaction data acquiring terminal described in (40), the interaction data acquiring terminal further includes a clock for measuring a time and a storage unit for storing the interaction data acquired by the acquiring unit.

The storage unit stores the interaction data and a time at which the interaction data is sensed so as to be related to each other.

(42) In the interaction data acquiring terminal described in (41), the acquiring unit includes one or more infrared sensors for sensing an infrared signal and one or more acceleration sensors for sensing acceleration.

The storage unit stores information for denoting that any of the sensors has sensed the infrared signal, as well as the acceleration sensed by any of the acceleration sensors as the interaction data and further stores a time at which the infrared signal has been detected and a time at which the acceleration has been sensed.

(43) In the interaction data acquiring terminal described in (41), the acquiring terminal further includes a control unit for controlling sending of the interaction data and the control unit instructs the sending unit to send the interaction data stored in the storage unit. The control unit, if the sending fails, retains the sending-failed interaction data in the storage unit and sends the interaction data retained in the storage unit again when the sending is enabled.

(44) In the interaction data acquiring terminal described in (43), the sending unit sends the interaction data wirelessly to the base station nearest to the interaction data acquiring terminal.

(45) In the interaction data acquiring terminal described in (43), the sending unit is connected to a base station through a wired network and sends the interaction data to the base station through the wired network.

(46) The fourth aspect of the present invention is to provide a method for displaying interaction data of a terminal unit. The interaction data includes first information denoting whether or not the terminal unit has faced a different terminal unit and second information denoting a state of the terminal unit and excluding information denoting positions of the terminal unit and the first information.

The display unit displays the first and second information items included in the interaction data received by the receiving unit so as to be related to each other according to times at which the first and second information items have been obtained respectively.

(47) In the method described in (46), the first information includes identifying information for identifying the different terminal unit that the terminal unit has faced.

(48) The method described in (47), the first information includes information denoting whether or not a radio signal that includes the identifying information of the different terminal unit has been received from the different terminal unit.

(49) In the method described in (48), the second information includes acceleration information denoting the acceleration of the terminal unit.

(50) The method described in (49), the second information includes information denoting the movement state of the terminal unit, classified according to the acceleration information.

(51) In the method described in (49), each of the first and second information items included in the first interaction data includes identifying information for identifying a terminal unit that the first terminal unit has faced and other than the first terminal unit, as well as acceleration information denoting the acceleration of the first terminal unit.

Each of the first and second information items included in the second interaction data includes identifying information for identifying a terminal unit the second terminal unit has faced and other than the second terminal unit, as well as acceleration information denoting the acceleration of the second terminal unit.

The method displays the first and second interaction data so as to be related to each other according to a time.

(52) The method described in (51), the first interaction data includes information for relating the first information included in the first interaction data to a time at which the first terminal unit has received the radio signal, as well as information for relating the second information included in the first interaction data to a time at which acceleration of the first terminal unit has been measured.

The second interaction data includes information for relating the first information included in the second interaction data to a time at which the second terminal unit has received the radio signal, as well as information for relating the second information included in the second interaction data to a time at which the acceleration of the second terminal unit has been measured.

(53) The method described in (52), the first information, as well as the second information related to the same time as that related to the first information are displayed so as to be related to each other.

(54) The method described in (53), the first interaction data includes identifying information for identifying the first terminal unit that has received the radio signal and the second interaction data includes identifying information for identifying the second terminal unit that has received the radio signal.

(55) In the method described in (54), the first and second information items included in the first interaction data are displayed so as to be related to the identifying information of the first terminal unit and the first and second information items included in the second interaction data are displayed so as to be related to the identifying information of the second terminal unit.

(56) In the method described in (55), the first time axis is displayed on a display screen included in the display unit and the second time axis having the same scale and the same direction as those of the first time axis is displayed on an extended line of the first time axis.

The first information is displayed by relating a time related to the first information to the first time axis and the second information is displayed by relating a time related to the second information to the second time axis.

(57) In the method described in (56), the time denoting information includes a date and a time of the date and the first and second time axes denote a time of the same date respectively.

The first information included in the first interaction data is displayed in a place having a first distance from the first time axis by relating a time related to the first information included in the first interaction data to the first time axis and the second information included in the first interaction data is displayed in a place having the first distance from the second time axis by relating a time related to the second information included in the first interaction data to the second time axis if the first and second information items included in the first interaction data are related to a time of the same date.

(58) In the method described in (56), the time denoting information includes a date and a time of the date and the first and second time axes denote a time of the date respectively.

A display screen included in the display unit is divided into a plurality of areas in a direction approximately perpendicularly to the first and second time axes.

If the first information included in the first interaction data includes a first portion related to a first date and a second portion related to a second date, the method displays the first portion in a first one of the plurality of divided areas by relating a time related to the first portion to the first time axis and the second portion in a second one of the divided areas by relating a time related to the second portion to the first time axis.

(59) In the method described in (56), the time denoting information includes a date and a time of the date and the first and second time axes denote the date and a time of the date respectively.

If the first information included in the first interaction data includes a first portion related to a first date and a second portion related to a second date, the method displays the first portion in a place having a first distance from the first time axis by relating a time related to the first portion to the first time axis and the second portion in a place having the first distance from the first time axis by relating a time related to the second portion to the first time axis.

(60) In the method described in (56), the display screen included in the display unit is divided into a plurality of areas in a direction approximately perpendicularly to the first and second time axes.

The method displays the first information included in the first interaction data in the first area by relating a time related to the first information included in the first interaction data to the first time axis and the second information included in the first interaction data in the first area by relating a time related to the second information included in the first interaction data to the second time axis.

The method further displays the first information included in the second interaction data in the third area by relating a time related to the first information included in the second interaction data to the first time axis and the second information included in the second interaction data in the third area by relating a time related to the second information included in the second interaction data to the second time axis.

(61) In the method described in (60), the time denoting information includes a date and a time of the date and the first and second time axes denote a time of the date respectively.

The display screen included in the display unit is divided into a plurality of areas in a direction approximately perpendicularly to the first and second time axes.

If the first information included in the first interaction data and the first information included in the second interaction data are related to a time of the same date, the method displays the first information included in the first interaction data in the first area by relating a time related to the first information included in the first interaction data to the first time axis and the first information included in the second interaction data in the third area by relating a time related to the first information included in the second interaction data to the first time axis.

(62) In the method described in (60), the time denoting information includes a date and a time of the date and the first and second time axes denote the date and a time of the date respectively.

If the first information included in the first interaction data and the first information included in the second interaction data are related to a time of the same date, the method displays the first information included in the first interaction data in a place having a first distance from the first time axis by relating a time related to the first information included in the first interaction data to the first time axis and the first information included in the second interaction data in a place having the first distance from the first time axis by relating a time related to the first information included in the second interaction data to the first time axis.

(63) In the method described in (55), the display screen included in the display unit is divided into a plurality of areas in a direction approximately perpendicularly to the first and second time axes.

The method displays the first time axis on the display screen included in the display unit and the first information in the first area by relating a time related to the first information to the first time axis.

The method also displays the second information in the third area by relating a time related to the second information to the first time axis.

(64) The method described in (55), upon receiving a specified range of each of the first and second information items to be displayed, obtains each of the first and second information items in the specified range.

And upon receiving a specified display format of the first and second information items, the method displays the first and second information items in the specified format on the display screen.

The display format specification includes a display position on the display screen with respect to each of the first and second information items, as well as at least one of the colors of the first and second information items to be displayed on the display screen.

(65) In the method described in (55), the terminal unit includes a wireless sensor for receiving a radio signal including identifying information for identifying the different terminal unit; an acceleration sensor for measuring the acceleration of the different terminal unit; and a wireless sending unit for sending the first and second information items. The terminal unit is to be worn by the member.

The first information denotes whether or not the terminal unit wearing member has met the member who wears the different terminal unit and the second information denotes the state of an exchange between the terminal unit wearing members.

The interaction data denotes the state of an exchange between the terminal unit wearing members.

(66) The method described in (65) classifies the movement state of the terminal unit that has sent the second information according to the acceleration information included in the second information and adds a classified movement state to the second information.

(67) The method described in (66) compares the acceleration information included in the second information with predetermined acceleration information and classifies the movement state of the terminal unit that has sent the second information into a state related to the predetermined acceleration information according to the result of the comparison.

(68) The method described in (67) classifies the movement state of the terminal unit that has sent the second terminal unit into a predetermined state including at least one of the moving state and the static state of the terminal unit.

(69) The method described in (67) calculates an average value of the acceleration information included in the second information within a predetermined period and adds the calculated average value to the second information.

(70) The method described in (69) calculates an amount of an acceleration change of the terminal unit that has sent the second information according to the acceleration information included in the second information and adds the calculated amount to the second information.

(71) The method described in (70) calculates a total of the absolute values of the difference between the value of measured acceleration information and the value of its precedingly measured acceleration information within a predetermined period as information denoting an amount of the acceleration change.

(72) The method described in (70) calculates the number of zero-cross points of the acceleration information within a predetermined period as an amount of the acceleration change.

(73) The method described in (70) decides whether or not the radio signal has been received according to a predetermined time interval and counts the number of times the radio signal has been received in a predetermined period longer than the predetermined time interval. If the count exceeds a predetermined threshold, the method adds information denoting that the terminal unit that has received the radio signal has faced the terminal unit that has sent the radio signal for the period to the first information.

(74) In the method described in (73), the first information included in the first interaction data includes identifying information for identifying a terminal unit that the first terminal unit has faced and other than the first terminal unit.

The first interaction data includes information for relating the first information included in the first interaction data to a time at which the first terminal unit has received a radio signal including the identifying information. The first information included in the second interaction data includes identifying information for identifying a terminal unit that the second terminal unit has faced and other than the second terminal unit.

The second interaction data includes information for relating the first information included in the second interaction data to a time at which the second terminal unit has received a radio signal including the identifying information.

The method adds information denoting that the second terminal unit has received the radio signal including identifying information of the first terminal unit at the first time to the first information included in the second interaction data if the first information included in the first interaction data includes information denoting that the first terminal unit has received the radio signal including the identifying information of the second terminal unit at the first time and if the first information included in the second interaction data does not include information denoting that the second terminal unit has received the radio signal including the identifying information of the first terminal unit at the first time.

(75) The method described in (74) processes the interaction data at a predetermined time and stores the processed interaction data in the storage unit.

(76) The method described in (74) processes the interaction data and stores the processed interaction data in the storage unit when the processing load of the control unit is lower than a predetermined threshold.

(77) The method described in (74) processes the interaction data at a predetermined time, creates image data for displaying the processed interaction data on a display screen, and stores the processed interaction data and the created image data in the storage unit.

(78) The method described in (74) processes the interaction data, creates image data for displaying the processed interaction data on a display screen, and stores the processed interaction data and the created image data in a storage unit when the processing load of the control unit is lower than a predetermined threshold.

(79) In the method described in (74), the terminal unit includes a wireless sensor for receiving a radio signal including identifying information for identifying the different terminal unit; an acceleration sensor for measuring the acceleration of the different terminal; and a wireless sending unit for sending the first and second information items. The terminal unit is to be worn by the member.

The present invention is favorable for the consultation industry for supporting improvement of productivity, for example, through personnel and project management.

What is claimed is:

1. An interaction data processing apparatus for processing interaction data of a terminal unit,
    wherein the interaction data includes first information denoting whether or not the terminal unit has faced a different terminal unit and second information which has acceleration information denoting acceleration of the terminal unit;
    wherein the interaction data processing apparatus includes a receiving unit for receiving interaction data from the terminal unit, a control unit for processing the received interaction data, and an output unit for outputting the processed interaction data;
    wherein the receiving unit receives interaction data from the terminal unit;
    wherein the control unit processes the received interaction data;
    wherein the output unit outputs the first and second information items included in the processed interaction data so as to be related to each other according to a time:
    wherein the control unit classifies a movement state of a terminal unit that has sent the second information according to acceleration information included in the second information and adds the information denoting the classified movement state to the second information;
    wherein the control unit calculates an average value within a predetermined period of acceleration information included in the second information and adds the calculated average value to the second information;
    wherein the control unit calculates an amount of acceleration change of a terminal unit that has sent the second information according to acceleration information included in the second information and adds the calculated amount of acceleration change to the second information;
    wherein the terminal unit decides whether or not a radio signal including identifying information for identifying the different terminal unit has been received at a predetermined time interval;
    wherein the control unit counts the number of times the terminal unit has received the radio signal within a predetermined period longer than the predetermined time interval; and
    wherein the control unit, when the count exceeds a predetermined threshold, adds information denoting that the terminal unit that has received the radio signal has faced the terminal unit that has sent the radio signal for the predetermined period to the first information.

2. The interaction data processing apparatus according to claim 1,
    wherein the first information includes identifying information for identifying the different terminal unit that the terminal unit has faced.

3. The interaction data processing apparatus according to claim 2,
    wherein the first information includes information denoting whether or not a radio signal including identifying information for identifying the different terminal unit has been received from the different terminal.

4. The interaction data processing apparatus according to claim 1,
    wherein the second information excludes information denoting position of the terminal unit and the first information.

5. The interaction data processing apparatus according to claim 1,
    wherein the first information included in a first interaction data includes identifying information for identifying a terminal unit that the first terminal unit has faced and other than the first terminal unit;
    wherein the first interaction data includes information for relating the first information included in the first interaction data to a time at which the first terminal unit has received a radio signal including the identifying information;
    wherein the first information included in a second interaction data includes identifying information for identifying a terminal unit that the second terminal unit has faced and other than the second terminal unit;
    wherein the second interaction data includes information for relating the first information included in the second interaction data to a time at which the second terminal unit has received a radio signal including the identifying information; and
    wherein the control unit adds information denoting that the second terminal unit has received the radio signal including identifying information of the first terminal unit at a first time to the first information included in the second interaction data if the first information included in the first interaction data includes information denoting that the first terminal unit has received the radio signal including identifying information of the second terminal unit at a first time and the first information included in the second interaction data does not include information denoting that the second terminal unit has received a radio signal including identifying information of the first terminal unit at the first time.

6. An interaction data processing apparatus for processing interaction data of a terminal unit,
    wherein the interaction data includes first information denoting whether or not the terminal unit has faced a different terminal unit and second information which has acceleration information denoting acceleration of the terminal unit;
    wherein the interaction data processing apparatus includes a receiving unit for receiving interaction data from the terminal unit, a control unit for processing the received interaction data, and an output unit for outputting the processed interaction data;
    wherein the receiving unit receives interaction data from the terminal unit;
    wherein the control unit processes the received interaction data;
    wherein the output unit outputs the processed interaction data that includes the first and second information items so as to be related to each other according to a time;
    wherein the first information includes identifying information for identifying the different terminal unit that the terminal unit has faced;
    wherein the first information includes information denoting whether or not a radio signal including identifying information for identifying the different terminal unit has been received from the different terminal;
    wherein the terminal unit decides whether or not the radio signal has been received at a predetermined time interval;

wherein the control counts the number of times the terminal unit has received the radio signal within a predetermined period longer than the predetermined time interval; and wherein the control unit, when the count exceeds a predetermined threshold, adds information denoting that the terminal unit that has received the radio signal has faced the terminal unit that has sent the radio signal for the predetermined period to the first information.

7. The interaction data processing apparatus according to claim 6, further comprising:

a display unit that receives the processed interaction data that includes the first information and the second information from the output unit and displays the processed interaction data that includes the first information and the second information.

8. The interaction data processing apparatus according to claim 6, wherein the first information included in a first interaction data includes identifying information for identifying a terminal unit that the first terminal unit has faced and other than the first terminal unit;

wherein the first interaction data includes information for relating the first information included in the first interaction data to a time at which the first terminal unit has received a radio signal including the identifying information;

wherein the first information included in a second interaction data includes identifying information for identifying a terminal unit that the second terminal unit has faced and other than the second terminal unit;

wherein the second interaction data includes information for relating the first information included in the second interaction data to a time at which the second terminal unit has received a radio signal including the identifying information; and wherein the control unit adds information denoting that the second terminal unit has received the radio signal including identifying information of the first terminal unit at a first time to the first information included in the second interaction data if the first information included in the first interaction data includes information denoting that the first terminal unit has received the radio signal including identifying information of the second terminal unit at a first time and the first information included in the second interaction data does not include information denoting that the second terminal unit has received a radio signal including identifying information of the first terminal unit at the first time.

9. The interaction data processing apparatus according to claim 8, further comprising:

a display unit that receives the processed interaction data that includes the first information and the second information from the output unit and displays the processed interaction data that includes the first information and the second information.

10. The interaction data processing apparatus according to claim 6, wherein the second information excludes information denoting position of the terminal unit and the first information.

11. The interaction data processing apparatus according to claim 6, wherein the control unit classifies an action pattern of a terminal unit that has sent the second information according to acceleration information included in the second information and adds the information denoting the classified action pattern to the second information.

12. The interaction data processing apparatus according to claim 6, wherein the control unit calculates an average value within a predetermined period of acceleration information included in the second information and adds the calculated average value to the second information.

13. The interaction data processing apparatus according to claim 6, wherein the control unit calculates an amount of acceleration change of a terminal unit that has sent the second information according to acceleration information included in the second information and adds the calculated amount of acceleration change to the second information.

14. The interaction data processing apparatus according to claim 6, wherein the control unit calculates a zero-cross value of a terminal unit that has sent the second information according to acceleration information included in the second information and adds the calculated zero-cross value to the second information.

* * * * *